United States Patent [19]

Inoue et al.

[11] Patent Number: 5,696,774

[45] Date of Patent: Dec. 9, 1997

[54] DIGITAL SIGNAL RECORDING DEVICE, DIGITAL SIGNAL PLAYBACK DEVICE, AND DIGITAL SIGNAL DECODING DEVICE THEREFOR

[75] Inventors: Sadayuki Inoue; Junko Shinohara; Tatsuo Yamasaki; Ken Onishi, all of Tokyo, Japan

[73] Assignee: Mitsubishi Denki Kabushiki Kaisha, Tokyo, Japan

[21] Appl. No.: 565,973

[22] Filed: Dec. 1, 1995

[30] Foreign Application Priority Data

| Dec. 1, 1994 | [JP] | Japan | 6-298461 |
| Mar. 31, 1995 | [JP] | Japan | 7-075893 |
| May 10, 1995 | [JP] | Japan | 7-111879 |

[51] Int. Cl.[6] ................................. G11B 20/18
[52] U.S. Cl. ............... 371/37.4; 371/38.1; 371/40.1
[58] Field of Search ................... 371/37.4, 38.1, 371/40.1

[56] References Cited

U.S. PATENT DOCUMENTS

| 3,639,900 | 2/1972 | Hinz, Jr. | 371/40.1 |
| 4,653,052 | 3/1987 | Doi et al. | 371/37.4 |
| 4,665,537 | 5/1987 | Moriyama | 371/37.1 |
| 5,396,504 | 3/1995 | Pack | 371/37.4 |
| 5,420,873 | 5/1995 | Yamagishi et al. | 371/38.1 |
| 5,561,529 | 10/1996 | Tanaka et al. | 386/77 |
| 5,585,933 | 12/1996 | Ichige et al. | 386/109 |
| 5,587,789 | 12/1996 | Lee et al. | 386/68 |
| 5,623,344 | 4/1997 | Lane et al. | 386/81 |

FOREIGN PATENT DOCUMENTS

| 3523249 | 1/1986 | Germany. |
| 4224326 | 2/1994 | Germany. |

OTHER PUBLICATIONS

HDTV '93, A Recording Method of ATV data on a Consumer digital VCR, International Workshop on HDTV '93, Oct. 26–28, 1993, Proceedings, vol. II.

Primary Examiner—Stephen M. Baker
Attorney, Agent, or Firm—Birch, Stewart, Kolasch & Birch, LLP

[57] ABSTRACT

To reduce the undetected errors without degradation of the burst error correction capability, in error correction decoding of the digital signal with three-dimensional error correction codes appended thereto. For correcting errors by applying error correction codes in three directions of a recording direction, perpendicular direction, and direction of tracks, whether a burst error has occurred is checked, and an error-correction decoding algorithm is switched between one used when a burst error has occurred, and one used when no burst error has occurred.

21 Claims, 38 Drawing Sheets

FIG. 9
PRIOR ART
<4X SPEED>
PLAYBACK SIGNAL
TRACK A
TRACK B
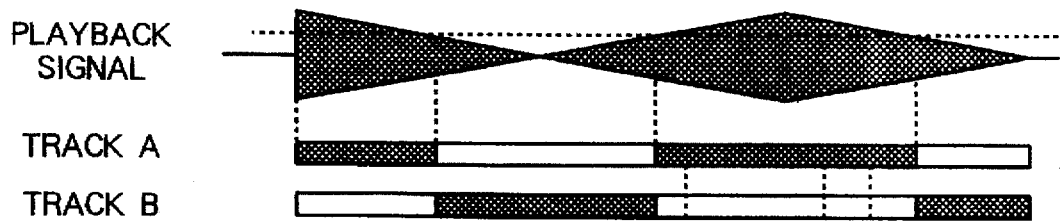
<9X SPEED>
PLAYBACK SIGNAL
TRACKS A & B
<17X SPEED>
PLAYBACK SIGNAL
TRACKS A & B
OVERLAPPING REGION
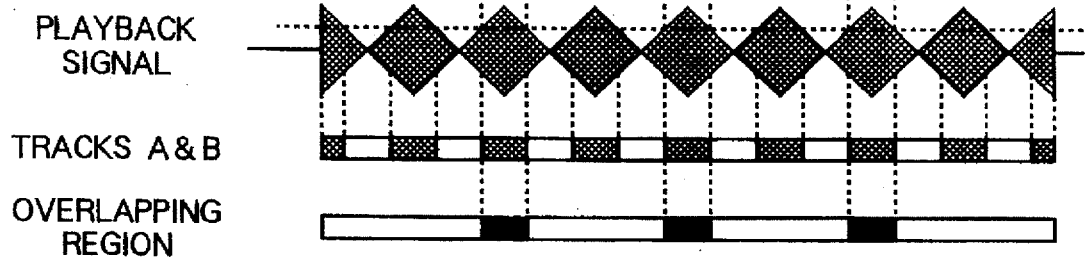

FIG. 11
PRIOR ART
CASE 1
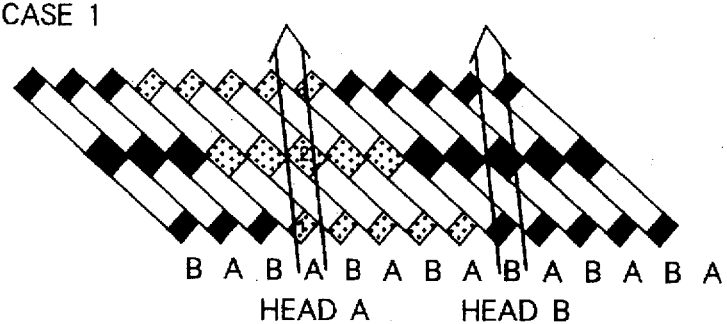
CASE 2
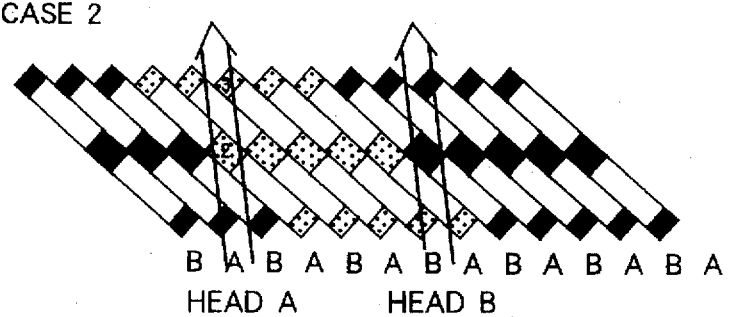
FIG. 12
PRIOR ART
SYNC BLOCK NUMBER
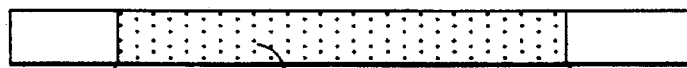
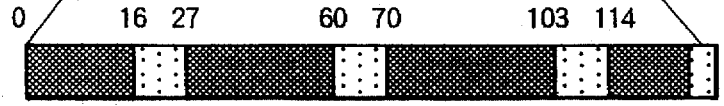
▓ MAIN AREA
▒ DUPLICATION AREA

FIG. 17A
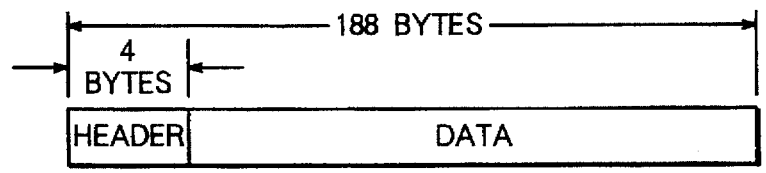
FIG. 17B
| 1 | 2 | 74 BYTES | | |
|---|---|---|---|---|
| H1 | H2 | #1 TRANSPORT PACKET | | |
| H1 | | #1 | | |
| H1 | | #1 | H2 | #2 |
| H1 | | #2 | | |
| H1 | | #2 | | |
1                76
FIG. 18A
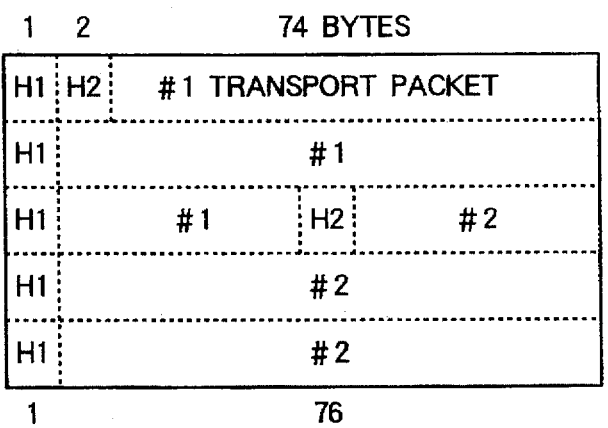
|  | 2× | 4× | 8× | 16× |
|---|---|---|---|---|
| 9000rpm SYSTEM | 186SB | 62SB | 26SB | 12SB |
SB : SYNC BLOCKS
FIG. 18B
|  | 2× | 4× | 8× | 18× |
|---|---|---|---|---|
| 9000rpm SYSTEM | 186SB | 62SB | 26SB | 10.9SB |
| 4500rpm SYSTEM | 93SB | 31SB | 13SB | 5.5SB |
SB : SYNC BLOCKS FIG. 32A
FIG. 32B
PREDETERMINED LEVEL
FIG. 32C
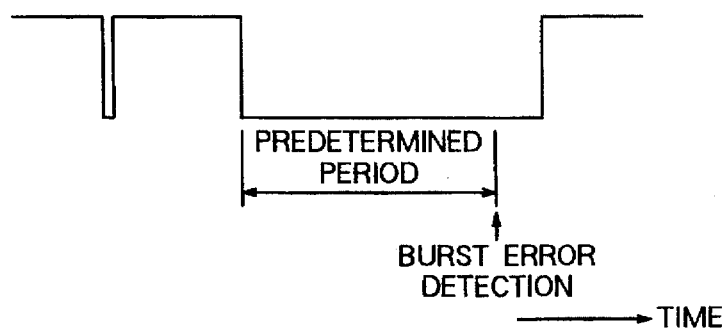
PREDETERMINED PERIOD
BURST ERROR DETECTION
→ TIME

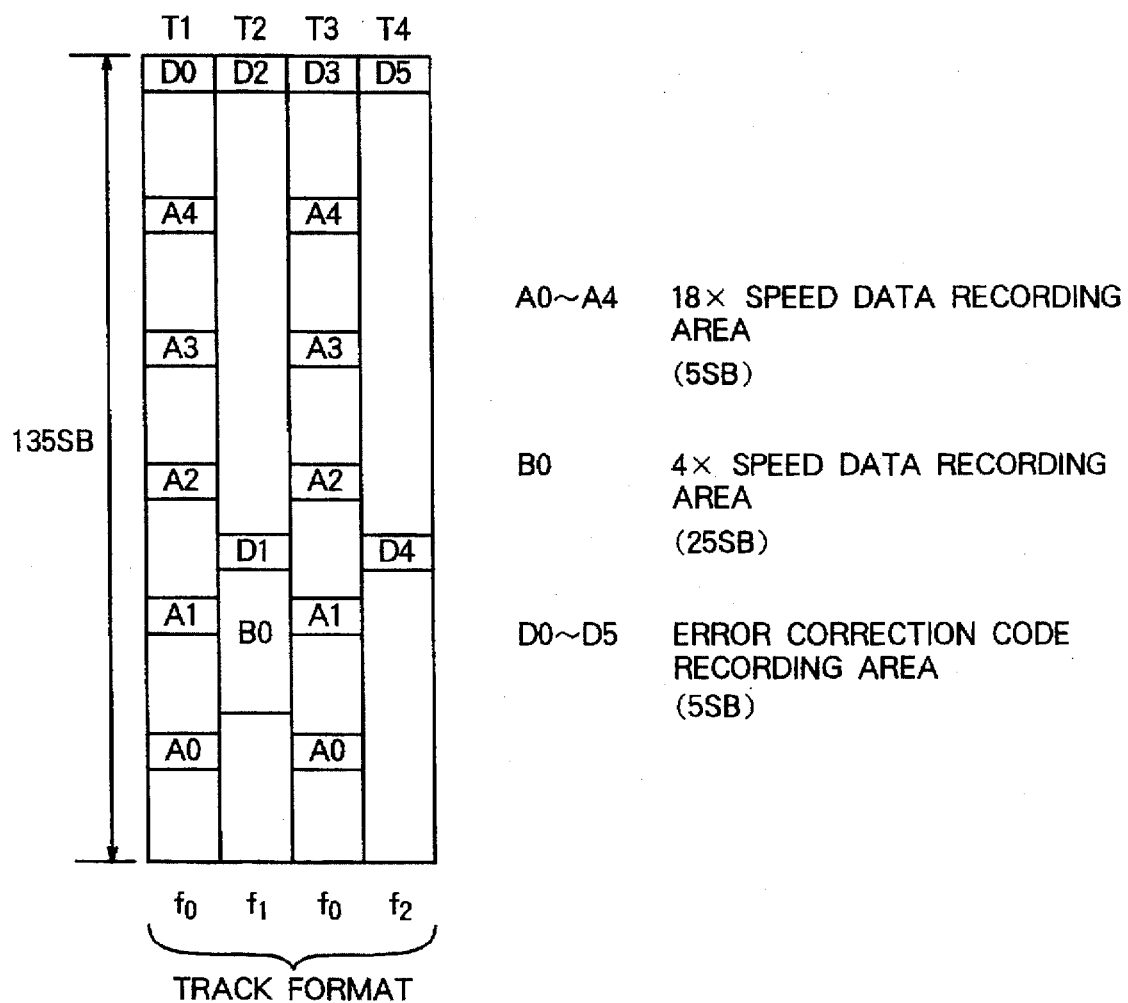

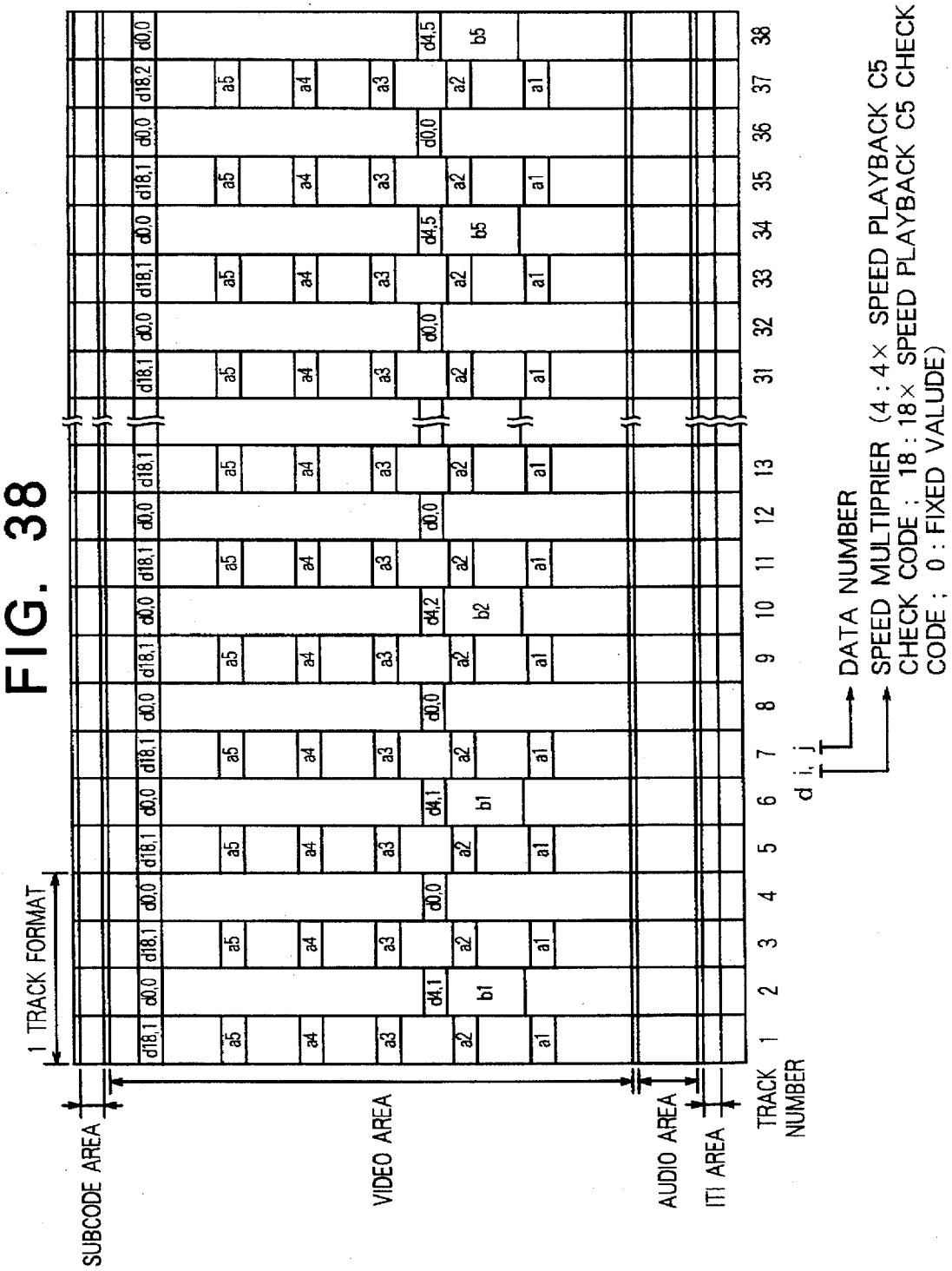

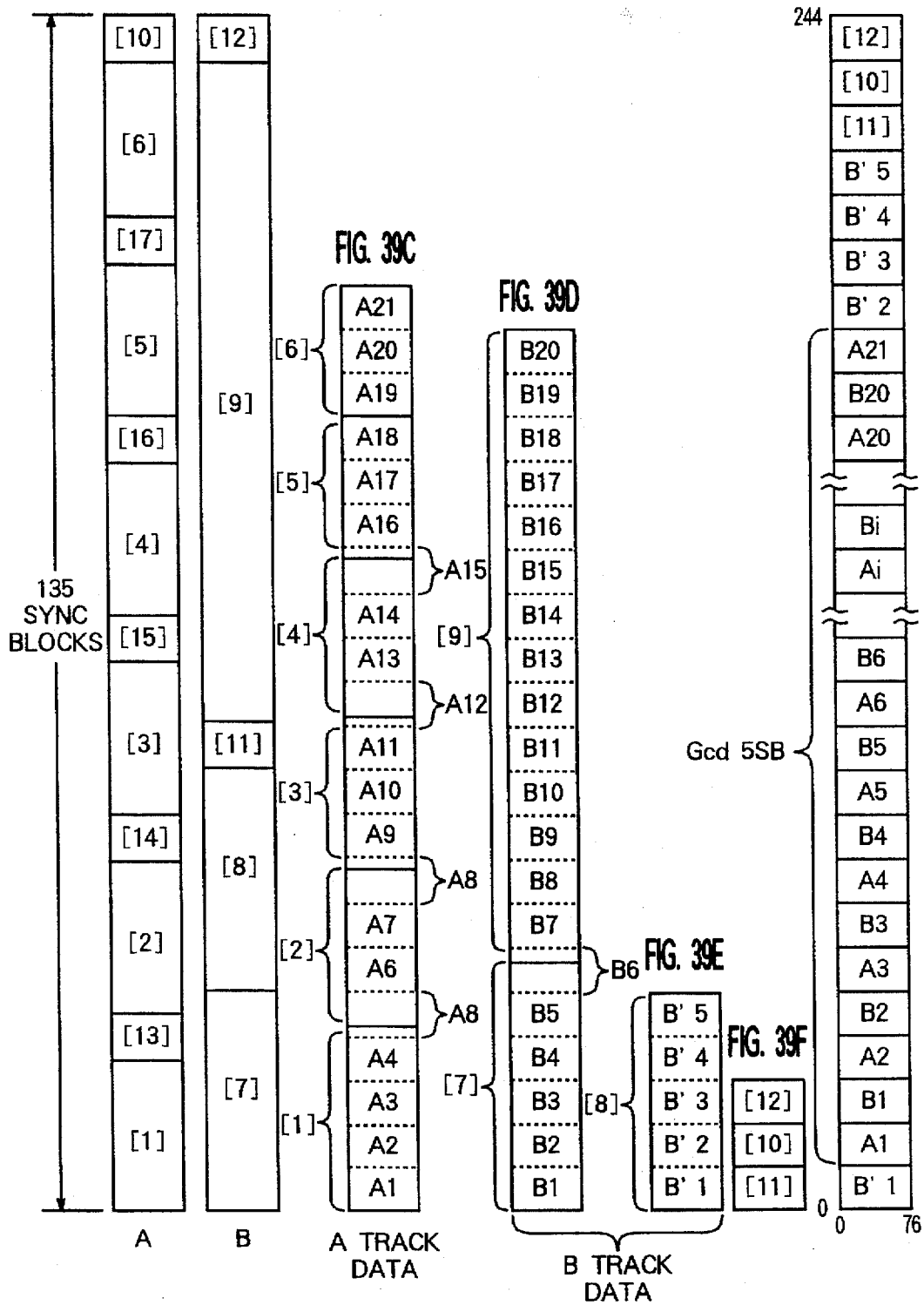

$(D[0,0,0], D[1,1,1], D[2,2,2], \cdots, D[i \bmod 5, i, i \bmod 77],$
$\cdots, D[4,229,75], D[0,230,76], \cdots, D[4,244,13])$

INFORMATION SYMBOL | C4 CHECK CODE (30,25,6) REED-SOLOMON CODE FORMING C5 CHECK CODE

DIGITAL SIGNAL RECORDING DEVICE, DIGITAL SIGNAL PLAYBACK DEVICE, AND DIGITAL SIGNAL DECODING DEVICE THEREFOR

BACKGROUND OF THE INVENTION

The present invention relates to a digital video tape recorder (hereinafter referred to as a digital VTR) having a track format in which digital video and audio signals are recorded in predefined areas on oblique tracks, wherein digital video and audio signals are input in the form of a bit stream, and the bit stream is recorded.

The present invention also relates to a digital signal playback device such as a digital VTR or digital disk player for reproducing the digital data having been transmitted or recorded after arranging transmitted or recorded digital data in two dimensions, that is, in a transmitting or recording direction and perpendicular direction, collecting a plurality of digital data each arranged in the two dimensions to structure a data block, applying a third error correction code in a third direction including a direction of depth of the data block; and applying first and second error correction codes in the transmitting or recording direction and perpendicular direction to the digital data containing the third error correcting code, and in particular to an error-correction decoding for a digital data receiver for receiving data that has been encoded according to the above procedure.

FIG. 1 shows a pattern of tracks for a conventional typical consumer digital VTR. In the drawing, helical tracks are formed on magnetic tape. One track is divided into two areas: a video area in which a digital video signal is recorded; and an audio area in which a digital audio signal is recorded.

There are two methods for recording video and audio signals in this type of consumer digital VTR. One of the methods is what is called a baseband recording method, wherein analog video and audio signals are received, subjected to high-efficiency coding, and recorded at a lowered data rate. The other one is what is called a transparent recording method for recording a bit stream transmitted in digital form.

For recording an advanced television (hereinafter ATV) signal that has been discussed in the U.S.A., or a digital video broadcasting (hereinafter DVB) signal that has been studied in Europe, the latter transparent recording method is suitable. This is because the ATV signal or DVB signal is a signal that has already been compressed in digital form and therefore need not be treated by a high-efficiency encoder and decoder. Moreover, since the ATV or DVB signal can be recorded as it is, picture quality will therefore not deteriorate. Drawbacks are that the ATV or DVB signal is quite sensitive to an error occurring during playback and the picture quality during special playback, such as fast, still or slow playback is poor. In particular, when an error occurs during fast playback, the error propagates over several frames. This results in deterioration in quality of reproduced pictures. If a rotary head records a bit stream on oblique tracks as it is, pictures are hardly reproduced during special playback.

According to a basic specification for a prototype of a consumer digital VTR, one frame of an image is recorded in video areas on ten tracks, in the standard definition (SD) mode, when the recording rate of a digital video signal is 25 Mbps and the field frequency is 60 Hz. If the data rate of the ATV signal is set to 17 to 18 Mbps, the ATV signal can be recorded in the SD mode using the transparent method.

A recording format according to the SD specification (hereinafter the SD standard) that is the basic specification for the prototype of a consumer digital VTR will be described below. The SD standard stipulates that when the field frequency is 60 Hz, a video signal representing one frame is recorded on ten tracks, as mentioned above. When the field frequency is 50 Hz (under the PAL or SECAM system), a video signal representing one frame is recorded on twelve tracks. FIG. 2 shows a recording format for one track under the SD standard. As illustrated, the SD standard stipulates that a video area is composed of a total of 149 sync blocks: 135 sync blocks constituting an area in which image data is recorded; three sync blocks constituting an area in which VAUX data is recorded, and eleven sync blocks constituting an area in which error correction codes are recorded perpendicularly. Numerical characters written on the left of the video area denote sync block addresses within one track. The VAUX data is recorded at sync block addresses 19, 20, and 156. The image data is recorded at sync block addresses 21 to 155.

FIG. 3A and FIG. 3B show the arrangement of error correction codes appended to image data and audio data under the foregoing SD standard. According to the SD standard, a (85, 77, 9) Reed-Solomon code (hereinafter a C1 check code) is used as an error correction code applied to image data in the recording direction, and a (149, 138, 12) Reed-Solomon code (hereinafter a C2 check code) is used as an error correction code applied in the perpendicular direction. Similarly, the (85, 77, 9) Reed-Solomon code (C1 check code), identical to that for the image data, is used as an error correction code applied to audio data in the recording direction, and a (14, 9, 6) Reed-Solomon code (hereinafter a C3 check code) is used as an error correction code applied to the audio data in the perpendicular direction. FIG. 4 shows the structure of one sync block. As shown in FIG. 4, one sync block is 90 bytes long. Five bytes at the head are used to record a sync pattern and an ID signal. Eight bytes at the tail are used to record error correction codes (C1 check code).

A type of digital VTR for transparent recording the above-mentioned ATV signal on magnetic tape using the track format stipulated by the SD specification is disclosed in "A Recording Method of ATV data on a Consumer Digital VCR" presented at the "International Workshop on HDTV '93" held in Ottawa, Canada on Oct. 26 through 28, 1993. The contents of the method will next be described as a prior art example. As mentioned above, the data rate of the ATV signal ranges from 17 to 18 Mbps. A digital VTR conforming to the SD standard can record the ATV signal in transparent mode.

A bit stream constituting an ATV or DVB signal is conforming to the MPEG2 system. That is, image data is encoded by intra-frame or -field coding in which data is encoded using correlation within one frame, or by inter-frame or -field coding (motion compensated prediction) in which data compression is performed using correlation of data between different frames (or fields). For reproducing data compressed according to the MPEG2 system, when errors occur in a playback signal, the errors propagate over several frames until the next intra-frame coded data is reproduced. This is because only the intra-frame coded data can be decoded independently without the need of referencing any other frame.

A digital VTR disclosed on the above technical report will be described below. The disclosed technology is concerned with a recording format that is used for recording the ATV signal on magnetic tape and useful in realizing fast playback which is one of the aforesaid problems. The recording format will be described briefly. FIG. 5A and FIG. 5B show the scanning traces of rotary heads in normal playback and fast playback modes in a conventional digital VTR. In the drawing, adjoining tracks are recorded alternately by rotary heads having different azimuths. In normal playback mode, the tape travel speed (which may hereinafter be referred to simply as a tape speed) is identical to that for recording. The rotary heads can trace the recording tracks as shown in FIG. 5A. The tape speed in fast playback mode is different from that for recording. The rotary heads traverse several tracks, and reproduce fractions of data from the parts of the tracks of the identical azimuth. FIG. 5B shows a scanning trace at a 5× feed. For example, when a bit stream conforming to the MPEG2 system is recorded sequentially on tracks, only the data that is intra-frame coded and separated from a signal reproduced intermittently is reproduced in fast playback mode. The intra-frame coded data alone is used to reconstruct a picture. The reproduced part on the screen are not contiguous to one another, and reproduced fractions of data are spread over each screen. Moreover, since the bit stream is variable-length coded, it is not sure that all the data (pixels) on the screen are updated cyclically, and certain portions of the screens may not be updated for a prolonged period of time. As a result, picture quality attained in fast playback mode is not satisfactory and unacceptable for consumer digital VTRs.

FIG. 6 is a block diagram showing the configuration of a conventional digital VTR permitting fast playback. Herein, the video area of each track is divided into a main area in which a bit stream of an ATV signal is recorded and a duplication area in which an important portion (high-priority (hereinafter HP) data) of a bit stream used for reconstructing a picture in fast playback mode is recorded. In fast playback mode, only the sync blocks containing intra-frame coded data are valid. The intra-coded data is therefore recorded in the duplication areas. For further reducing the amount of data, low-frequency components are extracted from the intra-frame coded data and recorded as HP data. In FIG. 6, reference numeral 1 denotes a bit stream input terminal. 2 denotes a bit stream output terminal. 3 denotes an HP data output terminal. 4 denotes a variable-length decoder. 5 denotes a counter. 6 denotes a data extracting circuit. 7 denotes an end-of-block (hereinafter EOB) appending circuit.

An MPEG2-conforming bit stream is fed through the input terminal 1, supplied as it is through the output terminal 2, and recorded sequentially in the main areas. The bit stream from the input terminal 1 is also fed to the variable-length decoder 4. The syntax of the MPEG2-conforming bit stream is analyzed and an intra picture image is detected. A timing signal is produced by the counter 5. Low-frequency components are extracted from all data blocks of an intra image by the data extracting circuit 6. An EOB is appended by the EOB appending circuit 7. Thus, HP data is constructed and recorded in the duplication areas.

FIG. 7 schematically illustrate normal playback and fast playback in the conventional digital VTR. In normal playback, all bit streams recorded in the main areas are reproduced and fed to an MPEG2-conforming decoder installed externally to the digital VTR. The HP data is discarded. By contrast, in fast playback mode, only the HP data recorded in the duplication areas is acquired and fed to the decoder. The bit streams in the main areas are discarded.

Next, the locations of main areas and duplication areas in each track will be described. FIG. 8 shows a scanning trace of a rotary head in fast playback mode. Under the conditions that the tape speed is set to an integral multiple of a normal tape speed and phase lock is attained, the scanning head is synchronized with tracks of identical azimuth. The locations of data to be reproduced are fixed. In FIG. 8, assuming that part of the playback signal having output levels that exceed −6 dB will become valid playback data, the part of the playback signal which will be valid playback data during one scan of the head are depicted as crosshatched areas in FIG. 8. FIG. 8 shows 9× speed playback. That is to say, it is ensured that the part of a playback signal depicted as crosshatched areas in FIG. 8 is read out (i.e., obtained as valid data) at the 9× speed. The HP data should therefore be recorded in these areas. However, at other multiple speeds, reading of data from these areas is not ensured. It is therefore necessary to select the areas so that reading is ensured at several tape speeds.

FIG. 9 is an explanatory diagram concerning areas (overlap areas) on tape that are scanned in common at various conventional fast playback speeds, e.g., at three tape speeds. Several overlap areas are scanned at each of the tape speeds. Duplication areas are selected from among the overlap areas, so as to ensure reading of the HP data recorded in the duplication areas at the different tape speeds. FIG. 9 is concerned with fast tape feed at 4×, 9×, and 17× speeds. The scanned areas in FIG. 9 are also scanned during fast tape feed at −2×, −7×, and −15× speeds.

Not all the overlap areas can however be traced by the head at different tape speeds. This is because the number of tracks traversed by the head differs from one tape speed to another. It is also necessary that the head can start scanning at any identical azimuth track. FIG. 10 shows the scanning traces of a rotary head at 5× and 9× speeds in the conventional digital VTR. In the drawing, areas 1, 2, and 3 are selected from among the overlap areas at the 5× and 9× speeds. When the same HP data is recorded repetitively on nine tracks, the HP data can be read out at either of the 5× and 9× speeds.

FIG. 11 shows the scanning traces of two rotary heads in 5× speed playback mode in the conventional digital VTR. As apparent from the drawing, when HP data is recorded repetitively on the number of tracks identical to a speed multiplier (ratio of the fast playback tape speed to the normal playback tape speed), the HP data can be read out by the heads that are synchronized with the identical azimuth tracks. In other words, when the HP data is duplicated repetitively on the number of tracks identical to the speed multiplier of the maximum multiple tape speed for the fast playback, the HP data can reliably be read out in either of forward and reverse directions at various tape speeds.

FIG. 12 shows the structure of a track for the conventional digital VTR. In the illustrated example, a track has main areas and duplication areas. As far as a consumer digital VTR is concerned, a video area of each track is composed of 135 sync blocks. The main areas are composed of 97 sync blocks. The duplication areas are composed of 32 sync blocks. The duplication areas include overlap areas for the 4×, 9×, and 17× speeds in FIG. 9. In this case, a data rate for the main areas is about 17.46 Mbps. As for the duplication areas, since the same data is recorded repetitively 17 times, the data rate is about 338.8 kbps.

The conventional consumer digital VTR has the aforesaid configuration, and special playback data is repetitively recorded in the duplication areas. The recording rate of the special playback data is therefore low. In slow playback or fast playback mode, especially, the quality of reproduced pictures is unsatisfactory. For example, when intra-frame coding is performed twice per second, the data rate of intra-coded data alone in an ATV signal is estimated to be about 3 Mbps, but the conventional VTR can merely achieve recording at about 340 kbps. The quality of reproduced pictures is therefore quite poor.

Moreover, as mentioned above, for an ATV or DVB signal, data compression is performed using a technique based on motion-compensated prediction. The compressed data is composed of intra-data (intra-frame or -field coded data) whose playback data alone makes it possible to restore a picture, and inter-data (inter-frame or -field coded data) which can be used in combination with reference-field or -frame data to restore a picture. When errors occur in the playback data, the errors propagate over a plurality of fields or frames in the case of an ATV signal. This results in an unpleasant view. When the digital VTR conforming to the SD standard is used as a storage media for storing data or programs for a computer or the like, it is desired to apply a more powerful error correction code in order to restore (achieve error correction of) data that has not been reproduced because of drop-outs caused by flaws or dust on magnetic tape.

Furthermore, because the rotary heads cross the recording tracks obliquely during special playback (fast playback, slow playback, still playback or the like), the playback signal is produced intermittently from each track. It is therefore not possible to structure the error correction block (video data) shown in FIG. 3A. Accordingly, the playback data is subjected to error correction with the C1 check code only, during special playback.

When error correction by means of C1 check code is used, and the symbol error rate is 0.01, the error correction probability will be $1.56 \times 10^{-3}$ and one error per 8 sync blocks will be detected. In particular, playback output is not stable during special playback, and the symbol error rate often exceeds 0.01. The recorded data is variable-length encoded, so that when error occurs the subsequent data cannot be used, and the playback picture quality deteriorate. The undetected error rate will also be as high as $7.00 \times 10^{-8}$.

SUMMARY OF THE INVENTION

The invention has been achieved to solve the problems discussed above.

An object of the present invention is to improve the error correction capability in normal playback and to improve the quality of reproduced pictures.

Another object of the invention is to improve error correction capability in fast playback as well as in normal playback, and to improve playback picture quality during fast playback through increase in the recording rate of the fast playback data.

According to one aspect of the invention, there is provided a digital signal playback device for playback from a magnetic tape on which record data is recorded, after arranging in two dimensions consisting of a recording direction and perpendicular direction, the record data to be recorded in predetermined areas on tracks formed helically on magnetic tape, collecting a plurality of record data each arranged in the two dimensions to structure a data appending a third error correction code in a third direction including a direction of depth of the data block, and appending first and second error correction codes in the recording direction and perpendicular direction to the record data containing the third error correction code.

First error correction means corrects or detects errors occurring during playback, in normal playback mode.

Burst error detecting means detects a burst error occurring in a playback signal. As for playback data whose errors have been corrected or detected by the first error-correction means, second error-correction decoding means uses the second error correction code to correct errors detected by the first error-correction decoding means. The second error-correction decoding means also corrects errors undetected by the first error correcting means.

In a first embodiment, when the burst error detecting means detects a burst error, the error-correction decoding algorithm followed at least by the second error-correction decoding means to correct or detect errors in playback data is made different from the one followed thereby when no burst error is detected. As for playback data whose errors have been corrected or detected by the second error-correction decoding means, the third error-correction decoding means uses the third error correction code to correct the errors detected by the second error-correction decoding means. (The third error correction detecting means also corrects errors undetected by the second error-correction decoding means.) Because the error-correction decoding algorithm followed by the second error-correction decoding means when a burst error occurs is changed from the one followed thereby when no burst error occurs, occurrence of errors undetected by the second error-correction decoding means (miscorrection, i.e., decoding error) in the event of a burst error can be reduced. Miscorrection by the third error-correction decoding means can therefore be reduced.

Especially in a digital signal playback device for reproducing data that has been subjected to inter-frame (or -field) coding such as motion-compensated prediction typified by the MPEG2 system, image quality deterioration due to undetected errors can be prevented. Moreover, errors can be detected reliably, and interpolation can therefore be achieved satisfactorily. When the digital signal playback device is used as an external storage device for a computer or the like, errors can be detected reliably by the third error-correction decoding means. An appropriate remedy such as re-transmission of data can therefore be effected as may be required.

In a second embodiment, the playback data having been subjected to error correction and detection by the second error-correction decoding means is then supplied to the third error-correction decoding means, which uses the third error correction code to correct the errors detected by the first or second error correcting means. (The third error-correction decoding means also corrects errors undetected by the first or second error correcting means.) When the burst error detecting means detects a burst error, an error-correction decoding algorithm followed at least by the third error-correction decoding means to correct or detect errors in the playback data is made different from the one followed thereby when no burst error is detected. The error-correction decoding algorithm followed by the third error correcting means when a burst error occurs is changed from the one followed thereby when no burst error occurs. Accordingly, in the event of a burst error, the error correction capability of the third error correction code can be exhibited fully for error correction. When no burst error occurs, occurrence of errors undetected by the third error correction codes (miscorrection) can be prevented substantially perfectly.

The object of applying the third error correction code to data on a storage media in a digital VTR or the like is to correct a long burst error stemming from drop-outs. When a burst error occurs, the error correction capability of the third error correction code can be utilized fully to correct errors in reproduced digital data. As for data in which no burst error occurs, occurrence of errors undetected by the third error correction code can be prevented satisfactorily by upgrading error detection capability. In particular, with regard to the code configuration which will be described in connection with Embodiments 1 to 3, it can happen that the result of the third error correction code (C4 check code) has a greater undetected error rate than the result of the second error correction code (C2 check code) at parts where the symbol error rate is poor (where the minimum hamming distance of the C4 check code is shorter than that of the C2 check code). but in such a case. when control is performed as mentioned above, the errors in reproduced digital data can be corrected reliably without an increase in the number of errors undetected by the third error correction code.

According to either of the first and second embodiments described above, in a digital signal playback device for reproducing data that has been subjected to inter-frame (or -field) coding such as motion compensated prediction typified by the MPEG2 system, image quality deterioration due to undetected can be prevented. Moreover, errors can be detected reliably. and interpolation can therefore be achieved satisfactorily. The third error-correction detecting means can detect errors reliably even when the digital signal playback device is used as an external storage device for a computer or the like. An appropriate remedy such as re-transmission of data can therefore be effected as may be required.

In either of the first and second embodiments described above, it may be so arranged that when detecting a burst error, the burst error detecting means recognizes occurrence of a burst error on the basis of the continuity of error-detection flags set as a result of application of the first error correction code. A burst error can therefore be detected reliably. In particular, influence by the characteristics of a magnetic recording or the like is eliminated. Individual digital signal playback devices such as digital VTRs need not be adjusted one by one. The detection of the burst error can be achieved by performing numerical calculation on playback data. The adjusting process in assembly can therefore be simplified.

In either of the first and second embodiments described above, it may be so arranged that when detecting a burst error in normal playback mode, the burst error detecting means compares the output level of a playback signal sent from a head with a predetermined level. When the output level of the playback signal is not higher than the predetermined level continuously for a predetermined period of time or longer, occurrence of a burst error is recognized. A burst error can therefore be detected from the playback signal reliably. Moreover, if error-correction decoding algorithm (especially, the first and second error correction codes) is switched from one to another, or like action is taken, according to the output level of the playback signal, error-correction decoding can be achieved more effectively.

In the first embodiment described above, it may be so arranged that if the burst error detecting means detects a burst error, the second error-correction decoding means does not perform error-correction decoding using the second error correction code. It is possible to prevent miscorrection by the second error correction code. (In particular, when a burst error occurs, errors detected by the first error correction code are almost all false. When such data which are mostly erroneous is subjected to error correction, error correction using the second error correction code is hardly successful, and rather the number of miscorrection increases, and error correction using the third error correction code cannot be expected.

In the second embodiment described above, it may be so arranged that the burst error detecting means detects a burst error, when the third error-correction decoding means performs error correction using the third error correction code, errors in data residing on a plane on which the burst error is detected are corrected using error-detection flags set as a result of application of the first error correction code. Accordingly, in the event of a burst error, the burst error can be corrected reliably by the third error correction code.

If error correction is performed using the results of error correction based on the second error correction code in the event of a burst error, almost all the data in the track where a bust error has occurred will be error detection, in the case of the code configuration which will be described in connection with Embodiment 1 or 2. It is therefore not possible to correct the burst errors by means of the error correction using the second error detection flags. By the use of the configuration set forth above, when a bust error occurs, the burst error can be corrected by fully utilizing the error correction capability of the third error correction code, while when random errors occur, the error correction of the third error correction code can be fully utilized against the random errors as well, by using the error detection flags set as a result of the application of the second error correction code. Thus, error correction can be achieved successfully against either of burst errors and random errors.

In the second embodiment described above, it may be so arranged that when the third error correction is executed. an error-correction decoding algorithm is controlled in such a way that a maximum correctable number of erasures is varied between when the burst error detecting means detects a burst error and when no burst error is detected. Accordingly, when the minimum hamming distance of the third error correction code is shorter than that of the second error correction code, if random errors occur, part of the error correction capability of the third error correction code can be assigned to error detection. Occurrence of errors undetected by the third error correction code can therefore be reduced effectively. For correcting a burst error caused by drop-outs, the error correction capability of the third error correction code is used fully. The burst error correction capability of the third error correction code is therefore utilized fully to correct a burst error.

According to another aspect of the invention, there is provided an error-correction decoding device for performing error correction decoding using first to third error correction codes on received or reproduced digital data having been transmitted or recorded, after arranging transmission or recording digital data in two dimensions, that is, in a transmitting or recording direction and a perpendicular direction, collecting a plurality of digital data each arranged in two dimensions to structure a data block, applying the third error correction code in a third direction including a direction of depth of the data block, and applying the first and second error correction codes in the transmitting or recording direction and perpendicular direction to the digital data containing the third error correction codes. The error-correction decoding device comprises burst error detecting means for detecting a burst error occurring in the received or reproduced digital data, and first error correcting means for correcting errors in the received or reproduced digital data using the first error correction code. Second error correcting means corrects errors in the received or reproduced digital data using the second error correction code, for correcting errors in the digital data.

The received or reproduced digital data which have been subjected to error correction using the second error correction code is then subjected to error correction using the third error correction code.

In a first embodiment of this decoding device, when a burst error is detected at the burst error detecting means, a decoding algorithm followed at the second error correcting means in order to correct errors in the digital data is made different from the one followed when no burst error is detected.

Thus, when a burst error occurs, the error-correction decoding algorithm followed by the second error-correction decoding means is changed from the one followed thereby when no burst error occurs into another. It is therefore possible to reduce occurrence of errors undetected by the second error correction code (miscorrection) in the event of a burst error. Miscorrection by the third error correcting means can therefore be reduced.

When the foregoing error correction codes are used to perform error correction on moving picture data which undergoes inter-field (or -frame) coding such as motion-compensated prediction typified by the MPEG2 system, or programs or data for a computer or the like, if the foregoing error-correction decoding method is used for error-correction decoding of picture data, deterioration in picture quality due to Moreover, errors can be reduced. Moreover, errors can be detected reliably. Interpolation can therefore be achieved successfully. When the error-correction decoding is implemented in an external storage device for a computer or the like, the third error-correction detecting means can detect errors reliably. An appropriate remedy such as re-transmission of data can therefore be effected as may be required. As for a digital signal receiver or the like, a burst error can be detected irrespective of the properties of a transmission path or the like. Error-correction decoding can therefore be accomplished successfully.

In a second embodiment of the decoding device, when the error correction is applied to the digital data at the third error correcting means, if a burst error is detected at the burst error detecting means, a decoding algorithm followed at the third error correcting means in order to correct the errors in the digital data is made different from the one followed when no burst error is detected. Because the error-correction decoding algorithm followed by the third error correcting means when a burst error occurs is changed from the one followed thereby when no burst error occurs into another, the error correction capability of the third error correction code is exhibited fully for error correction when a burst error occurs. When no burst error occurs, occurrence of errors undetected by the third error correction code (miscorrection) can be eliminated almost perfectly.

The object of applying the third error correction code is to correct a long burst error caused by drop-outs occurring in a digital signal playback device (a digital VTR, digital disk player, CD-ROM or the like). When a burst error occurs, the error correction capability of the third error correction code can be utilized fully to correct errors in reproduced digital data. As for data in which no burst error occurs, occurrence of errors undetected by the third error correction code can be prevented satisfactorily by upgrading error detection capability. In particular, with regard to the code configuration which will be described in connection with Embodiments 1 to 3, it can happen that the result of the third error correction code (C4 check code) has a greater undetected error rate than the result of the second error correction code (C2 check code) at parts where the symbol error rate is poor (where the minimum hamming distance of the C4 check code is shorter than that of the C2 check code), but in such a ease, when control is performed as mentioned above, the errors in reproduced digital data can be corrected reliably without an increase in the number of errors undetected by the third error correction code.

When the foregoing error correction codes are used to correct errors in moving picture data which undergoes inter-field (or -frame) coding such as motion-compensated prediction typified by the MPEG2 standard, or programs or data for a computer or the like, if the foregoing error-correction decoding method is used for error-correction decoding of picture data, deterioration in picture quality due to undetected errors can be suppressed. Moreover, errors can be detected reliably. Interpolation can therefore be accomplished satisfactorily. When the foregoing error-correction decoding is implemented in an external storage device for a computer or the like, the third error-correction decoding means can detect errors reliably. An appropriate remedy such as re-transmission of data can therefore be effected as may be required. The error correction capability of the third error correction code against burst errors can be maintained while the miscorrection in the event of random errors can be reduced. In a digital signal receiver or the like, a burst error can be detected irrespective of the properties of a transmission path or the like. Error-correction decoding can be accomplished successfully.

In either of the first and second embodiments described above, it may be so arranged that when a burst error occurring in received or reproduced digital data is detected at the burst error detecting means, the number of consecutive error-detection flags set by the first error correcting means is counted. If the number of consecutive error-detection flags that are set is not less than a predetermined value, occurrence of a burst error is recognized. A burst error can therefore be detected reliably. When the error-correction decoding method is employed in a digital signal playback device or the like, influence of the characteristics of a magnetic: recording or the like is eliminated, so that it is not necessary to adjust the individual digital signal playback devices one by one. The detection of the burst error can be achieved by performing numerical calculation on playback data. The adjusting process in assembly can therefore be simplified. In a digital signal receiver or the like, a burst error can be detected irrespective of the properties of a transmission path or the like. Error-correction decoding can therefore be achieved successfully.

In the first embodiment described above, it may be so arranged that if a burst error is detected at the burst error detecting means, error-correction decoding using the second error correction code is not executed at the second error correcting means. It is therefore possible to prevent miscorrection by the second error correction code. (In particular, when a burst error occurs, errors detected by the first error correction code are almost all false. When such data which are mostly erroneous is subjected to error correction, error correction using the second error correction code is hardly successful, and rather the number of miscorrections increases, and error correction using the third error correction code cannot be expected. Because of the above-described control, when a bust error occurs, the burst error correction capability of the third error correction code is fully utilized to correct the burst error.

In the second embodiment described above, it may be so arranged that if a burst error is detected at the burst error detecting means, when errors in received or reproduced digital data are corrected at the third error correcting means, error-detection flags set by the first error correction means are used to correct errors in data residing on a plane on which the burst error is detected, and error-detection flags set by the second error correcting means are used to correct errors in digital data residing on a plane on which no burst error is detected. Accordingly, in the event of a burst error, the burst error can be corrected reliably by the third error correction code.

As described above, if error correction is performed using the results of error correction based on the second error correction code in the event of a burst error, almost all the data in the track where a bust error has occurred will be error detection, in the case of the code configuration which will be described in connection with Embodiment 1 or 2. It is therefore not possible to correct the burst errors by means of the error correction using the second error detection flags. By the use of the configuration set forth above, when a bust error occurs, the burst error can be corrected by fully utilizing the error correction capability of the third error correction code (the error correction decoding is achieved without degrading the burst error correction capability). while when random errors occur, the error correction of the third error correction code can be fully utilized against the random errors as well, by using the error detection flags set as a result of the application of the second error correction code. Thus, error correction can be achieved successfully against either of burst errors and random errors.

In the second embodiment described above, it may be so arranged that when a burst error is detected error correction based on the third error correction code is executed at the third error correcting means, a maximum correctable number of erasures is varied between when a burst error is detected in the data block at the burst error detecting means and when no burst error is detected. Accordingly, when the minimum hamming distance of the third error correction code is shorter than that of the second error correction code, if random errors occur, part of the error correction capability of the third error correction code can be assigned to error detection. Occurrence of errors undetected by the third error correction code can therefore be reduced effectively. For correcting a burst error caused by drop-outs, the error correction capability of the third error correction code is used fully. The burst error correction capability of the third error correction code is therefore utilized fully to correct a burst error.

According to a further aspect of the invention, there is provided a digital signal recording device wherein intra-frame or -field coded or inter-frame or -field coded digital video and audio signals input in the form of transport packets are transparent-recorded. first the intra-frame or field coded digital video signal (hereinafter referred to as intra-picture signal) is separated from the transport packets. High-frequency components are removed from the intra-picture signal having been separated, and the recording rate is then compressed. The intra-picture signal whose recording rate has been compressed is re-configured to generate special playback data. The data of the transport packets having been input is re-configured, and converted into sync block formats. When the special playback data is recorded, the special playback data is disposed on traces on the recording media scanned by a head at a predefined, fast playback speed. The areas for recording the error-correction codes are also disposed on the scanning traces of the head. Either the error-correction code appended to the special playback data or the error-correction code appended the recording data obtained by conversion into the sync block format is recorded in the area for recording the error correction code. The recording format is configured such that an identification signal identifying the error correction code recorded in the error correction code recording area is appended to the recording signal, and recorded. Accordingly, the limited appended data recording area (special playback data recording area, error correction code recording area and the like) can be effectively utilized.

For instance, where the digital signal recording device is used as a consumer device, and image data such as the above-mentioned ATV signal (or signal employing a method of compression based on motion compensated prediction represented by MPEG1 or MPEG2 (method of compression in which image data is restored by referring to other image data when decoding one picture of image data)) is recorded, the error correction code for special playback data, for example, is recorded in the recording area for the error correction code. Where the digital signal recording device is one for professional use, or used as an external recording device for a computer or the error correction code appended to normal playback data is appended in the error correction code recording area. Since powerful error correction code can be appended to the desired data with the identical recording format, and the identification signal is recorded in the recording signal, it is possible to perform compatible playback (playback by the use of another compatible device) with a digital signal recording/playback device having only one of the decoders of the above-mentioned error correction codes, by identifying the type of the error correction code recorded in the error correction code recording area.

Furthermore, the error correction code recording area is used in common with the area for recording the error correction code appended to the normal playback data and the error correction code appended to the special playback data, and switched depending on the intended use, the error correction code recording area within the limited appended data recording area can be reduced, and for that amount the area for recording the special playback data can be increased, the recording rate of the special playback data can be increased, and the picture quality during the special playback can be improved.

It may be so arranged that where, for instance, the data transmitted in the transport packets represented by MPEG2 and recorded in a digital VTR represented by the SD standard. and when the sync block formats are generated by the recording format generating means, m transport packets having been input are used to generate n lines of sync blocks of data. The recording format on the recording media is configured such that the data of n sync blocks is disposed on the same track when the data of the sync block formats obtained by conversion is recorded on the recording media. Accordingly, the data of the transport packets can be converted efficiently into sync blocks. Moreover, the n sync blocks of data is completed within one track, so that when the data of the sync block format is converted into the data of transport packets during playback, it is possible to separate into the sets of n sync block formats using the track information such as the track identification signal and the sync block number, and the size of the circuit in the playback system, in particular, can be reduced. Furthermore, it is not necessary to record the n sync block identification signal, and the data recording area can be utilized effectively.

It may be so arranged that when the input intra-picture data is used at the special playback data generating means to generate the special playback data, the special playback data is generated in the form of the input transport packets. The special playback data generated in the form of the transport packets is, at the time of recording, converted into sync block format like the transport packets having been input, and then recorded. Accordingly, when fast playback is performed by a digital signal playback device, a circuit for generating transport packets is not required, and it is possible to share the circuit for converting the sync block format for playback into transport packets, and the size of the circuit in a playback-only device, in particular, can be reduced.

It may be so arranged the recording area for the error correction code is disposed adjacent to the special playback data recording area. Accordingly, it is possible to reproduce the error correction code recording area together with the special playback data, without fail, during fast playback, so that the special playback data and the error correction code can be efficiently disposed on the recording media, and it is possible to realize a data disposition which is immune to the effects of track non-linearity or the like.

It may be so arranged that when the data having been transmitted in the transport packets represented by the MPEG2 is recorded in the digital VTR represented by the SD standard, and the sync block formats are generated at the recording data generating means, n lines of sync blocks of data is generated using the m transport packets. The identification signal for identifying the data recorded in the error correction code recording area is transmitted using a recording area provided at the data recording part which remain when the transport packets are converted into the sync block formats at the recording data generating means. Accordingly, it is not necessary to newly provide a recording area for transmitting the identification signal, and the recording data can be generated efficiently. Moreover, the recording data for the special playback data is thereby increased, and the picture quality of-the fast playback image is improved.

It may be so arranged that when the error correction code is appended to the output of the recording data generating means, the output of the recording data generating means and the output of the part or entirety of the special playback data generating means, to configure the data block. Interleaving is applied to a collection of a plurality of data blocks to configure the error correction code for the normal playback. Accordingly, when the ares for recording the special playback data are repeated at a period of a plurality of tracks, and control is so made that the error correction code is appended only to the normal playback data. it is not possible to efficiently configure the data blocks and the maximum burst error correction capability may vary from one track to another. and the size of the circuit may be increased unnecessarily, but by forming the data block using part of the special playback data or the entirety of the data, the freedom in configuring the data blocks is increased, and for that amount the size of the circuit for the data block configuration can be reduced, and the maximum burst error correction capability can be made uniform between different tracks.

BRIEF DESCRIPTION OF THE DRAWINGS

In the accompanying drawings:

FIG. 9 is a diagram for explaining overlapping areas in a plurality of fast playback speeds;

FIG. 11 shows the scanning traces of two rotary heads in 5× speed playback mode of the conventional digital VTR;

FIG. 12 shows the locations of areas on a track in the conventional digital VTR;

FIG. 17A shows a transport packet in an input bit stream;

FIG. 17B shows a record data block (sync block format) to be recorded on magnetic tape;

FIG. 18A and FIG. 18B show the numbers of sync blocks that can be reproduced from one track at various fast playback speeds in fast playback mode;

FIG. 32A to FIG. 32C are diagrams for explaining burst error detection in Embodiment 2;

FIG. 37 shows a track pattern of a period of four tracks including the disposition of the special playback data recording area in Embodiment 4;

FIG. 38 shows a recording format on a magnetic tape in Embodiment 4;

FIG. 39A to FIG. 39G show a method of configuring the data blocks at the time of generating the error correction code appended to the normal playback data in Embodiment 4;

DETAILED DESCRIPTION OF THE PREFERRED EMBODIMENTS

Embodiment 1

Figure 13:
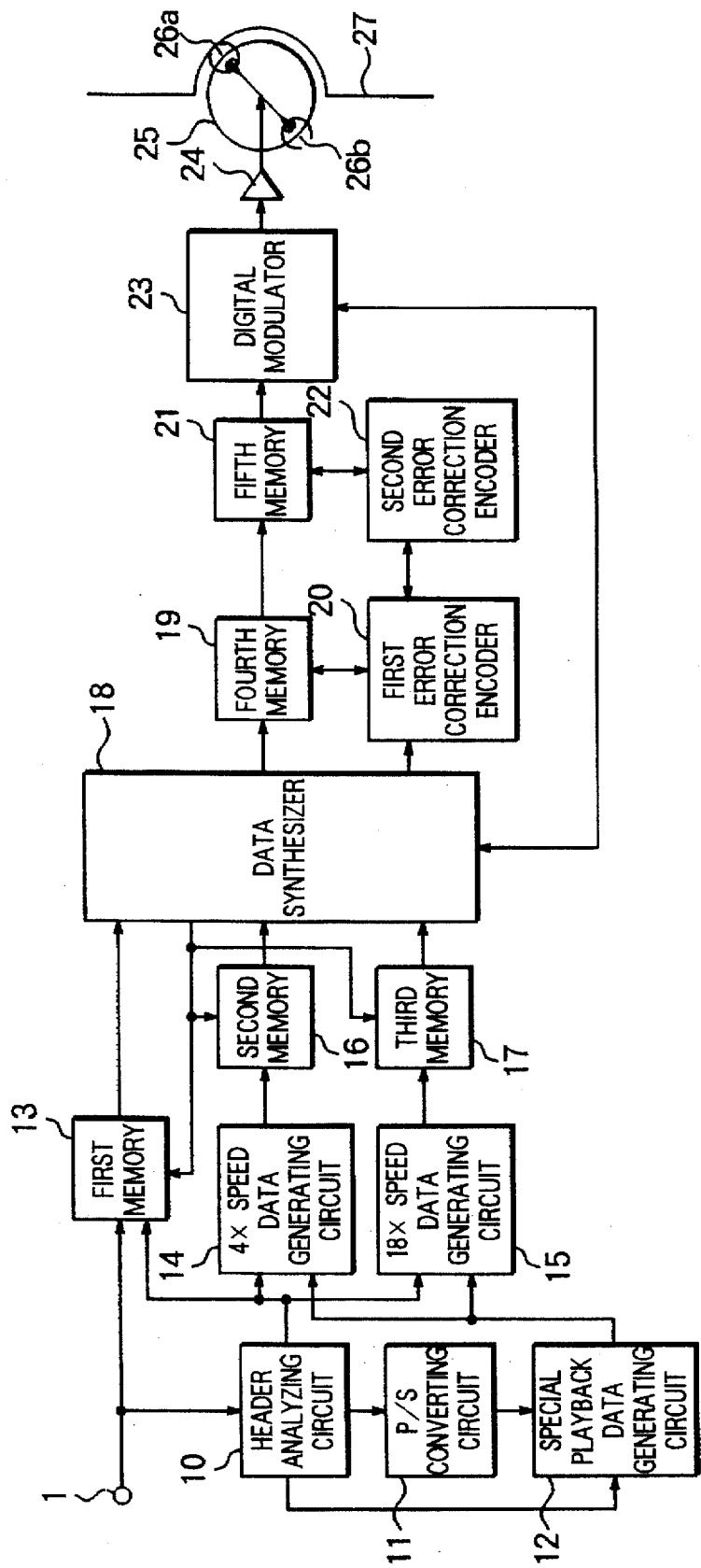
FIG. 13 is a block diagram showing a recording system of a digital VTR in accordance with Embodiment 1.

FIG. 13 is a block diagram showing the configuration of a recording system in a digital VTR of Embodiment 1 of the present invention. In the drawing, reference numeral 1 denotes a transport packet input terminal. A header analyzing circuit 10 is for detecting a transport header of a transport packet, also detecting a sequence header, picture header, and other headers in a bit stream, and separating intra-frame or -field coded data. A parallel-to-series converting circuit (hereinafter referred to as P/S converting circuit) 11 is for performing parallel-to-serial conversion on input transport packets to produce a bit stream. A special playback data generating circuit 12 for extracting a bit stream representing an intra-frame or -field coded picture (which will be referred to as an intra picture) on the basis of header information detected by the header analyzing circuit 10, and then producing special playback data to be reproduced at a 4× or 18× speed.

A first memory 13 is for temporarily storing transport packets received through the input terminal 1 and restructuring data according to a sync block format shown in FIG. 17B at the time of output (the details will be described later). A 4× speed data generating circuit 14 uses 4× speed playback data supplied from the special playback data generating circuit 12 to produce special playback transport packets for 4× speed playback. A 18× speed data generating circuit 15 uses 18× speed playback data supplied from the special playback data generating circuit 12 to produce special playback transport packets for 18× speed playback.

A second memory 16 is for temporarily storing 4× speed playback data fed in the form of a transport packet and restructuring data according to a sync block format at the time of output of the data (See FIG. 17A and FIG. 17B. The details will be described later). A third memory 17 is for temporarily storing 18× playback data fed in the form of a transport packet and restructuring data according to a sync block format at the time of output of the data (See FIG. 17A and FIG. 17B. The details will be described later).

A data synthesizer 18 is for re-arranging the input transport packets supplied from the first memory 13 and the special playback data supplied from the second memory 16 and third memory 17 into a predefined sync block order (the various kinds of data are restructured according to the sync block format shown in FIG. 17B in the first memory 13, second memory 16, and third memory 17 and then fed to the data synthesizer 18). Reference numeral 19 denotes a fourth memory. A first error-correction encoder 20 is for producing error correction codes (hereinafter referred to as C4 check codes) to be appended to record data (hereinafter referred to as record data or record digital data) stored in the fourth memory 19. A fifth memory 21 is for storing record data to which error correction codes have been appended by the first error-correction encoder 20. A second error-correction encoder 22 is for appending error correction codes (C1 check codes and C2 check codes) to the record data stored in the fifth memory 21 in a horizontal direction and perpendicular direction respectively that are defined under the SD standard.

Figure 4:
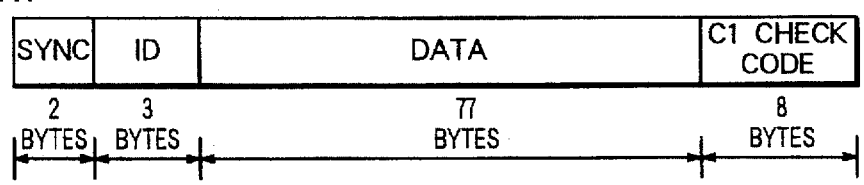
FIG. 4 shows the structure of one sync block conforming to the SD standard.
Figure 5A:
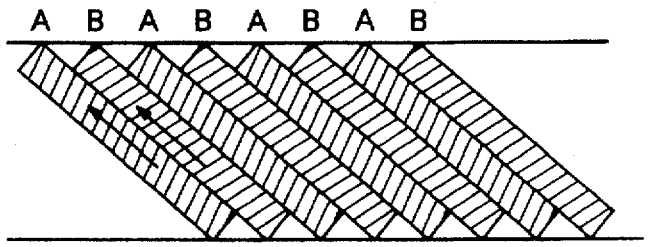
FIG. 5A and FIG. 5B show the scanning traces of the rotary heads in the normal playback and fast playback modes in a conventional digital VTR.
Figure 5B:
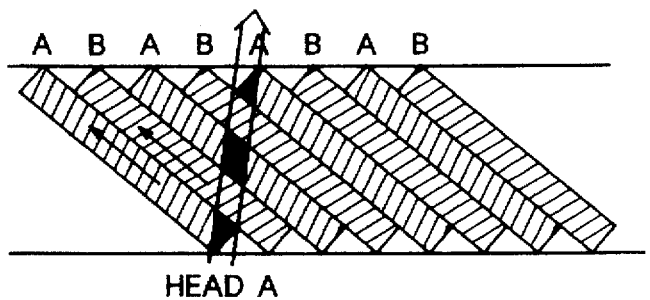
Figure 6:
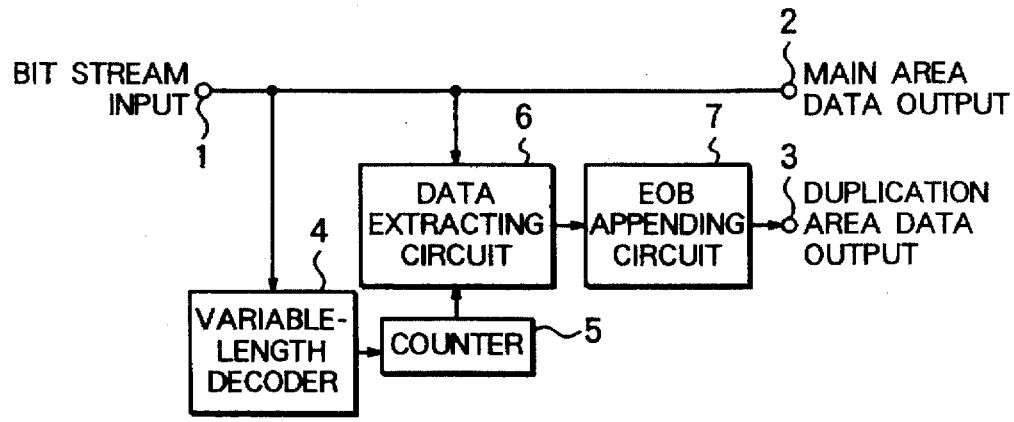
FIG. 6 is a block diagram showing the configuration of the conventional digital VTR capable of fast playback.

A digital modulator 23 is for digitally modulating record data that is supplied from the fifth memory 21 with error correction codes appended. ID information and sync information shown in FIG. 4 are appended to each sync block data when fed to the digital modulator 23. Reference numeral 24 denotes a recording amplifier, and 25 denotes a rotary drum. A rotary head 26a is for recording or reproducing data onto or from A tracks. A rotary head 26b is for recording or reproducing data onto or from B tracks. Reference numeral 27 denotes magnetic tape.

Figure 14:
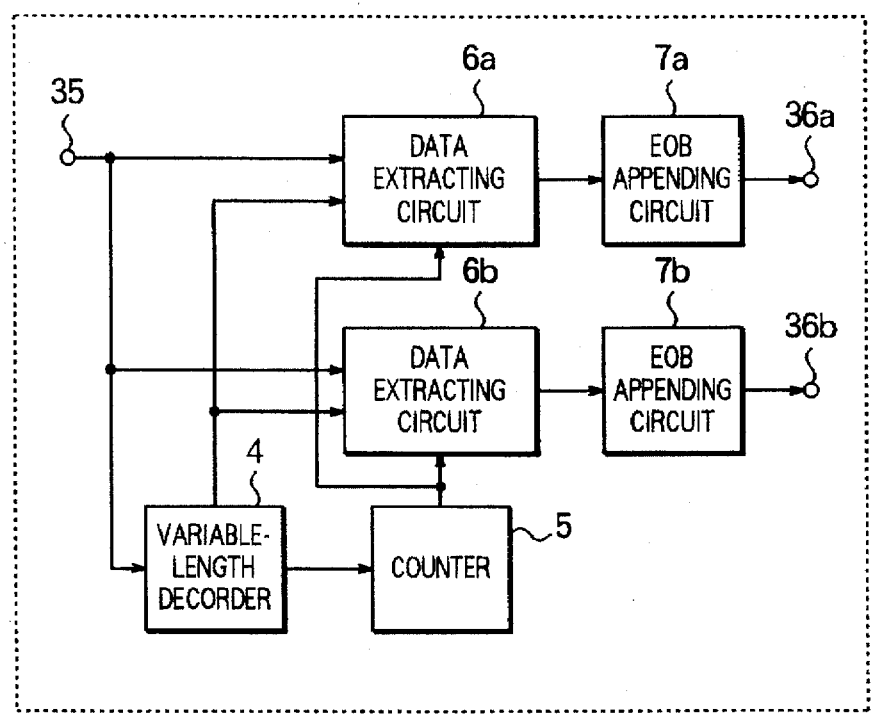
FIG. 14 is a block diagram showing a special playback data generating circuit in Embodiment 1.

FIG. 14 is a block diagram showing the special playback data generating circuit 12 in Embodiment 1. In the drawing, reference numerals identical to those in the prior art example denote identical or corresponding elements. Reference numeral 35 denotes an input terminal through which a bit stream representing an intra picture that is an intra-frame or -field coded picture is received. Output terminals 36a and 36b are for outputting 4× speed playback data and 18× speed playback data, respectively. A variable-length decoder 4 is for applying a variable-length decoding to input intra pictures. Reference numeral 5 denotes a counter. Data extracting circuits 6a and 6b are for extracting 4× speed playback data and 18× speed playback data respectively from the input bit steam of intra data. EOB appending circuits 7a and 7b are for appending end-of-block (hereinafter EOB) codes to the end of each DCT block.

Figure 15:
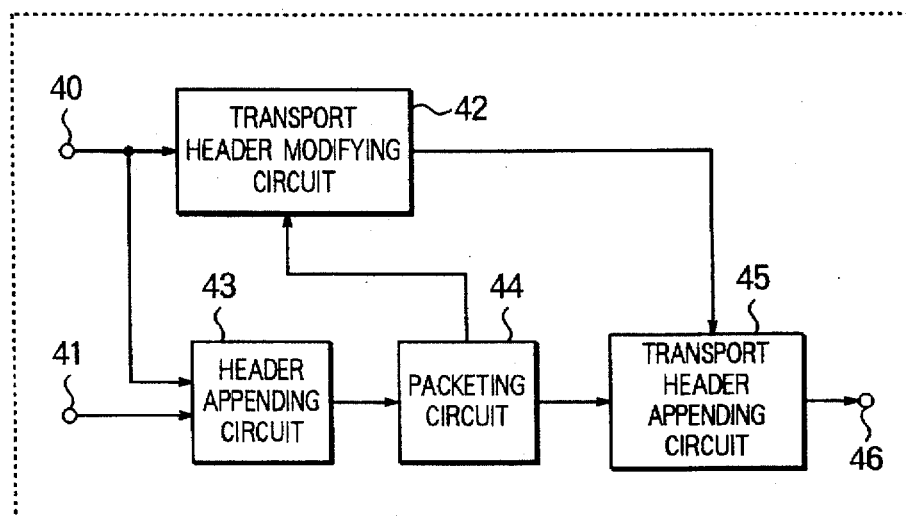
FIG. 15 is a block diagram showing a 4× speed data generating circuit in Embodiment 1.

FIG. 15 is a block diagram showing the 4× speed data generating circuit 14 in Embodiment 1. The 4× speed data generating circuit 14 and 18× speed data generating circuit 15 have the same circuit configuration. In Embodiment 1. detailed description of the 18× speed data generating circuit 15 will therefore be omitted. In the drawing, reference numeral 40 denotes an input terminal through which header information representing transport headers, sequence headers, picture headers and the like, as well as additional information including a quantization table which are from the header analyzing circuit 10 are received. Reference numeral 41 denotes an input terminal through which 4× speed playback data supplied from the special playback data generating circuit 12 is received. A transport header modifying circuit 42 is for modifying a transport header fed through the input terminal 40 and outputting a resultant header. A header appending circuit 43 is for appending header information representing sequence headers, picture headers and the like detected by the header analyzing circuit 10 as well as the additional information (including a quantization table) required for decoding 4× speed playback data, to 4× speed playback data sent from the special playback data generating circuit 12. A packeting circuit 44 is for performing serial-to-parallel conversion on the bit stream data output from the header appending circuit 43 to produce data in which one byte consists of eight bits, and forming data part of each transport packet by collecting data of 184 bytes long. A transport header appending circuit 45 is for appending a transport header sent from the transport header modifying circuit 42, to the data in a transport packet produced by the packeting circuit 44.

Figure 16:
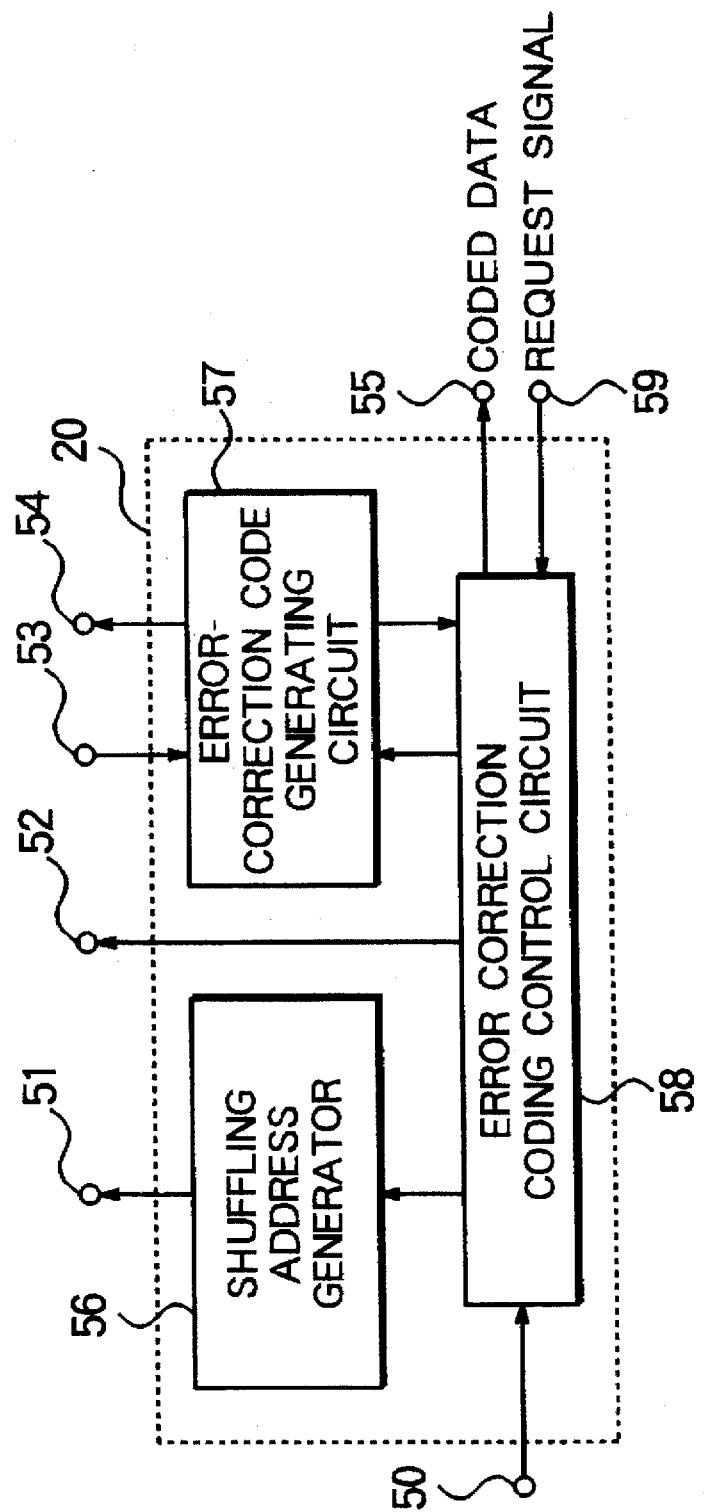
FIG. 16 is a block diagram showing a first error-correction encoder in Embodiment 1.

FIG. 16 is a block diagram showing the first error-correction encoder 20 in Embodiment 1. In the drawing, reference numeral 50 denotes an input terminal through which a control signal is received from the data synthesizer 18. An output terminal 51 is for a memory address output from a shuffling address generator 56. An output terminal 52 is for a control signal for controlling writing or reading of data into or from the fourth memory 19 is supplied. Reference numeral 53 denotes an input terminal through which data read from the fourth memory 19 is received. Reference numeral 54 denotes an output terminal through which data (C4 check codes) is supplied to the fourth memory 19. Reference numeral 55 denotes an output terminal through which a control signal is supplied to the second error-correction encoder 22. The shuffling address generator 56 produces a shuffling address on the basis of address information sent from an error-correction coding control circuit 58. An error correction code generating circuit 57 is for producing third error correction codes (C4 check codes) using data supplied from the fourth memory 19. An error-correction coding control circuit 58 is for controlling the first error-correction encoder 20. Reference numeral 59 denotes an input terminal through which a coded data request signal is received from the second error-correction encoder 22.

FIG. 17A and FIG. 17B show a sync block format in Embodiment 1. FIG. 17A shows a transport packet contained in an input bit stream (or data). FIG. 17B shows a record data block to be recorded on the magnetic tape 27. A bit stream received through the input terminal 1 contains a digital video signal, digital audio signal, and digital data concerning the video signal and audio signal. These signals and data are transmitted in the form of a transport packet shown in FIG. 17A. A packet is composed of a header of four bytes long and a data part of 184 bytes long.

In Embodiment 1, a bit stream is detected in transport packet units. Two detected transport packets are, as shown in FIG. 17B, transformed into a record data block (according to a sync block format) composed of five sync blocks. In the drawing, H1 denotes a first header. H2 denotes a second header. Recorded in the header H1 is identification data indicating a sync block number of the sync block of the five sync blocks (For details of one sync block, see FIG. 4). Recorded in the header H2 is identification data indicating whether data concerned is video data or audio data, i.e., and the like.

FIG. 18A shows the numbers of sync blocks that can be reproduced from one track at different fast playback speeds in fast playback mode. In the drawings, the numerical values denote the numbers of sync blocks that can be reproduced from one track at the playback speeds in special playback mode in which a rotary head of 10 µm is used (incidentally, a track pitch is defined as 10 µm under the SD standard). Calculation is performed on the assumption that the number of sync blocks on one track (corresponding to 180° arc) is 186 and the part of the playback signal whose output level exceeds −6 dB is acquired, as in the prior art example.

Figure 19:
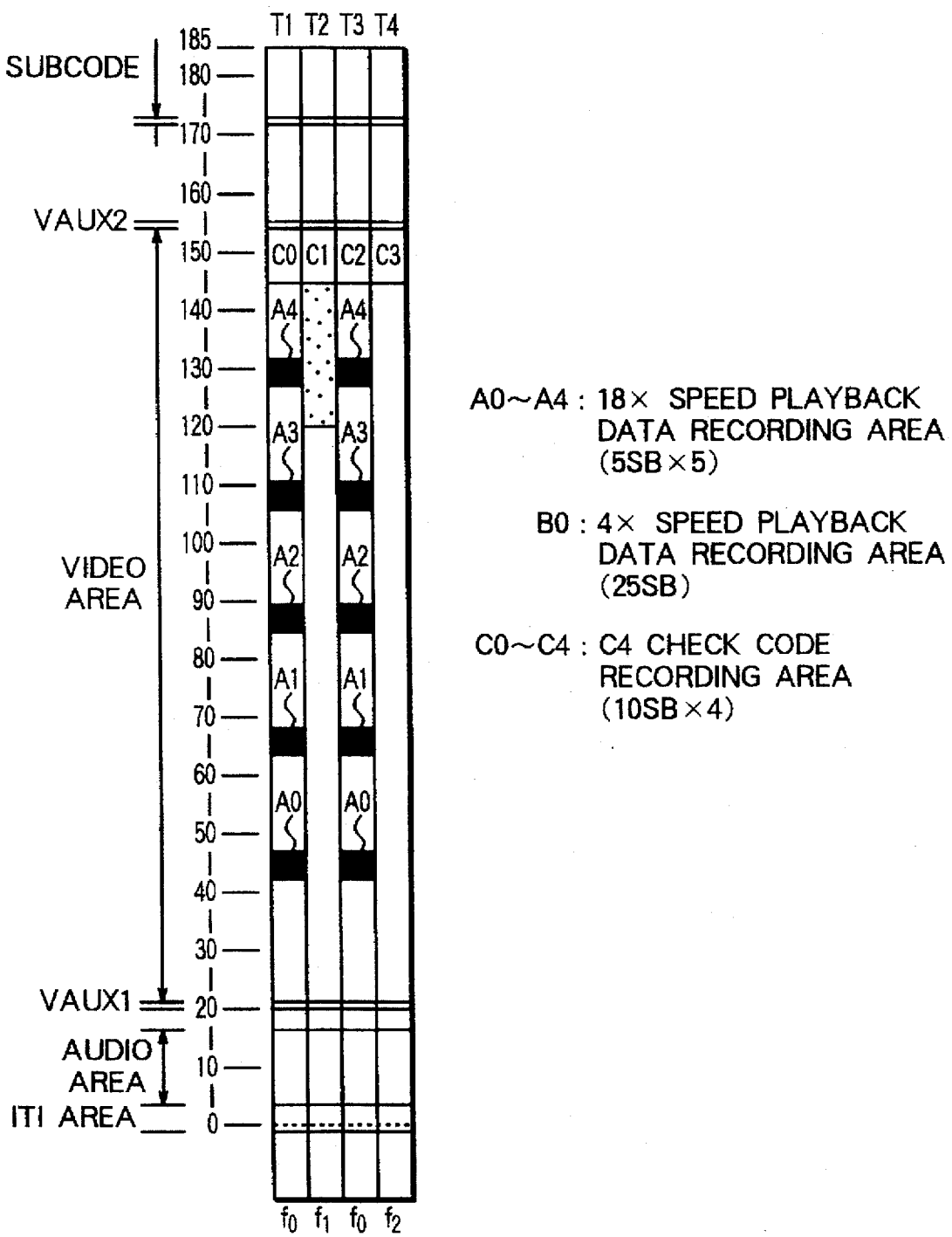
FIG. 19 shows a pattern of tracks, with a four track period, including the location of the special playback recording area in Embodiment 1.
Figure 20:
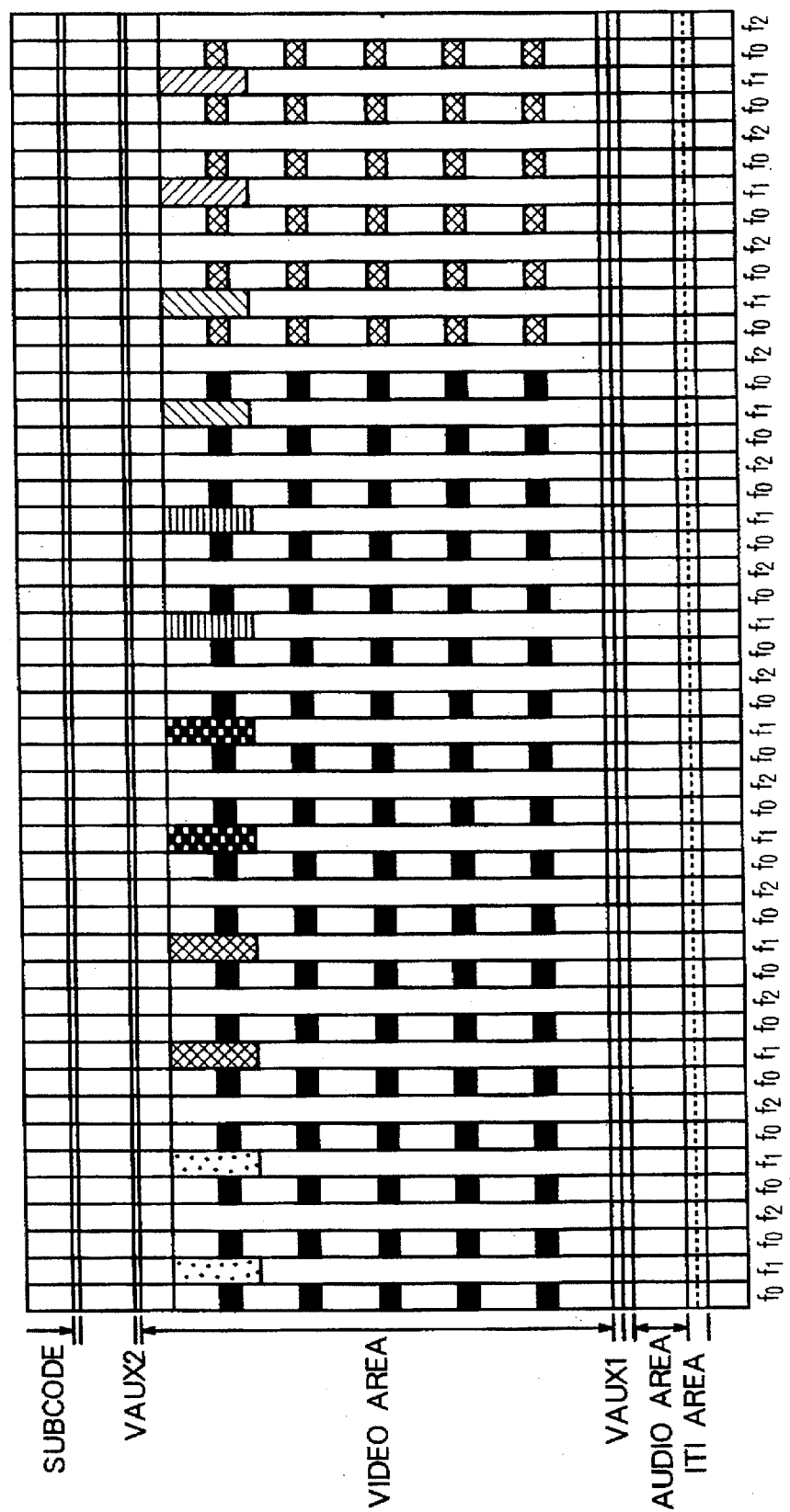
FIG. 20 shows a recording format on magnetic tape in Embodiment 1.

FIG. 19 shows a track pattern of four track interval, including the disposition of the special playback data recording areas according to Embodiment 1. As illustrated, recording areas for a bit stream (hereinafter referred to as normal playback data), and recording areas for special playback data and third error correction codes (C4 check codes) are repeated at an interval of four tracks. Each group of four tracks will be hereafter called a track format. FIG. 20 shows locations of data in four-track units (data of one track format data) on the magnetic tape 27, shown in FIG. 19.

Referring to FIG. 18A to FIG. 20, a recording format in Embodiment 1 will be described. Hereinafter, tracks on which data is recorded by the rotary head 26a will be referred to as A tracks, and tracks on which data is recorded by the rotary head 26b will be referred to as B tracks. In FIG. 19, reference numeral T1 denotes a first track on which data is recorded by the rotary head 26a of channel A. T2 denotes a second track on which data is recorded by the rotary head 26b of channel B. T3 denotes a third track on which data is recorded by the rotary head 26a of channel A. T4 denotes a fourth track on which data is recorded by the rotary head 26b of channel B. in Embodiment 1, data is recorded on magnetic tape according to the aforesaid pattern of four tracks of the first to fourth tracks; that is, a track format. In FIG. 19, f0, f1, and f2 written under the tracks indicate kinds of pilot signals recorded on the tracks as reference signals used for tracking control during playback. In Embodiment 1, the normal playback data, special playback data, and C4 check codes are recorded in a video area consisting of 135 sync blocks except a C2 check code recording area and VAUX data recording areas.

In FIG. 19, reference numerals A0 to A4 denote the locations of 18× speed playback data recording areas on the magnetic tape 27. Each of the 18× speed playback data recording areas (A0 to A4) is five sync blocks long. Five 18× speed playback data recording areas are, as illustrated, defined on each A track (T1 or T3). In the drawing, areas bearing the same reference numeral contain the same data.

Similarly, reference numeral B0 denotes the location of the 4× speed playback data recording area on the magnetic tape 27. The 4× speed playback data recording area is 25 sync blocks long and located on the track T2 alone. C0 to C3 denote the locations of C4 check code recording areas on the magnetic tape 27. Each C4 check code recording area is ten sync blocks long and provided on each track.

The number of sync blocks allocated to each data recording area is determined on the basis of the data shown in FIG. 18A. As apparent from FIG. 18A, in 4× speed playback mode, 62 sync blocks can be reproduced from each track. In 18× speed playback mode, 10.9 sync blocks can be reproduced from each track. FIG. 19 shows allocation of data for the respective the special playback speeds onto the magnetic tape 27 on the basis of the data shown in FIG. 18A. Data is recorded on the magnetic tape 27 by repetitively recording the track format shown in FIG. 19.

FIG. 20 shows a recording format in Embodiment 1. In Embodiment 1, the information in the area B0 is used to achieve fast playback at a 4× speed. The information in the areas A0 to A4 is used to achieve fast playback at a 18× speed. As for the area B0, the same special playback data is, as shown in FIG. 20, recorded repetitively in two track formats. As for each of the areas A0 to A4, the same data is recorded repetitively in nine track formats. As for the area B0, the same data is recorded twice, with eight tracks forming an interval or period. As for each of the areas A0 to A4, the same data is recorded eighteen times, with 36 tracks forming an interval or period. In the A0 to A4 areas and B0 areas hatched (or shaded) with the same patterns in FIG. 20, the same special playback data is recorded.

Next, a method of recording error correction codes which features the present invention will be described. As was described in conjunction with the prior art example, an ATV signal (or DVB signal, or the like) is subjected to data compression based on motion-compensated prediction. When errors occur in playback data in normal playback mode, since the playback data is acquired from an ATV signal, the errors propagate over a plurality of fields or frames. This results in an impaired view. When a digital VTR conforming to the SD standard is used as a storage media for storing data or programs for a computer or the like, some data may not be reproduced due to drop-outs caused by scratches or dust on the magnetic tape 27. For restoring the data, it is desired to apply a more powerful error correction code.

Figure 21:
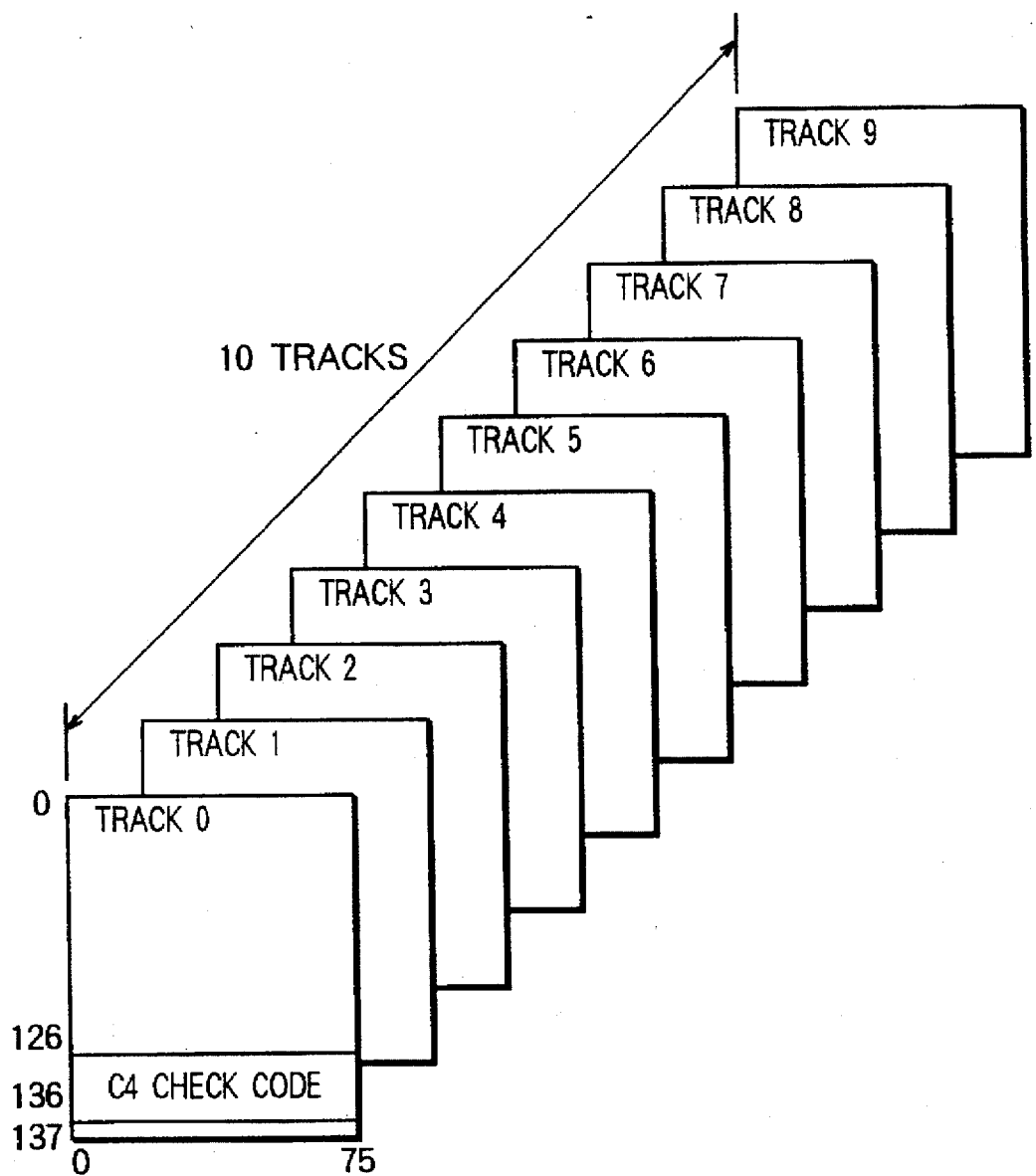
FIG. 21 shows the structure of a data block composed of data for ten tracks in Embodiment 1.

Description will be made of a method of producing C4 check codes to be recorded in error correction code recording areas. In Embodiment 1, data from ten tracks is collected and interleaved to produce C4 check codes. A block structured by collecting data from ten tracks in the course of producing C4 check codes will be referred to as a data block. A (138, 128, 11) Reed-Solomon code is used as the C4 check code. FIG. 21 shows a data block structured using data on ten tracks for the purpose of interleaving. In the drawing, sync block numbers written vertically in the drawing are assigned to sync blocks constituting a video data area in ascending order, starting from 0 which is assigned to VAUX data at the leading sync block (sync block address 19) in the video area shown in FIG. 2. Likewise, data numbers written horizontally are assigned to record data except the header H1 in the sync block format shown in FIG. 17B. In Embodiment 1, as shown in FIG. 21, C4 check codes are produced in relation to record data except the ID, sync data, C1 check codes, C2 check codes, and the headers H1 shown in FIG. 17B, which are recorded in a video data area. However, the present invention is not limited to such a configuration.

Figure 22:
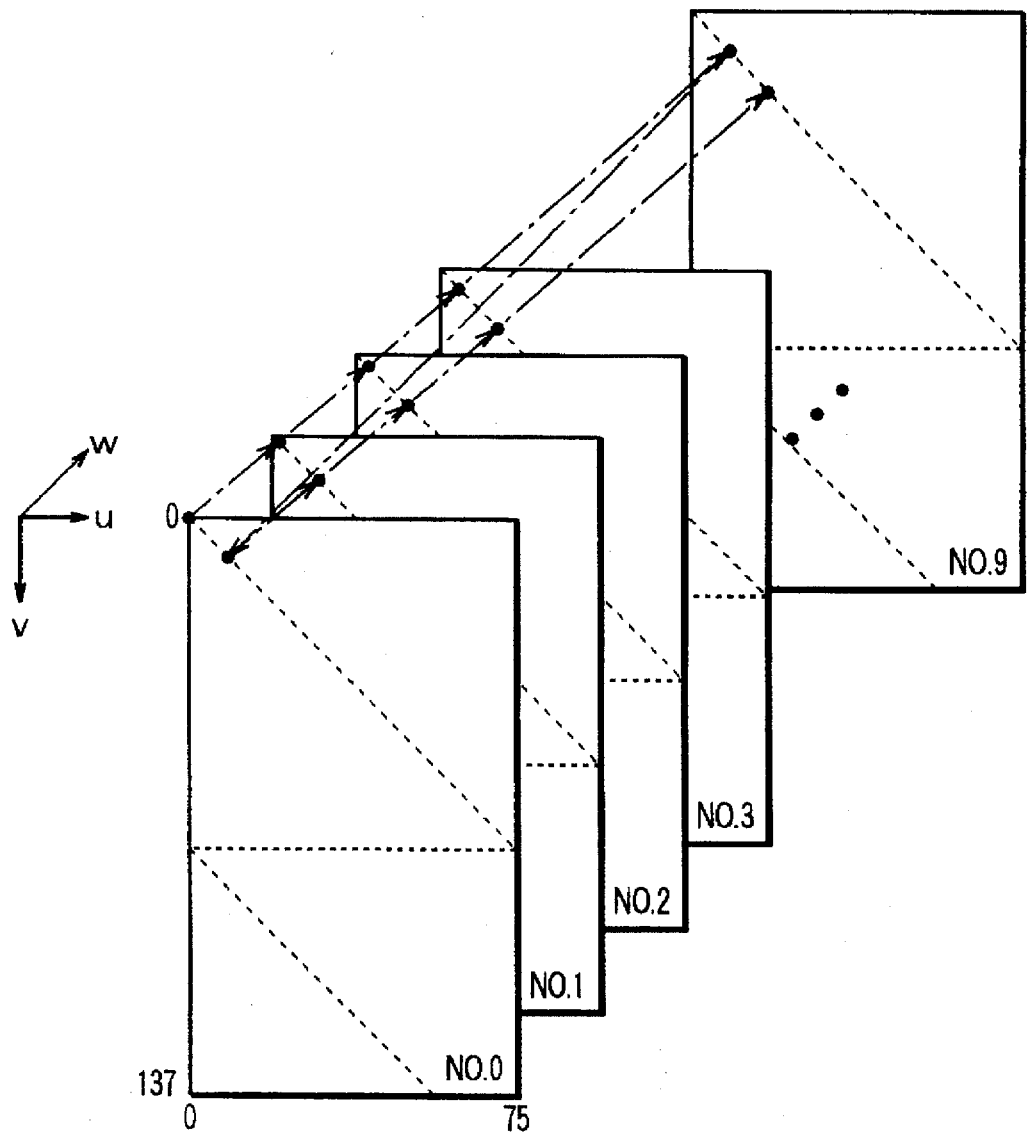
FIG. 22 is a diagram for explaining conventional interleaving based on a conventional C4 check code in Embodiment 1.

FIG. 22 is an explanatory diagram concerning interleaving to be performed according to the C4 check code in Embodiment 1. Assuming that a track number of a track within a data block for producing C4 check codes is Tn (0≦Tn≦9), a sync block number of a sync block within the track is SBn (0≦SBn≦137), and a data number of data within the sync block is Dn (0≦Dn≦75), data D is defined as [Dn, SBn, Tn]. For interleaving data shown in FIG. 22, the data is arranged as follows:

(D[0, 0, 0], D[1, 1, 1], D[2, 2, 2], ..., D[(j mod 76),j,(j mod 10)], ..., D[50, 126, 6], D[51, 127, 7], ..., D[60, 136, 6], D[61, 137, 7])

where 128 bytes of D[0, 0, 0] to D[50, 126, 6] and D[61, 137, 7] serve as information symbols, and 10 bytes of D[51, 127, 7] to D[60, 136, 6] serve as C4 check codes. FIG. 22 schematically shows the interleaving. Interleaving is applied to data (symbols) in 138 sync blocks located along a chain line in FIG. 22. Dotted lines in FIG. 22 indicate directions of interleaving within each track. The C4 check codes are recorded in sync blocks 146 to 155 within a video area shown in FIG. 2.

The foregoing operation is performed on all data in a leading sync block of each track. When C4 check codes are produced using data starting with the i-th data (with data number i) as counted from the leading sync block, on a k-th track, data is arranged as follows:

(D[i, 0, k], D[(i+1 mod 76), 1, (k+1 mod 10)], ..., D[(i+j mod 76), j, (k+j mod 10)], ..., D[(i+127 mod 76), 127, (k+127 mod 10)], D[(i+128 mod 76), 128, (k+128 mod 10)], ..., D[(i+137 mod 76), 137, (k+137 mod 10)])

The value i is varied from 0 to 75 for each of ten tracks (the value k is varied from 0 to 9). Thus, C4 check codes are produced. In FIG. 22 or the above formulae, (X mod Y) indicates a remainder obtained when an integer X is divided by an integer Y. C4 check codes resulting from the above interleaving are recorded in the predetermined areas shown in FIG. 19.

Next, the burst error correction capability of the conventional C4 check code will be described. As shown in FIG. 22, interleaving and encoding are applied for a depth of ten tracks. The minimum hamming distance in the C4 check code is eleven, and the C4 check code can therefore correct up to ten errors of erasures. In the conventional interleaving, for example, when attention is directed to a distance between each pair of interleaved data on a track number 0 shown in FIG. 22, the distance between symbol D[70, 70, 0] and the next symbol D[4, 80, 0] is small. That is, while the distance between the other symbols is ten sync block plus ten symbols, the distance between the symbols D[70, 70, 0] and D[4, 80, 0] is nine sync blocks plus ten symbols (actually, eight plus five plus one symbols for the C1 check code and sync and ID information are added), and the distance between the symbols D[70, 70, 0]and D[4, 80, 0] is smaller by about one sync block.

In case a long burst error occurs on one track due, for example, to drop-outs in normal playback mode, the error-correction capability of the C4 check code slightly varies depending on the location of the burst error. When a burst error occurs over the adjoining symbols D[70, 70, 0] and D[4, 80, 0] that are separated by a small distance as described above, since the distance is smaller by about one sync block, a correctable burst error becomes shorter accordingly (in practice, shorter by about one sync block). In general, error correction based on the C4 check code is achieved by correcting erasures according to error-detecting flags set as a result of error correction based on the C2 check code (hereinafter referred to as C2 decoding). If the number of errors detected by C2 decoding is not less than a predetermined value, the error correction based on the C4 check code (hereinafter referred to as C4 decoding) is executed, disregarding the error-detecting flags.

If the number of errors detected by C2 decoding is not less than the predetermined value, C4 decoding is executed, disregarding the error-detecting flags set as a result of the C2. In this case, the burst error correction capability of the C4 check code is degraded to about a half because erasure correction is not performed. With the conventional interleaving, if a burst error occurs within one track, the burst error correction capability (a maximum correctable burst-error length) varies by about one sync block depending on the location of the burst error or the start position of a codeword. The same applies to a decoding algorithm according to which erasure correction is not performed during error correction based on the C4 check code. (The decoding algorithm will be described in detail in conjunction with the operations of a playback system.)

Next, the interleaving employed in Embodiment 1 will be described in conjunction with FIG. 23. Like the prior art example, assuming that a track number of a track within a data block for configuring C4 check codes is Tn (0≦Tn≦9), a sync block number of a sync block within the track is SBn (0≦SBn≦137), and data number within the sync block is Dn (0≦Dn≦75), data is defined as D[Dn, SBn, Tn]. In this case, the data is arranged as follows:

(D[0, 0, 0], D[0, 1, 1], D[0, 2, 2], ..., D[5*INT(j/10) mod 76, j, (j mod 10)], ..., D[60, 126, 6], D[60, 127, 7], ..., D[65, 136, 6], and D[65, 137, 7])

where 128 bytes of D[0, 0, 0] to D[60, 126, 6] and D[65, 137, 7] serve as information symbols, and ten bytes of D[60, 127, 7] to D[65, 136, 6] serve as C4 check codes. In the above formulae, INT(X) means an integer contained in a real number. FIG. 23 schematically shows interleaving. Interleaving is performed on 138 sync blocks of data (symbols) in the direction of the arrow. The C4 check codes are recorded in the same areas as those in the prior art example.

The foregoing interleaving is performed for all data in a leading sync block on each track. Assuming that C4 check codes are produced using data starting with the i-th data in a leading sync block on the k-th track, the data is arranged as follows:

(D[i, 0, k], D[i, 1, (k+1 mod 10)], ..., D[(i+5*INT[j/10]) mod 76, j, (k+j mod 10)], ..., D[(i+60 mod 76), 127, (k+127 mod 10)], D[(i+60 mod 76), 128, (k+128) mod 10)], ..., D[(i+65 mod 76), 137, (k+137 mod 10)])

The interleaving is executed by varying the value i from 0 to 75 per track, for each of ten tracks (varying the value k from 0 to 9). Thus, interleaving is executed to produce C4 check codes. In the above formula, (X mod Y) indicates a remainder obtained when an integer X is divided by an integer Y. INT(X) means an integer contained in a real number X. Data that has been interleaved to produce C4 check codes is recorded in predetermined areas shown in FIG. 19.

Next, the burst error correction capability of the C4 check code in Embodiment 1 will be described. As shown in FIG. 23, data on ten tracks is interleaved and encoded. The minimum hamming distance in the C4 check code is 11, and the C4 check code can therefore correct errors up to ten erasures. In Embodiment 1, unlike the prior art example, when attention is directed a distance between each pair of interleaved data on a track of track number 0 shown in FIG. 23, the symbols are disposed at equal interval of 10 sync blocks plus five symbols. In normal playback mode, when a long drop-out occurs (at whichever position on one track a long burst error occurs), the error correcting capability of the C4 check code is exhibited uniformly irrespective of the location of the burst error.

Figure 23:
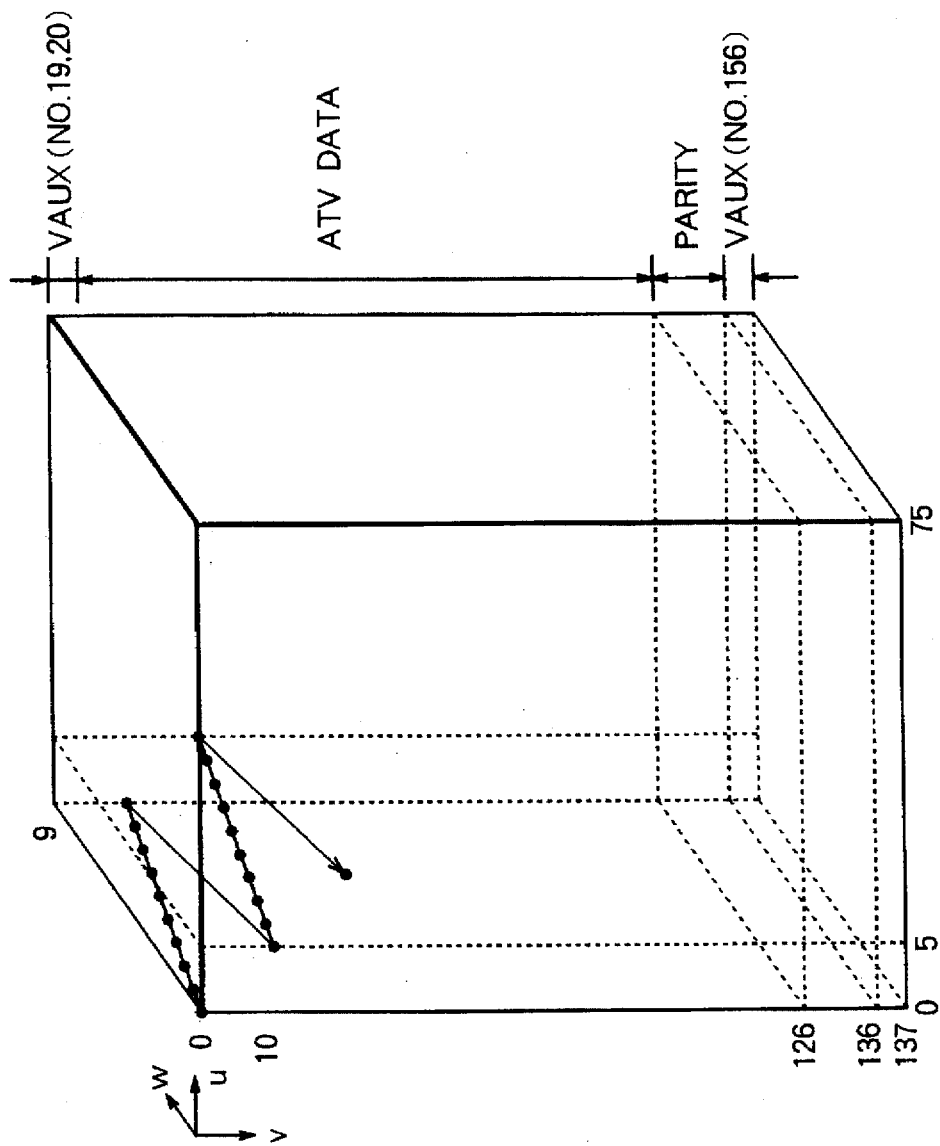
FIG. 23 is a diagram for explaining interleaving in Embodiment 1.

According to the C4 check code, as shown in FIG. 23, interleaving is applied to data blocks each consisting of 138 sync blocks to a depth of ten tracks produce codewords. The minimum hamming distance in the C4 check code is 11, so that C4 check code can therefore correct errors up to ten erasures. If no error is detected on other tracks, the maximum burst error correction capability is 10*10=100 sync blocks. In normal playback mode, even when one hundred sync blocks of data within one track has not been reproduced because of drop-outs, for example, the data can be restored by applying the C4 check code.

In a digital VTR conforming to the SD standard, when the frame frequency is 30 Hz, a digital video signal representing one frame is recorded on ten tracks. Track numbers are appended to ID signals of the ten tracks, on which the data of one frame is recorded, in ascending order from a leading track of the ten track. Specifically, the same number is assigned to each pair of A and B tracks, and track numbers ranging from 0 to 4 are used. In the U.S.A., since the frame frequency is, as well known, 30 Hz, track numbers are assigned in the above-mentioned manner in a digital VTR conforming to the SD standard. In Embodiment 1, interleaving is executed in ten track units, so that it is possible to identify the data block of ten tracks for which the C4 check code has been generated, without appending additional information. In Embodiment 1, since the frame frequency is 25 Hz in PAL or SECAM zone such as Europe, data of one frame is recorded on twelve tracks and track numbers ranging from 0 to 5 are assigned to the tracks. Interleaving is therefore executed in twelve track units.

A general expression in accordance with the present invention will be presented below. Assuming that the number of data in a direction u in FIG. 23 is n1, the number of effective samples in a direction w is n3, the number of information symbols of C4 check code is k2, and the minimum hamming distance in the C4 check code is d3, a codeword V(Z) is expressed by the following polynomial.

$$V(Z) = \sum_{j=0}^{k2+d3-2} D\{[i + \alpha * (INT[j/n3])] \bmod n1, j,$$

$$((k + j) \bmod n3)\} * Z^{k2+d3-2-j}$$

V(Z): polynominal expression of a codeword
D((u, v, w): symbol - - - 0 ≦ u < n1, 0 ≦ v < k2 + d3 − 1, 0 ≦ u < n3
α: 0 < α ≦ n1/(k2 + d3 − 1) * n3

Herein, α denotes a parameter determining the length of data to be interleaved. The value α is determined so that the above condition can be satisfied. When the value α is determined in such a way that error-detection flags set as a result of application of the identical C2 check code in one codeword are not used, a very efficient codeword can be produced. In the above expression, (X mod Y) means the remainder obtained when an integer X is divided by an integer Y. INT(X) indicates an integer contained in a real number X.

Next, the operations of a recording system will be described with reference to FIG. 13 to FIG. 23. A transport packet received through the input terminal 1 is fed to the header analyzing circuit 10 and first memory 13. The header analyzing circuit 10 first detects a transport header in the input transport packet, and then analyzes the input transport header. The header analyzing circuit 10 then separates a program association table (PAT) and program map table (PMT) from the transport stream, and then detects a PID assigned to a program to be recorded in a digital VTR.

The header analyzing circuit 10 separates a transport packet for transmitting video data of a program to be recorded, on the basis of the detected PID number. The information of the transport packet is fed to the first memory 13. The header analyzing circuit 10 analyzes the data in the transport packet, then separates header information such as sequence headers, picture headers, and slice headers. On the basis of the header information, the header analyzing circuit 10 separates intra picture data from the transport packet. Various header information appended to the intra picture (hereinafter referred to as intra picture or intra picture data), and additional information appended to the header information are also separated.

The sequence header is a header appended to a bit stream of the video signal. The header contains information for discriminating between MPEG1 and MPEG2, information indicating an aspect ratio of a picture, information indicating the transfer rate of picture data, and the like. The picture header is a header appended to the start of each frame or field. The picture header points to the start of each frame or field and contains a mode signal representing an encoding mode, a quantization table, and the like. In the MPEG2 system, when one frame of data is transferred, a screen constructed by one frame (field) is segmented into a plurality of slices for data transfer. The slice header points to the start of each slice. (For details of the headers, refer to the draft on the MPEG2 system).

The header information and associated additional information (for example, a quantization table) separated by the header analyzing circuit 10 are supplied to the P/S converting circuit 11, first memory 13, special playback data generating circuit 12, 4× speed data generating circuit 14, and 18× speed data generating circuit 15. Intra picture data extracted by the header analyzing circuit 10 is supplied to the P/S converting circuit 11.

The intra picture data (hereinafter referred to as intra-frame picture data. In the following description, it is assumed that the intra picture data is coded in one frame unit) detected by the header analyzing circuit 10 is supplied to the P/S converting circuit 11, where parallel-to-serial conversion is performed to produce a bit stream data of one bit. The bit stream data of one bit which is a serial data having been obtained by the conversion is fed to the special playback data generating circuit 12.

Referring to FIG. 14, the operations of the special playback data generating circuit 12 will be described. MPEG2-conforming image compression is achieved as follows: discrete cosine transform (hereinafter referred to as DCT) is performed on a video signal in units of a block of eight lines by eight pixels (hereinafter referred to as a DCT block); data that has been subjected to DCT (hereinafter referred to as DCT coefficients) is quantized; and then DCT coefficients are read sequentially by performing zigzag scanning, from low-frequency components of the video signal on which a power spectrum is concentrated, and is subjected to run-length encoding, wherein the length of runs of "0" coefficients is encoded (in this way, the video signal is decomposed into run-length data and coefficient data). The data that has been run-length encoded is then subjected to two-dimensional variable-length coding. Thus, this results in a lowered transfer rate.

The serial data of an intra picture, which has been received through the input terminal 35, is fed to the variable-length decoder 4, and data extracting circuits 6a and 6b. The variable-length decoder 4 performs variable-length decoding on the input bit stream. In Embodiment 1, the input bit stream is not perfectly decoded during variable-length decoding, but the run length of a variable-length codeword and the code length thereof are detected and supplied. This is intended to reduce the size of the circuitry. (Needless to say, variable-length decoding may be accomplished perfectly.) The counter 5 counts the number of DCT coefficients within each DCT block decoded on the basis of the run lengths, and supplies the resultant count values to the data extracting circuits 6a and 6b.

The data extracting circuit 6a extracts variable-length codewords of 4× speed playback data to be transferred (recorded) according to the predefined code amount control information (the number of DCT coefficients to be transferred) of 4× speed playback data (in Embodiment 1, 4× speed playback data is a signal to be recorded in area B0, and 18× speed playback data is a signal to be recorded in areas A0 to A4), and the results of counting sent from the counter 5. An actual data extracting procedure is as follows: the number of DCT coefficients sent from the counter 5 is compared with the code value control information; and then variable-length codewords are then transferred until the number of DCT coefficients reaches the code value control information. A demarcation separating variable-length codewords is detected on the basis of code length information sent from the variable-length decoder 4.

Similarly, the data extracting circuit 6b extracts variable-length codewords of 18× speed playback data according to code value control information of 18× speed playback data, and information sent from the counter 5 and variable-length decoder 4. The EOB appending circuits 7a and 7b then append an EOB code to the end of each of DCT blocks of the extracted data, and then supply the resultant data through the output terminals 36a and 36b. The start of each DCT block is detected by the variable-length decoder 4 and supplied to the counter 5 and the data extracting circuits 6a and 6b.

The number of extracted DCT coefficients may be the same or different between different multiple speeds. When the number of DCT coefficients to be extracted differs between the different multiple speeds, the number of DCT blocks to be recorded in a special playback transport packet differs between the multiple speeds. The number of areas in which special playback data can be recorded is limited as mentioned above. If the special playback data recording areas for the respective special playback speeds consist of the same number of sync blocks, when the number of DCT coefficients to be recorded in one DCT block increases, a larger number of special playback data recording areas becomes necessary. This results in a longer updating period (hereinafter referred to as refresh cycle) of fast playback picture data in fast playback mode. Incidentally, a larger number of DCT coefficients results in a higher the reproduced picture quality. By contrast, a smaller number of DCT coefficients recorded in one DCT block leads to a smaller amount of special playback data per frame, and a smaller number of special playback data recording areas, which in turn result in a shorter refresh cycle of fast playback picture data. However, reproduced picture quality deteriorates because of the smaller number of DCT coefficients. The amount of extracted data for each fast playback speed should be determined by trade-off between the refresh cycle and image quality.

The 4× speed playback data and 18× speed playback data sent from the special playback data generating circuit 12 are fed to the 4× speed data generating circuit 14 and 18× speed data generating circuit 15, respectively. The subsequent processing is the same between the different playback speeds (4× speed and 18× speed). Herein, description will be made of production of 4× speed playback data. The operations of the 4× speed data generating circuit 14 will be described with reference to FIG. 15. The 4× speed data generating circuit 14 uses the transport header information and other various header information (including additional information) sent from the header analyzing circuit 10 and the 4× speed playback data sent from the special playback data generating circuit 12 to produce a transport packet for 4× speed playback.

The transport header information received through the input terminal 40 is supplied to the transport header modifying circuit 42, where the transport header is modified. Specifically, the header information indicating the continuity of transport packets in the transport headers appended to the transport packets carrying intra picture data is rewritten according to intra picture information sent from the header analyzing circuit 10. The header appending circuit 43 appends in the header information of such as sequence headers, picture headers, and slice headers, which has been detected by the header analyzing circuit 10, as well as information from each header needed to decode special playback data (for example, an encoding mode flag or quantization table), to a special playback bit stream received through the input terminal 41 from the special playback data generating circuit 12.

The special playback data with header information appended thereto is subjected to serial-to-parallel conversion by the packeting circuit 44 and thus transformed into data in which one byte consists of eight bits. The resultant data in which one byte consists of eight bits is segmented into units of 184 bytes, whereby data part of transport packet is constructed. During the serial-to-parallel conversion, zeros are inserted in front of each header information so that each header information will fit in four bytes in conformity with the MPEG2 system. (Each header information is 32 bits long. For production of a transport packet, header information must fit in four bytes long.) To be more specific, when header information extend over five bytes (occupying only part of the first and last of the five bytes), zeros are appended in front of the header information so that the header information fits in four bytes. Transport header information from the transport header modifying circuit 42 is appended to transport packet data of 184 bytes configured at the packeting circuit 44, and output. The header information is read from the transport header modifying circuit 42 in synchronism with a timing signal sent from the packeting circuit 44. 4× speed playback data produced by the 4× speed data generating circuit 14 is supplied to the second memory 16 in the form of transport packets.

The above description was made of formation of the 4× speed playback data into transport packets. 18× speed playback data is similarly processed. The 18× speed playback data from the special playback data generating circuit 12 is fed to the 18× speed data generating circuit 15. In the 18× speed data generating circuit 15, the header appending circuit 43 appends headers and additional information according to the header information sent from the header analyzing circuit 10. The packeting circuit 44 carries out serial-to-parallel conversion in the manner described above, to construct data part of transport packets. The transport header appending circuit 45 appends modified transport headers sent from the transport header modifying circuit 52 and then supplies the resultant data to the third memory 17 in the form of transport packets.

The special playback transport packet data sent from the 4× speed data generating circuit 14 and 18× speed data generating circuit 15 are stored in the second memory 16 and third memory 17, respectively. The second and third memories 16 and 17 store the input data in the form of transport packets in the storage area and form special playback data of one frame (field).

Figure 7:
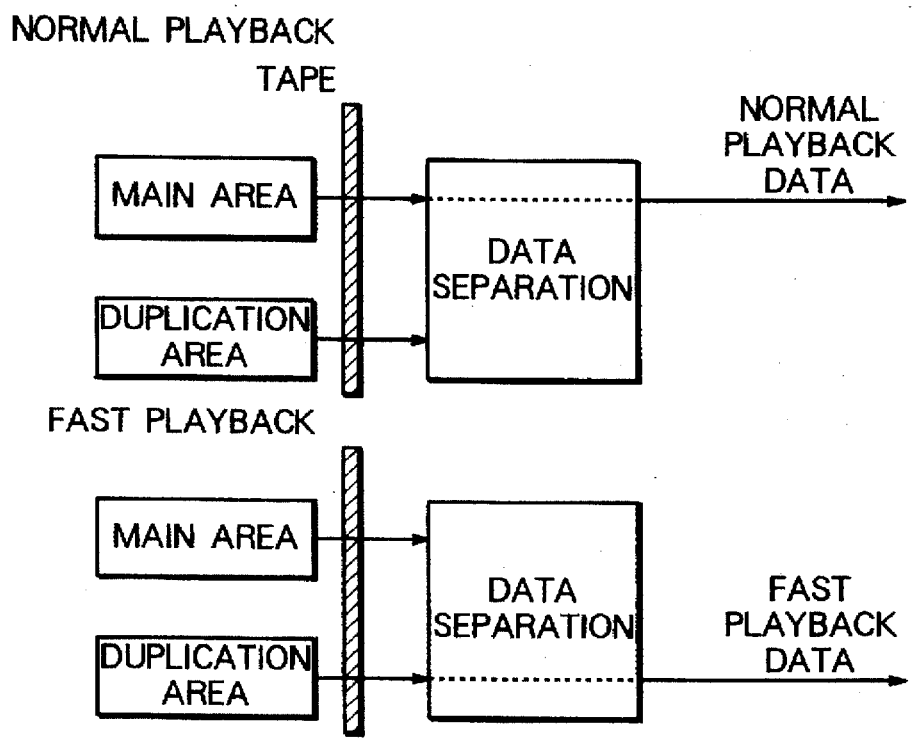
FIG. 7 schematically shows the normal playback and fast playback modes of the conventional digital VTR.

The special playback data of one frame is read from the second memory 16 and third memory 17 in units of two special playback transport packets, in response to a data request signal sent from the data synthesizer 18, and then reconstructed into data of five sync blocks shown in FIG. 7B, and supplied to the data synthesizer 18. At this time, headers H1 and H2 shown in FIG. 17B are appended.

Transport packets received through the input terminal 1 are input and stored in the first memory 13. The input data is read from the first memory 13 in response to a control signal (data request signal) sent from the data synthesizer 18. At this time, data having been input in units of a transport packet is reconstructed into data of five sync blocks shown in FIG. 17B in units of two transport packets, and then output. In the same way as with the special playback data, the H1 and H2 header information is appended to the sync block data when the sync block data is supplied from the first memory 13.

The data synthesizer 18 synthesizes the data supplied from the first memory 13, second memory 16, and third memory 17 according to a recording format. The operations for generating recording format will be described below. The data synthesizer 18 generates the recording format on the basis of a reference signal of the servo system (including tape travel control system and rotary drum control system) which are not illustrated. Specifically, when the reference signal is input, the data synthesizer 18 detects the track number of a track for which a recording format is defined next. according to information sent from a track number detection counter provided in the data synthesizer 18. The data synthesizer 18 also identifies the type of the track (which of the tracks T1 to T4 the track in question is) of which is recorded next, according to track identification information of the track within one track format. When detection is completed, the count values of the counters are incremented by one.

The data synthesizer 18 determines the type of special playback data and recording areas thereof according to the result of the identification for discrimination between the tracks T1 to T4. The number of repetitions of the special playback data for each speed is checked, and when the predetermined number of repetitions is reached, the data request signal is issued so that the next special playback data will be read from a memory containing the corresponding special playback data.

To be more specific, when 18× speed playback data has been recorded repeatedly eighteen times, a data request signal is sent to the third memory 17 so that the next 25 sync blocks of special playback data will be read out. The 25 sync blocks of the 18× speed playback data read from the third memory 17 is temporarily stored in a 18× speed playback data memory incorporated in the data synthesizer 18. At this time, the the number of repetitions of the 18× speed playback data is reset to "0". Likewise, when 4× speed playback data has been recorded twice, a data request signal is supplied to the second memory 16, such that the next 25 sync blocks of special playback data be output. The 25 sync blocks of 4× speed playback data been read from the second memory 16 is temporarily stored in a 4× speed playback data memory in the data synthesizer 18. At this time, the number of repetitions of 4× speed playback data is reset to 0. When the number of repetitions is not more than a predetermined value, special playback data for each playback speed stored in the data synthesizer 18 is used to produce the record data. At this time, the number of repetitions of special playback data is incremented by one.

When checking of the number of repetitions of special playback data is completed, data locations within one track are specified using a track identification signal. When the data locations for one track are specified, bit stream input in sync block units and the special playback data formed from the bit stream for the respective speeds are read from the first memory 13 and data synthesizer 18. One track of record data is thus generated and supplied to the fourth memory 19.

The record data of one track which has been produced by the data synthesizer 18 is temporarily stored in the fourth memory 19. In response to a data synthesis end signal sent from the data synthesizer 18, the first error-correction encoder 20 sends data write addresses and write control signals for storing the data for one track in the fourth memory 19. When the record data for ten tracks has been stored in the fourth memory 19, the first error-correction encoder 20 starts producing C4 check codes. In Embodiment 1, data blocks are configured according to the track number information. Specifically, tracks from track number 0 to track number 9 are collected to structure a data block.

The manner of generating C4 check codes will be described below, with reference to FIG. 16 and FIG. 23. In response to a data synthesis end signal fed through the input terminal 50, the error-correction coding control circuit 58 produces data write addresses and write control signals and writes record data for one track, which has been supplied from the data synthesizer 18, in the fourth memory 19. (The details of the manner of production of the write addresses and write control signals is omitted.) When data for ten tracks (a data block) has been stored (structured) in the fourth memory 19, the error-correction coding control circuit 58 supplies data read addresses and read control signals to the fourth memory 19, and supplies a C4 check code production start signal to each of the shuffling address generator 56 and error-correction code generating circuit 57, so that C4 check codes can be produced. Embodiment 1, the error-correction coding control circuit 58 produces addresses of data before the interleaving (hereinafter referred to as relative addresses) at the time of producing C4 check codes.

The data read addresses generated by the error-correction coding control circuit 58 are fed to the shuffling address generator 56. The shuffling address generator 56 converts the relative addresses supplied from the error-correction coding control circuit 58 into absolute addresses so that data read from the fourth memory 19 will be interleaved as shown in FIG. 23. The absolute addresses provided by the shuffling address generator 56 are sent to the fourth memory 19 via the output terminal 51.

128 symbols of data is read sequentially from the fourth memory 19 and supplied to the first error-correction coding circuit 20 according to the address information (absolute addresses information), which have been interleaved addresses, and read control signals, supplied from the first error correction coding circuit 20. The data read from the fourth memory 19 is fed to the error-correction code generating circuit 57 via the input terminal 53. The error-correction code generating circuit 57 produces C4 check codes on the basis of the input data. When the error-correction code generating circuit 57 completes producing C4 check codes, a C4 check code production end signal is sent to the error-correction coding control circuit 58. The C4 check codes produced by the error-correction code generating circuit 57 are sequentially stored in the fourth memory 19 via the output terminal 54, responsive to control signals sent from the error-correction coding control circuit 58. In response to the end signal, the error-correction coding control circuit 58 produces write addresses (relative addresses) and write control signals which are used to write the C4 check codes in the fourth memory 19.

The shuffling address generator 56 performs conversion into absolute addresses so that the write addresses are interleaved. The C4 check codes are written at predetermined addresses in the fourth memory 19, according to the write addresses and write control signals sent from the first error-correction encoder 20. The first error-correction encoder 20 interleaves all data (symbols) in a data block shown in FIG. 23 and produces C4 check codes.

When production of C4 check codes using all symbols in a data block shown in FIG. 23 is completed, the error-correction coding control circuit 58 sends a C4 check code production end signal to the shuffling address generator 56 and error-correction code generating circuit 57. At the same time, it also sends the C4 check code production end signal to the second error-correction encoder 22 via the output terminal 55. In response to the C4 check code production end signal, the second error-correction encoder 22 reads data with C4 check codes appended thereto, in units of a track. In response to a coded data request signal from the second error-correction encoder 22, data read addresses and control signals are provided by the first error-correction encoder 20. The coded data request signal is output for each track. When the coded data request signal is received via the input terminal 59, the error-correction coding control circuit 58 provides data read addresses and control signals to the fourth memory 19.

Data for one track read from the fourth memory 19 is temporarily stored in the fifth memory 21. Error-correction codes in conformity with the SD standard are produced by the second error-correction encoder 22 and appended to the record data stored in the fifth memory 21 (See FIG. 3A). When data for one track has been structured within the fifth memory 21, the second error-correction encoder 22 first reads out record data perpendicularly and produces C2 check codes. The produced C2 check codes are stored in predetermined addresses in the fifth memory 21. After production of the C2 check codes is completed, the second error-correction encoder 22 reads out record data in the recording direction from the fifth memory 21 and produces C1 check codes. The produced C1 check codes are stored in predetermined addresses in the fifth memory 21.

When the second error-correction encoder 22 completes production of C1 check codes, the record data with the C1 and C2 check codes appended thereto and stored in the fifth memory 21 is read at predetermined timing responsive to a reference signal sent from a servo system (including a tape travel control system and rotary head phase control signal), not shown. Addresses used to read data from the fifth memory 21 and control signals shall be supplied by the second error-correction encoder 22 according to the reference signal. At this time, a track format conforming to the SD standard is formed. Specifically, a gap of five bytes long is interposed between sync blocks for appending a sync signal and ID signal. ITI areas, subcode areas and gaps between data of a predetermined length are preserved. The resultant data is then output (See FIG. 2 and FIG. 4.) The output of the fifth memory is fed to the digital modulator 23.

The digital modulator 23 appends a sync signal and ID signal to the start of each sync block. The ID signal is appended according to the track number information sent from the data synthesizer 18. Data with the ID signals appended thereto is digitally modulated and supplied to the recording amplifier 24. The digital modulation is applied to the record data, selecting one of modulation patterns according to the track identification information (indicating one of T1 to T4) sent from the data synthesizer 18. The data that has been digitally modulated is amplified and then recorded on the magnetic tape 27 by means of the rotary heads 26a and 26b.

Figure 24:
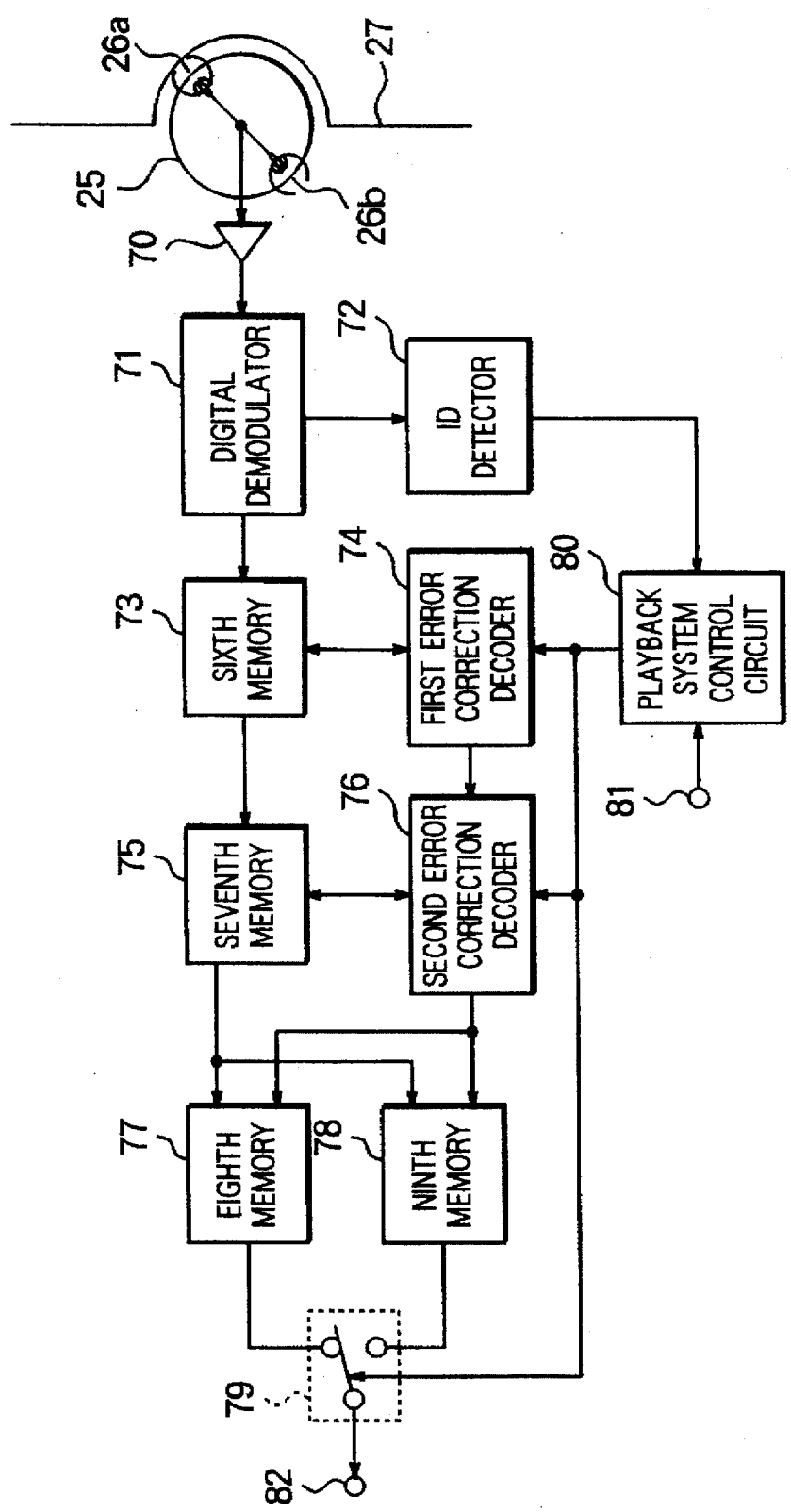
FIG. 24 is a block diagram showing the configuration of a playback system for a digital VTR in accordance with Embodiment 1.

Next, description will be made of the configuration of a playback system in a digital VTR which reproduces data structured according to the aforesaid record format from the magnetic tape 27. FIG. 24 is a block diagram showing the configuration of a playback system in a digital VTR of Embodiment 1. Reference numerals identical to those in FIG. 13 denote identical or corresponding components. In FIG. 24, reference numeral 70 denotes a playback amplifier, and 71 denotes a digital demodulator. An ID detector 72 is for detecting an ID signal in the playback digital signal (hereinafter referred to as a playback digital signal and playback digital data) that has been digitally demodulated. Reference numeral 73 denotes a sixth memory. A first error-correction decoder 74 is for correcting or detecting errors which have occurred in the playback digital signal, according to the C1 check code and C2 check code that are conforming to the SD standard. Reference numeral 75 denotes a seventh memory. A second error-correction decoder 76 is for correcting or detecting errors which have occurred in the playback digital signal, according to the C4 check code in normal playback mode. An eighth memory 77 is for storing a playback digital signal for normal playback. A ninth memory 78 is for storing special playback data. A switch 79 is for selecting either of the outputs of the eighth memory 77 and ninth memory 78 according to a select signal sent from a playback system control circuit 80.

The playback system control circuit 80 is for informing the first error-correction decoder 74, second error-correction decoder 76, and switch 79 of the playback mode set in the digital VTR according to the mode signal sent via the input terminal 81, and for outputting the result of detection of the ID signal from the ID detector 72 to the first error-correction decoder 74 and second error-correction decoder 76. Reference numeral 81 denotes an input terminal through which a mode signal is received, and 82 denotes an output terminal.

Figure 25:
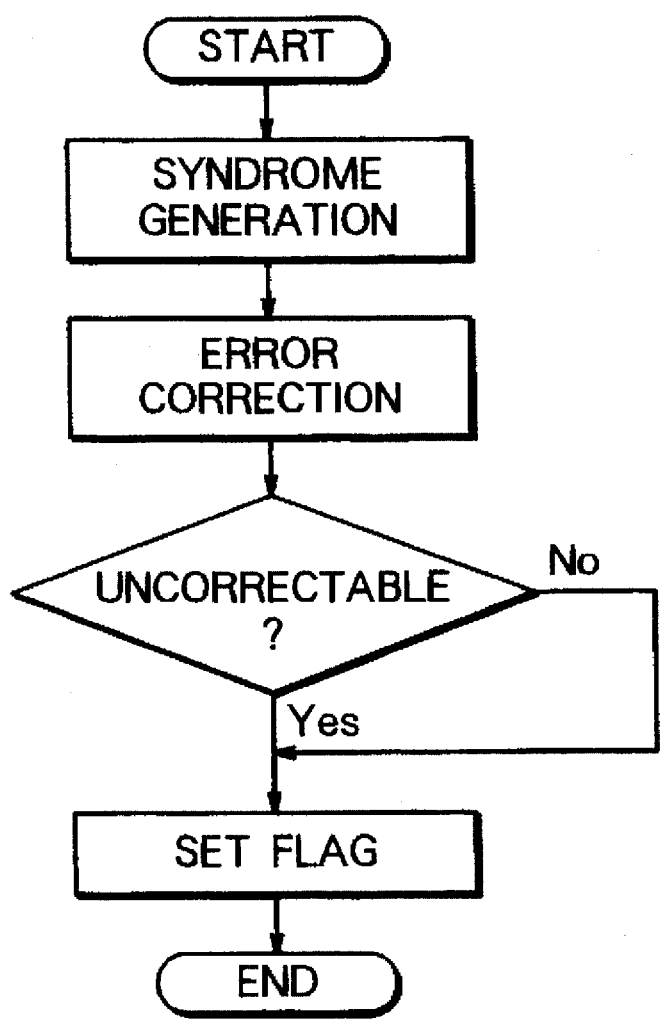
FIG. 25 is a flowchart showing an error-correction decoding algorithm using a C1 check code in Embodiment 1.
Figure 26:
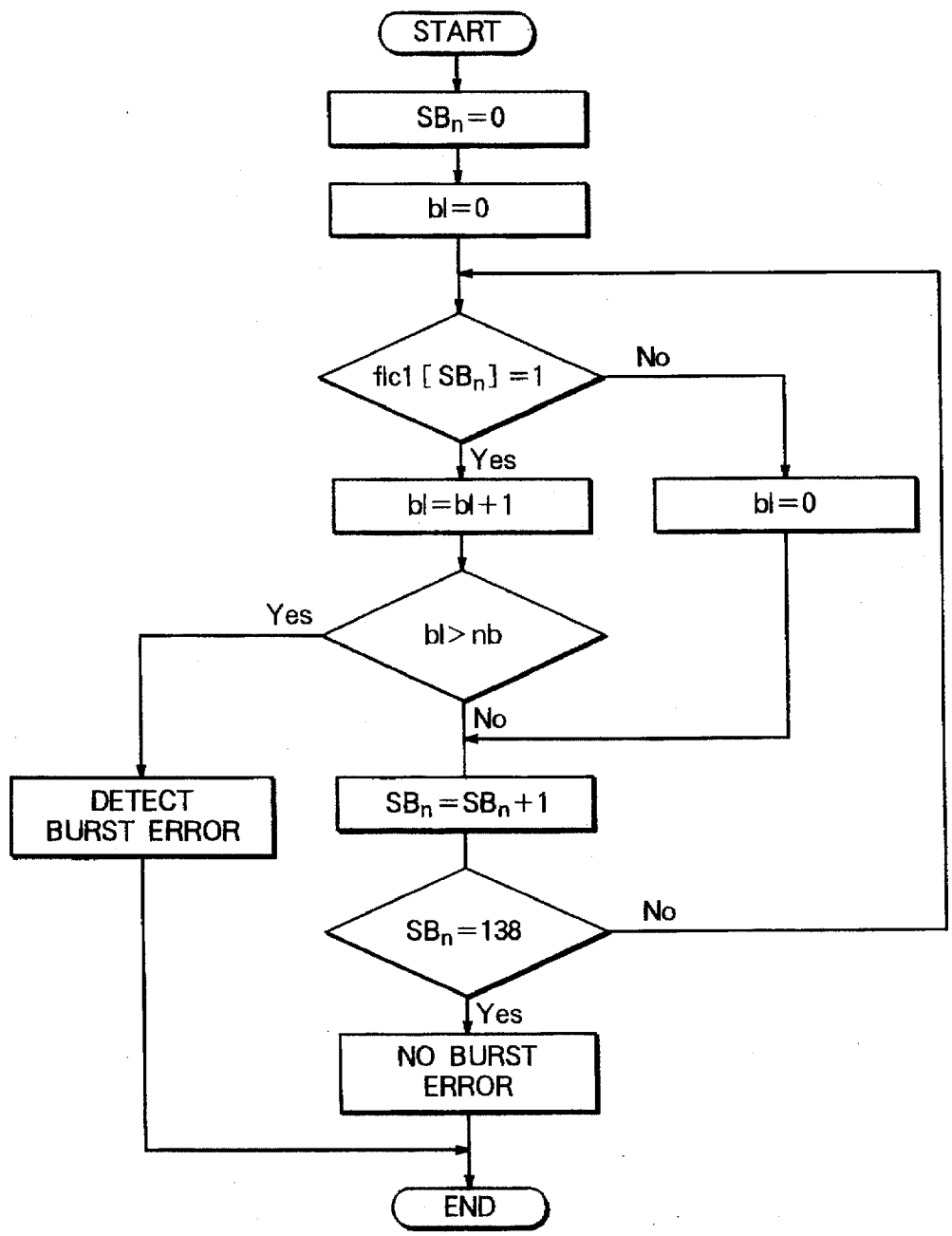
FIG. 26 is a flowchart showing a burst error detecting algorithm in Embodiment 1.
Figure 27:
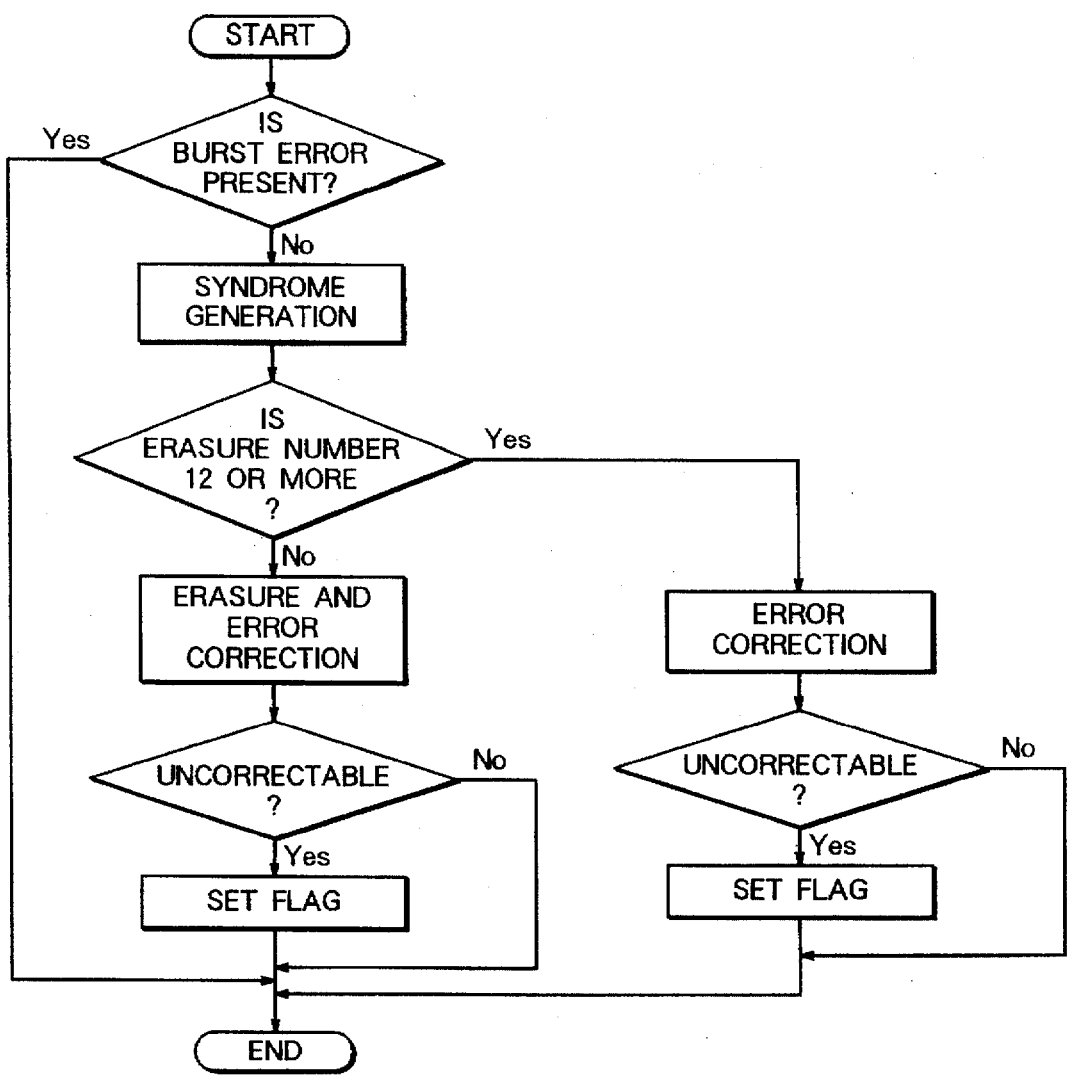
FIG. 27 is a flowchart showing an error-correction decoding algorithm using a C2 check code in Embodiment 1.
Figure 28:
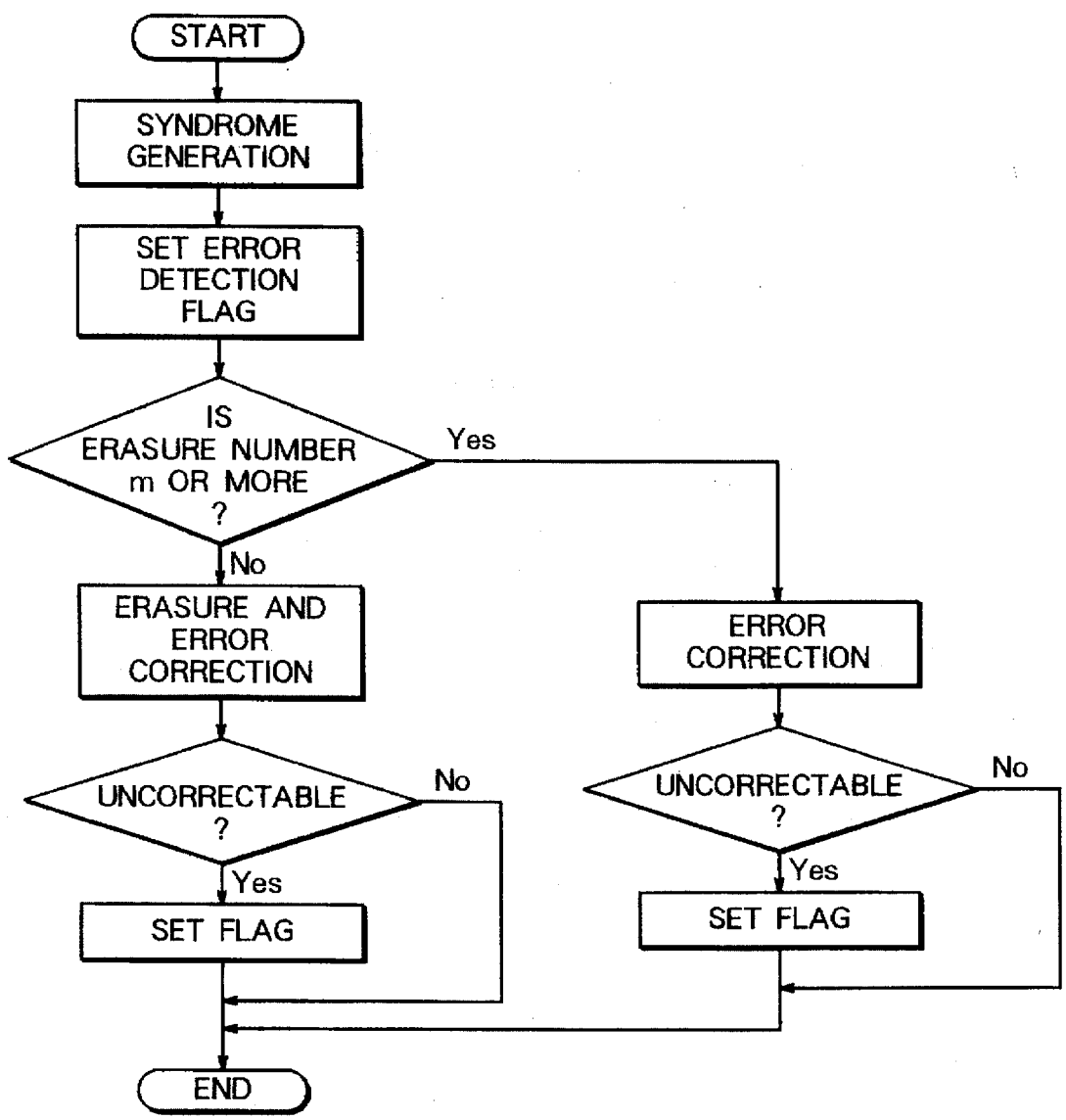
FIG. 28 is a flowchart showing an error-correction decoding algorithm using the C4 check code in Embodiment 1.
Figure 29:
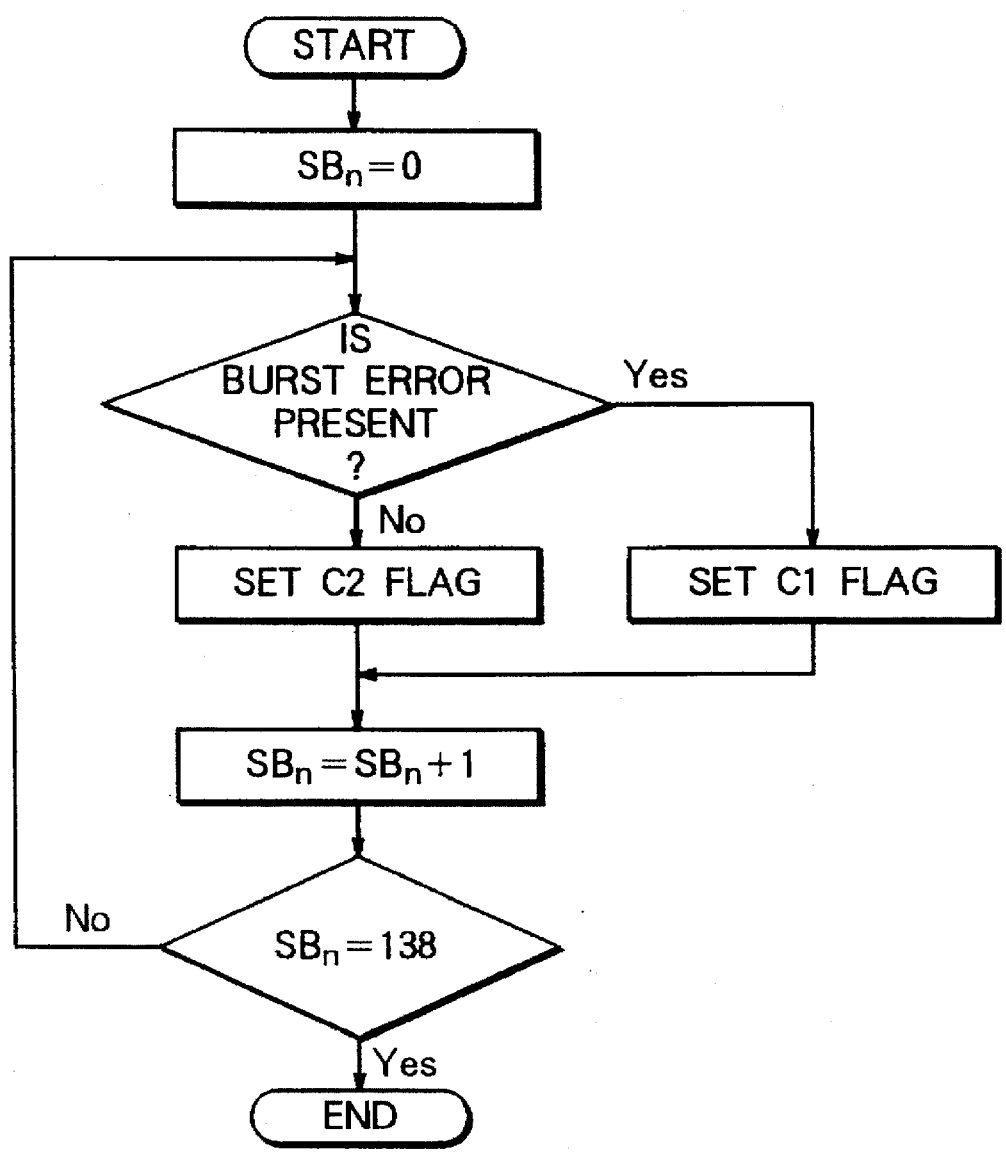
FIG. 29 is a flowchart showing an erasure flag setting algorithm to be followed for error-correction decoding based on the C4 check code in Embodiment 1.
Figure 30:
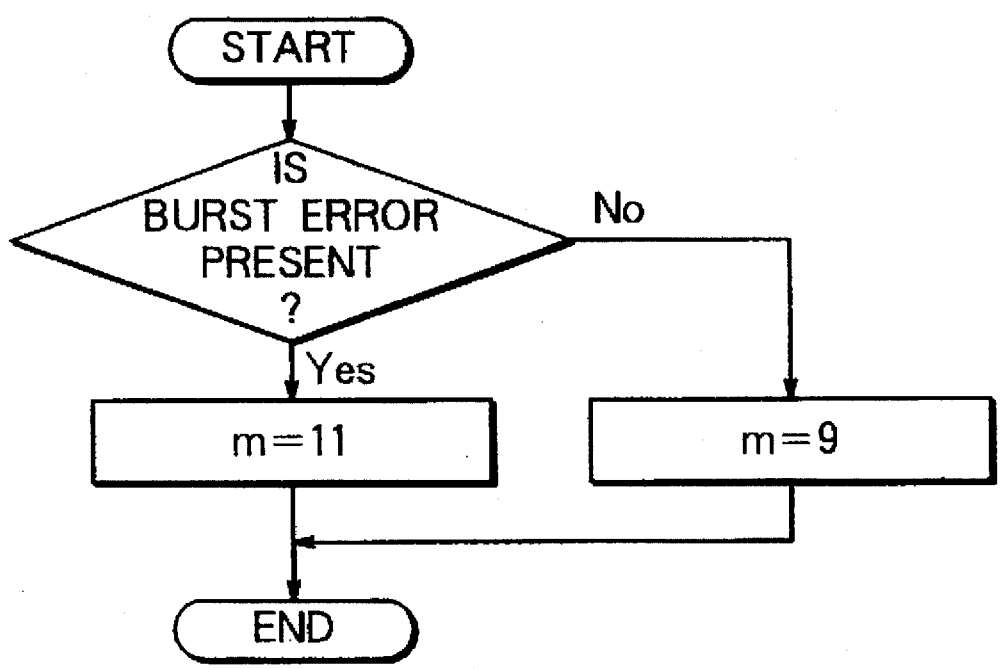
FIG. 30 is a flowchart showing an algorithm for setting the maximum correctable number of erasures, to be followed for error-correction decoding based on the C4 check code in Embodiment 1.

Prior to describing the operations of the playback system, error-correction decoding algorithms followed by the first and second error-correction decoders 74 and 76 will be described with reference to FIG. 25 to FIG. 30. FIG. 25 shows an error-correction decoding algorithm based on the C1 check code (hereinafter referred to as a C1 decoding algorithm) in accordance with Embodiment 1. FIG. 26 shows a burst error detecting algorithm in accordance with Embodiment 1. FIG. 27 shows an error-correction decoding algorithm based on the C2 check code (hereinafter referred to as a C2 decoding algorithm) in accordance with Embodiment 1. FIG. 28 shows an error-correction decoding algorithm based on the C4 check code (hereinafter referred to as a C4 decoding algorithm) in accordance with Embodiment 1. FIG. 29 shows an error-detection flag (hereinafter referred to as an erasure flag) setting algorithm at the time of error correction based on the C4 check code in Embodiment 1. FIG. 30 shows an algorithm for setting a maximum correctable number of erasures at the time of the error correction based on the C4 check code in accordance with Embodiment 1.

Figure 3A:
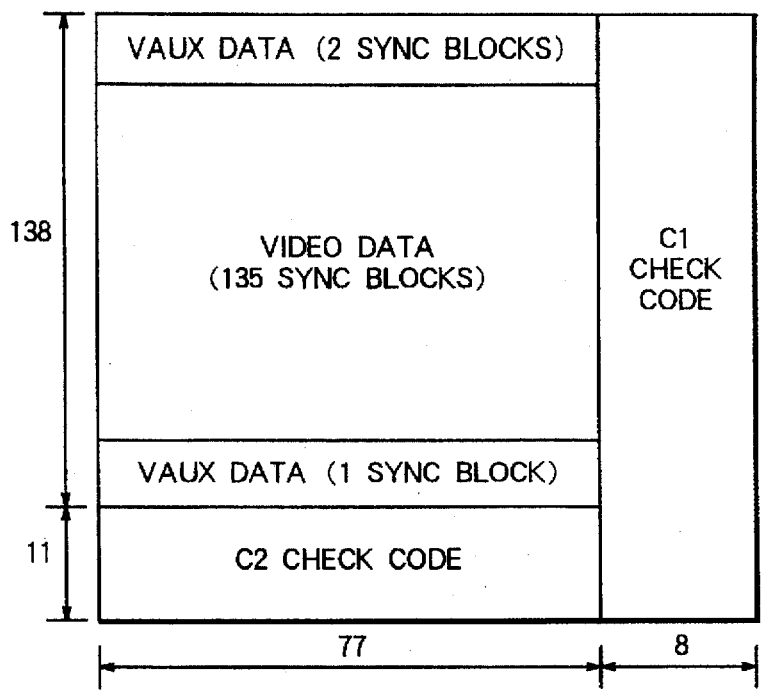
FIG. 3A and FIG. 3B show a data format of the video and audio signal recording areas on one track for a video signal in conformity with the SD standard.

Description will be made briefly of examples of error-correction decoding algorithms used according to the three-dimensional error correction code which is schematically shown in FIG. 3A and FIG. 23. FIG. 25 shows a C1 decoding algorithm (hereinafter referred to as C1 decoding) using the C1 check code. When data is reproduced, errors occurring in a playback signal are first corrected to the limit of the error correction capability of the C1 check code. When C1 decoding is started, a syndrome is generated using playback digital data (codewords) demodulated by the digital demodulator 71. After the generation of the syndrome is completed, the syndrome is used to calculate the error positions and the error values. If it is found that the number of errors is not more than four, error correction is executed. If it is determined that the number of errors exceeds four, an error-detection flag is set (hereinafter, an error-detection flag set as a result of application the C1 check code is referred to as a C1 error-detection flag or a C1 erasure flag). In Embodiment 1. the minimum hamming distance in the C1 check code is nine, and the C1 check code can therefore correct up to four errors.

FIG. 26 shows an example of a burst error detection algorithm using C1 error-detection flags in Embodiment 1. When C1 decoding of data from one track is completed, burst error detection is carried out according to the algorithm shown in FIG. 26. The burst error detection in Embodiment 1 will be described below. In Embodiment 1, a burst error is detected on the basis of the continuity of C1 error-detection flags set as a result of application of the C1 check code. Specifically, the number of consecutive C1 error-detection flags set within one track is counted. If the number of consecutive C1 error-detection flags is not less than a predetermined value, occurrence of a burst error is recognized.

A burst error detecting algorithm shown in FIG. 26 will be described below. After the C1 decoding, the first error-correction decoder 74 reads C1 error-detection flags sequentially from the sync block with the sync block number 0 (SBn=0) (corresponding to sync block numbers in FIG. 23) and counts the number (b1) of consecutive C1 error-detection flags that are set. Specifically, every time a C1 error-detection flag (flc1(SBn)) is found to be "1" (In Embodiment 1, when an error in data is detected within the sync block during C1 decoding, the C1 error detecting flag is set to "1", and the cl error detecting flag is set to "0" when no error is detected), the count of consecutive C1 error-detection flags, b1, is incremented by one. The value b1 is then compared with a predetermined value (nb). If the value b1 is not less than the predetermined value, occurrence of a burst error is recognized. If the value b1 is less than the predetermined value, the value SBn is incremented by one. A C1 error-detection flag in the next sync block is then read out.

When the C1 error-detection flag (flc1 (SBn)) is "0" (when an error has been detected), the value b1 is reset to "0". The SBn value is then incremented by one, and a C1 error-detection flag in the next sync block is read out. The foregoing sequence is repeated until a sync block number indicates 137. If the count of consecutive C1 error-detection flags is less than the predetermined value, it is recognized that no burst error has occurred. Burst error detection may be performed on data in 149 sync blocks including C2 check codes. The burst error detection may be carried out concurrently with C1 decoding at the step of C1 decoding.

Errors that could not be corrected by the C1 check code are subjected to correction using the C2 check code. In Embodiment 1, in the error correction using the C2 check code, for the errors detected based on the C1 check code, erasure correction is performed, and for the errors undetected by the C1 check code, error correction is performed. FIG. 27 shows an algorithm of decoding using the C2 check code. The C2 decoding is carried out using C1 error-detection flags and the results of burst error detection. According to the C2 decoding algorithm in Embodiment 1, when the C2 decoding is started, the results of burst error detection are checked. Where a burst error has been detected, the C2 decoding is terminated. This is because if C2 decoding were performed, the miscorrection might result.

If no burst error is detected, a syndrome is generated using the playback digital data (codewords) read from the sixth memory 73. At this time, the C1 error-detection flags set as a result of application of the C1 check code are also read out in order to count the number of erasures. (For the C1 error correction flags, the erroneous bit positions detected during C1 decoding and the number of errors may be stored in a predetermined register in the first error-correction decoder 74.) If the number of erasures does not exceed the error-correction capability of the C2 check code (in this embodiment, the minimum hamming distance in the C2 check code is 12, and correction is performed up to eleven erasures), a modified syndrome is generated using the error syndrome and the error detection flags set as a result of application of the C1 check code, and errors detected using the C1 check code are then subjected to erasure correction. Errors undetected by the C1 check code are corrected to the limit of the error-correction capability.

If the number of erasures detected using the C1 check code exceeds the error-correction capability of the C2 check code, the modified syndrome is not calculated and error correction is carried out to the limit of the error-correction capability of the C2 check code (up to five errors are corrected). Such error correction is possible because it is highly probable that errors detected by the C1 check code is false erasures (the values recognized as erroneous by the C1 check code are actually correct). When errors are detected by the C2 check code, a C2 error-detection flag is set. When an attempt is made to perform error correction based on the C2 check code on data in which a burst error is detected, since most of errors detected by the C1 check code when a burst error has occurred are real erasures (actually incorrect data), the probability that error correction based on the C2 check code succeeds is very low, and miscorrection may be effected. In Embodiment 1, therefore, when a burst error has been detected, C2 decoding is not executed to avoid the miscorrection.

Errors that could not be corrected by the C2 check code are subjected to error correction based on the C4 check code. In the error correction using the C4 check code in Embodiment 1, for the data for which no burst error has been detected, erasure correction is applied to the errors detected by the C2 check code, and error correction is applied to the errors undetected by the C2 check code. As for the data on a track for which a burst error has been detected, erasure correction is applied to the errors detected by the C1 check code, and error correction is applied to the errors undetected by the C1 check code. FIG. 28 and FIG. 29 respectively show an algorithm of decoding using the C4 check code and an algorithm for setting error-detection flags. FIG. 30 shows an algorithm for setting the number of erasures-to-be-corrected used for C4 decoding.

The algorithm of C4 decoding in Embodiment 1 will be described in conjunction with FIG. 28 to FIG. 30. Data that has been subjected to C1 and C2 decodings by the first error-correction decoder 74 is supplied from the sixth memory 73 and stored in the seventh memory 75. When structuring of a data block of ten tracks shown in FIG. 23 is completed in the seventh memory 75, the second error-correction decoder 76 starts C4 decoding. In Embodiment 1, the data block is structured on the basis of track number information contained in ID signals appended to the starts of sync blocks. The C4 decoding is executed on the basis of the C1 error-detection flags, C2 error-detection flags, and results of burst error detection. According to the C4 decoding algorithm in Embodiment 1, when the C4 decoding is started, the results of burst error detection concerning the data block are checked. When the data on a track for which a burst error has been detected is decoded, the C1 error-detection flags are used as erasure flags. For a track on which no burst error has been detected, the C2 error-detection flags are used as erasure flags.

FIG. 29 shows an error-detection flag setting algorithm in Embodiment 1. When structuring of a data block of data on ten tracks is completed in the seventh memory 75, the second error-correction decoder 76 reads playback digital data (codewords) from the seventh memory 75. At this time, the C1 error-detection flags and C2 error-detection flags appended to the codewords, and burst error detection information are also read out. The read error-detection flags are selected according to the burst error detection information. The error-detection flag setting algorithm for C4 decoding will be described in conjunction with FIG. 29. First, a sync block number (SBn) is set to 0 at the start of each codeword. The above information (the C1 error-detection flags, C2 error-detection flags, and results of burst error detection) concerning the leading codeword is read out. If the codeword is on a track on which a burst error has been detected, the appended C1 error-detection flag is set as an error-detection flag. For a codeword on a track on which no burst error has been detected, the appended C2 error-detection flag is set as an error-detection flag. Thereafter, the value SBn is incremented by one. The error-detection flags appended to the next codeword are set in the same manner. The foregoing sequence is repeated until the value SBn becomes 137, whereby error-detection flags are set.

Next, an algorithm for setting a maximum correctable number of erasures during error-correction decoding based on the C4 check code will be described in conjunction with FIG. 30. Concurrently with the setting of error-detection flags, the second error-correction decoder 76 determines the maximum correctable number of erasures according to the algorithm shown in FIG. 30. When the C4 decoding is started, first, it is determined whether a burst error has occurred in the data block (on ten tracks). If no burst error is detected in the data block, the maximum coffee;table number of erasures m is set to nine (up to eight erasures can be corrected).

In Embodiment 1, if no burst error occurs, erasure correction is not performed to the limit of the error correction capability of the C4 check code. This is intended to minimize the number of miscorrections at the time of the C4 decoding because of errors undetected by the C2 check code during C2 decoding. In particular, the C4 check code employed in the digital VTR is applied in order to improve the capability to correct a burst error. In fact, the minimum hamming distance in the C4 check code is shorter than that in the C2 check code. When error correction is performed to the limit of the error correction capability of the C4 check code during C4 decoding, where the symbol error rate is poor, the result of the C4 decoding may have a larger number of miscorrections than the C2 decoding. This phenomenon has been confirmed by computer simulation. It has been found that a main situation prone to the miscorrection is that ten errors are detected by the C2 check code and one error is undetected by the C2 check code. Likewise, a main situation prone to the miscorrection during C2 decoding is that eleven errors are detected by the C1 check code and one error is undetected by the C1 check code. In short, miscorrection is attributable to miscorrection occurring in the preceding decoding stage.

In Embodiment 1, the erasure correction capability of the C4 check code is degraded in order to lower the probability of occurrence of miscorrection in random error correction. When a burst error is detected, the maximum correctable number of erasures is set to eleven. Accordingly, burst error correction can be effected to the limit of the error correction capability of the C4 check code (up to ten erasures are corrected). (As mentioned above, a burst error involving a maximum of 10*10=100 sync blocks per track can be corrected.)

Taking the above into consideration, the C4 decoding algorithm will be described in conjunction with FIG. 28.

When the C4 decoding is started, the second error-correction decoder 76 uses playback digital data (codewords) read from the seventh memory 75 to generate a syndrome. Concurrently with the generation of the syndrome, error-detection flags are set according to the algorithm shown in FIG. 29. The maximum correctable number of erasures is also determined at the same time. When the generation of the syndrome is completed, the number of erasures is counted on the basis of the error-detection flags. If the number of erasures is less than m (where m is determined according to the algorithm shown in FIG. 30. In Embodiment 1, if a burst error occurs, error correction is effected to the limit of the error correction capability of the C4 check code; that is, up to ten erasures are corrected. If no burst error is detected, up to eight erasures are corrected), a modified syndrome is generated using the above-mentioned syndrome and the error detection flags set by the above algorithm. Erasure correction is then performed on errors detected by the C1 and C2 check codes. Errors undetected by the C1 and C2 check codes are corrected to the limit of the error correction capability.

If the number of erasures detected by the C1 and C2 check codes is not less than m, no modified syndrome is generated, but error correction is effected to the limit of the error correction capability of the C4 check code (up to five errors are corrected). The error correction is possible because it is highly probable that errors detected by C1 and C2 check codes are false erasures (values are recognized as erroneous by the C1 and C2 check codes, but are actually correct). When an error is detected by applying the C4 check code, a C4 error-detection flag is set.

Next, the normal playback operations of a playback system for a digital VTR in accordance with Embodiment 1 will be described in conjunction with FIG. 24 to FIG. 30. The data reproduced from the magnetic tape 27 by means of the rotary heads 26a and 26b on the drum 25 is amplified by the playback amplifier 70 and fed to the digital demodulator 71. The digital demodulator 71 performs data detection on the input playback signal, converts the data into playback digital data, and then digitally demodulates the digital data. ID signal appended to the start of each sync block is detected by the digital demodulator 71 and supplied to the ID detector 72. The track number and sync block number are extracted from the ID signal fed to the ID detector 72, and supplied to the playback system control circuit 80. The playback system control circuit 80 supplies an operation mode for the playback system to the first error-correction decoder 74, second error-correction decoder 76, and switch 79 according to a mode signal fed via the input terminal 81. The track number information and sync block number information sent from the ID detector 72 are supplied to the first error-correction decoder 74 and second error-correction decoder 76 via the playback system control circuit 80.

The playback digital data digitally demodulated by the digital demodulator 71 is stored in the sixth memory 73. In the sixth memory 73, the playback digital data supplied from the digital demodulator 71 is accumulated to collect data from one track to structure an error correction code block shown in FIG. 3A and FIG. 3B. When an error correction code block shown in FIG. 3A and FIG. 3B has been structured, the first error-correction decoder 74 uses the C1 and C2 check codes to correct or detect errors occurring during playback, according to the algorithms shown in FIG. 25 to FIG. 27. Completion of structuring of an error correction code block is detected on the basis of the sync block number information and track number information supplied from the playback system control circuit 80.

The operations of the first error-correction decoder 74 will be described briefly. When one error correction code block is structured in the sixth memory 73, the first error-correction decoder 74 first executes the C1 decoding. Specifically, the playback digital data is read in units of one sync block from the sixth memory 73, and the C1 decoding is executed according to the C1 decoding algorithm shown in FIG. 25. (Up to four errors are corrected.) Errors detected during the C1 decoding (C1 error-detection flags) are stored at predetermined addresses in the sixth memory 73. When the C1 decoding is completed, the first error-correction decoder 74, following the burst error-correction detecting algorithm shown in FIG. 26, reads error-detection flags set as a result of C1 decoding from the sixth memory 73, and recognizes occurrence of a burst error according to the continuity of the C1 error-detection flags. At this time, the error-detection flags read from the sixth memory 73 are stored in a register in the first error-correction decoder 74. The burst error detection may be executed concurrently with the C1 decoding.

When the reading of the C1 error-detection flags (burst error detection) is completed, the first error-correction decoder 74 starts the C2 decoding according to the C2 decoding algorithm shown in FIG. 27. Specifically, as mentioned above, if a burst error is detected, the C2 decoding is terminated. If no burst error is detected, first, a syndrome is generated. When the generation of syndrome is completed, the number of erasures is counted on the basis of the C1 error-detection flags. If the number of erasures is less than twelve, a modified syndrome is generated using the error syndrome and the error detection flags set as a result of application of the C1 check code, and erasure correction is performed on errors detected by the C1 check code. Errors undetected by the C1 check code are also corrected to the limit of error correction capability.

If the number of erasures detected by applying the C1 check code is not less than twelve, the modified syndrome is not calculated but error correction is executed to the limit of the error correction capability of the C2 check code (up to five errors are corrected). Errors detected by C2 decoding (C2 error-detection flags) are stored at predetermined addresses in the sixth memory 73.

The playback digital data that has been subjected to error correction by the first error-correction decoder 74 is supplied track by track to the seventh memory 75. The playback digital data that has been subjected to C1 and C2 decodings, and the C1 and C2 error-detection flags are stored at predetermined addresses in the seventh memory 75. The results of burst error detection for each track are supplied from the first error-correction decoder 74 to the second error-correction decoder 76, and then stored in a predetermined register in the second error-correction decoder 76. At this time, the second error-correction decoder 76 determines, according to the algorithm shown in FIG. 30, whether a burst error has occurred within the ten tracks, and sets a maximum correctable number of erasures for the C4 decoding.

The operations of the second error-correction decoder 76 will be described briefly. When the first error-correction decoder 74 completes the C1 and C2 decodings for one track, the C2 decoding end signal is sent to the second error-correction decoder 76. At this time, the burst error detection information is also supplied. In response to the C2 decoding end signal, the second error-correction decoder 76 checks the track number signal sent from the playback system control circuit 80. Based on the track number information, the second error-correction decoder 76 supplies write addresses, which are used for writing data read from the sixth memory 73 at predetermined addresses in the seventh memory 75, and control signals. Reading of data from the sixth memory 73 is performed on the basis of read addresses and control signals supplied from the first error-correction decoder 74.

When data from the ten tracks is structured in the seventh memory 75, the second error-correction decoder 76 starts error correction based on the C4 check code. In the seventh memory 75, first, interleaving is performed in the same way as the one performed during recording (interleaving shown in FIG. 23). The playback digital data is then read and fed to the second error-correction decoder 76. At this time, the data read addresses and control signals are supplied from the second error-correction decoder 76. When the playback digital data (codewords) has been read from the seventh memory 75, the second error-correction decoder 76 first generates a syndrome according to the algorithm described in FIG. 28. At this time, the C1 error-detection flags and C2 error-detection flags appended to the playback digital data (codewords) are also read from the seventh memory 75. Erasure flags (error-detection flags) for the C4 decoding are set according to the algorithm shown in FIG. 29.

When the generation of syndrome and setting of erasure flags are completed, the second error-correction decoder 76 counts the number of erasures. If the number of erasures is less than m, the erasure flags are used to calculate the modified syndrome and erasure correction is executed. At this time, errors undetected by the C1 and C2 decodings are also corrected. If the number of erasures is m or more. error correction is executed with the erasure flags ignored. The error-detection flags set as a result of the C4 decoding (C4 error-detection flags) are stored at predetermined addresses in the seventh memory 75.

When the second error-correction decoder 76 completes the C4 decoding of data from the ten tracks, the playback digital data is read from the seventh memory 75, and written in the eighth memory 77 and ninth memory 78. At this time, the special playback data (4× speed playback data and 18× speed playback data) reproduced from the special playback data recording areas is stored in the ninth memory 78, while the playback digital data for normal playback is stored in the eighth memory 77. At this time, the C4 check codes are removed. Reading of data from the seventh memory 75 and writing of data into the eighth and ninth memories 77 and 78 are carried out on the basis of addresses and control signals sent from the second error-correction decoder 76.

As for the playback data stored in units of a sync block (sync block format) shown in FIG. 17B in the eighth memory 77, playback data from five sync blocks are collected according to headers H1 and H2 during reading of playback data. The headers H1 and H2 are then removed from the data, wherein two transport packets are restored and supplied. The playback data transformed into the two transport packets is supplied to the switch 79.

The switch 79 selects the output of the eighth memory 77 during normal playback, according to the select information sent from the playback system control circuit 80. The header information H1 and H2 is, as described above, removed from normal playback data stored in the eighth memory according to the sync block format shown in FIG. 17B at the time of data reading, wherein transport packets are restored (See FIG. 17A) and sent to the switch 79. The normal playback data read from the eighth memory 77 is supplied through the output terminal 82 by way of the switch 79.

Next, fast playback operations will be described. The data intermittently reproduced from the magnetic tape 27 by means of the rotary heads 26a and 26b on the rotary drum 25 is amplified by the playback amplifier 70 and fed to the digital demodulator 71. The digital demodulator 71 detects data in the input playback data, converts the data into playback digital data, and then digitally demodulates the digital data. The ID signal appended to the start of each sync block is detected by the digital demodulator 71. The ID signals detected by the digital demodulator 71 are fed to the ID detector 72. The ID detector 72 detects the track number information and sync block number information in the ID signals and sends the results of detection to the playback system control circuit 80.

The playback system control circuit 80 sends a mode signal (an identification signal indicating normal playback or fast playback (18× speed, 4× speed, −16× speed, or −2× speed playback)) received through the input terminal 81 to the first error-correction decoder 74, second error-correction decoder 76, and switch 79. The track number information and sync block number information supplied from the ID detector 72 are sent to the first error-correction decoder 74 and second error-correction decoder 76.

Figure 8:
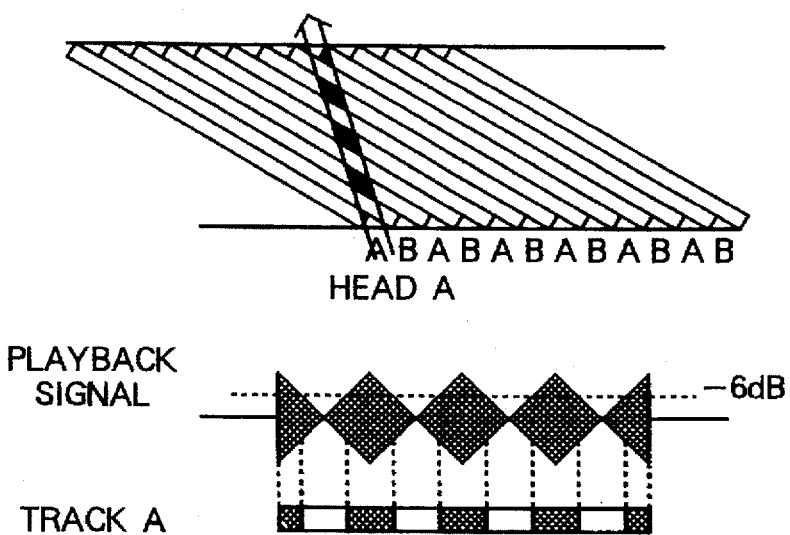
FIG. 8 shows the scanning trace of a rotary head in typical fast playback mode.
Figure 10:
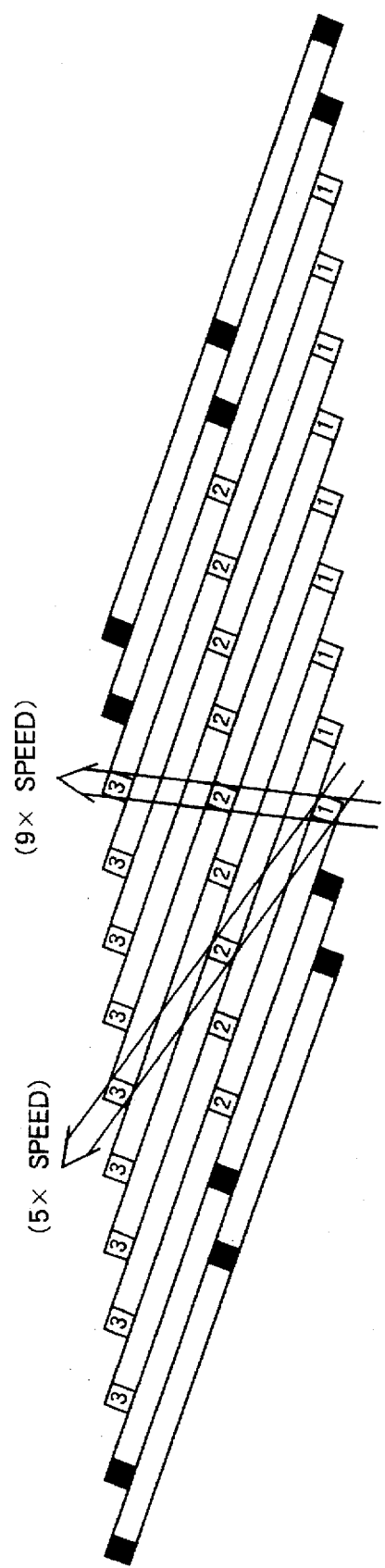
FIG. 10 shows the scanning traces of a rotary head at 5× and 9× speeds in the conventional digital VTR.

The playback digital data that has been digitally demodulated by the digital demodulator 71 is stored in the sixth memory 73. In fast playback mode, for example, as shown in FIG. 8, data is intermittently reproduced from tracks by means of the rotary head 26a and 26b. It is therefore impossible to collect data for one track and to structure an error-detecting code block shown in FIG. 3A and FIG. 3B, or FIG. 21 for performing the C2 or C4 decoding. In Embodiment 1, error correction based on the C2 check code and C4 check code is not executed in fast playback mode.

When the playback digital data is input to the sixth memory 73, the recording areas of the desired fast playback data are separated on the basis of the fast playback mode signal (18× speed, 4× speed, −16× speed, or −2× speed) and ID signals (track numbers and sync block numbers) sent from the playback system control circuit 80, and only the special playback data is stored temporarily in the sixth memory 73.

The special playback data stored in the sixth memory 73 is read in units of a sync block, and is subjected to the error correction based on the C1 check code (C1 decoding) at the first error-correction decoder 74 to correct or detect errors occurring during fast playback. When the C1 decoding of data for one sync block is completed, the first error-correction decoder 74 sends the C1 decoding end signal to the second error-correction decoder 76, and the playback digital data that has been subjected to the error correction by the first error-correction decoder 74 is read sequentially in units of a sync block from the sixth memory 73 and supplied to the seventh memory 75. Control signals and addresses in the sixth memory 73 from which the digital data is read and supplied from the first error-correction decoder 74. Control signals and addresses in the seventh memory 75 into which playback digital data is written are supplied from the second error-correction decoder 76 in response to the C1 decoding end signal sent from the first error-correction decoder 74.

As described above, in the fast playback mode, the error correction based on the C4 check code is not executed, and special playback data stored in the seventh memory 75 is read and fed to the ninth memory 78, according to data read addresses and control signals sent from the second error-correction decoder 76. The output of the seventh memory 75 is also fed to the eighth memory 77, but, in the fast playback mode, the playback digital data is not written.

The second error-correction decoder 76 supplies write addresses and control signals, for storing the special playback data that has been reproduced according to track numbers and sync block numbers extracted from ID information, at the predefined addresses in the ninth memory 78. As for the special playback data stored in the ninth memory 78 according to the sync block format shown in FIG. 17B, the playback data for the five sync blocks are collected according to headers H1 and H2 during data reading, and the headers H1 and H2 are removed, and the original, two transport packets are restored and output. The special playback data transformed into two transport packets is then sent to the switch 79.

In fast playback mode, the switch 79 selects the output of the ninth memory 78 according to the select information sent from the playback system control circuit 80. As for normal playback data stored in the ninth memory 78 according to the sync block format shown in FIG. 17B, the header information H1 and H2 is removed during data reading, and the original transport packets are restored (See FIG. 17A) and sent to the switch 79. The special playback data supplied from the ninth memory 78 is sent through the output terminal 82 by way of the switch 79.

Embodiment 2

Figure 31:
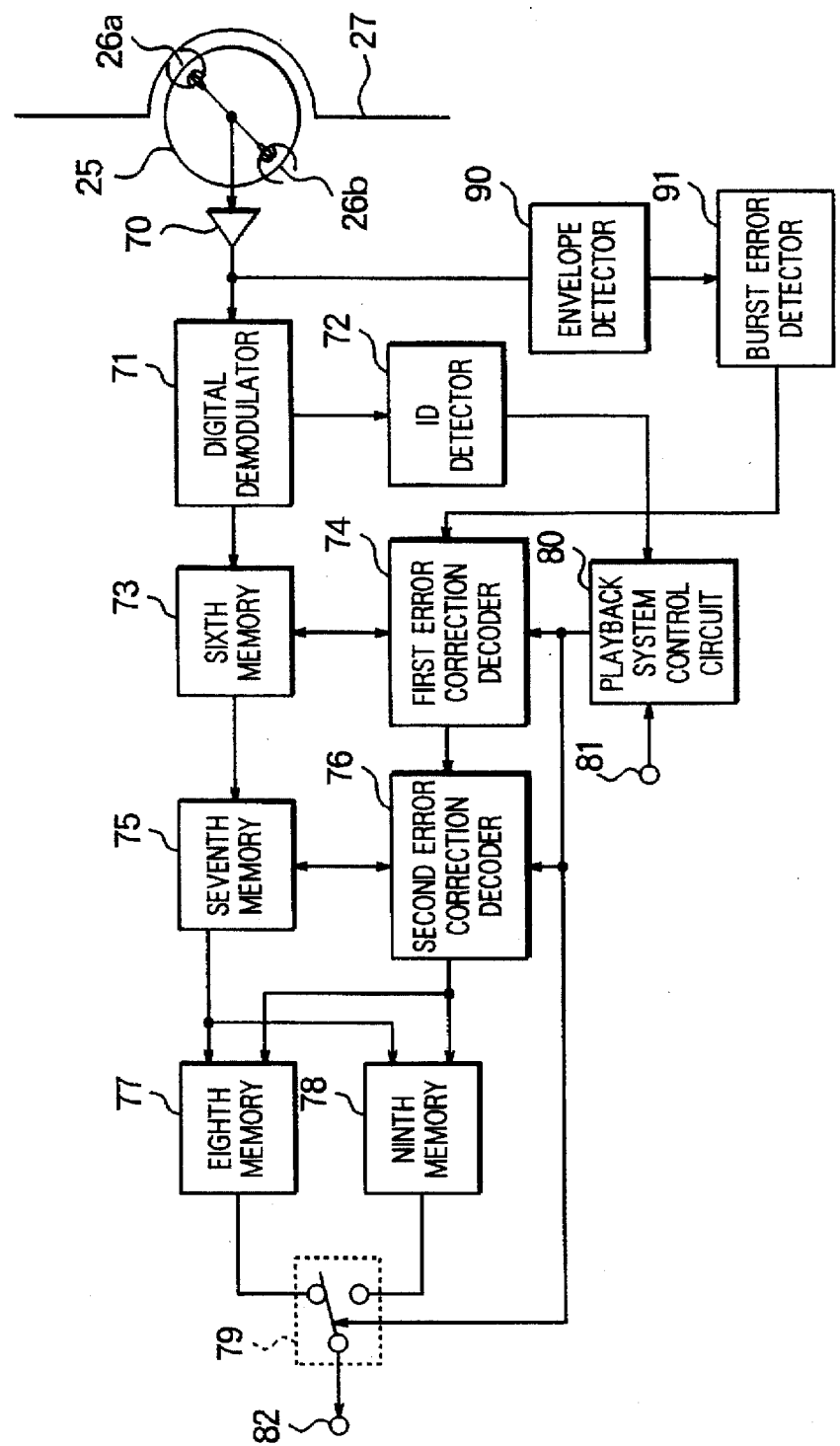
FIG. 31 is a block diagram showing the configuration of a playback system for a digital VTR in Embodiment 2.

FIG. 31 is a block diagram showing the configuration of a playback system for a digital VTR in accordance with Embodiment 2. In the drawing, reference numerals identical to those in FIG. 24 denote identical or corresponding circuits. Reference numeral 90 denotes an envelope detector for detecting the waveform of the playback signal. 91 denotes a burst error detector for detecting a burst error from the playback signal.

Figure 33:
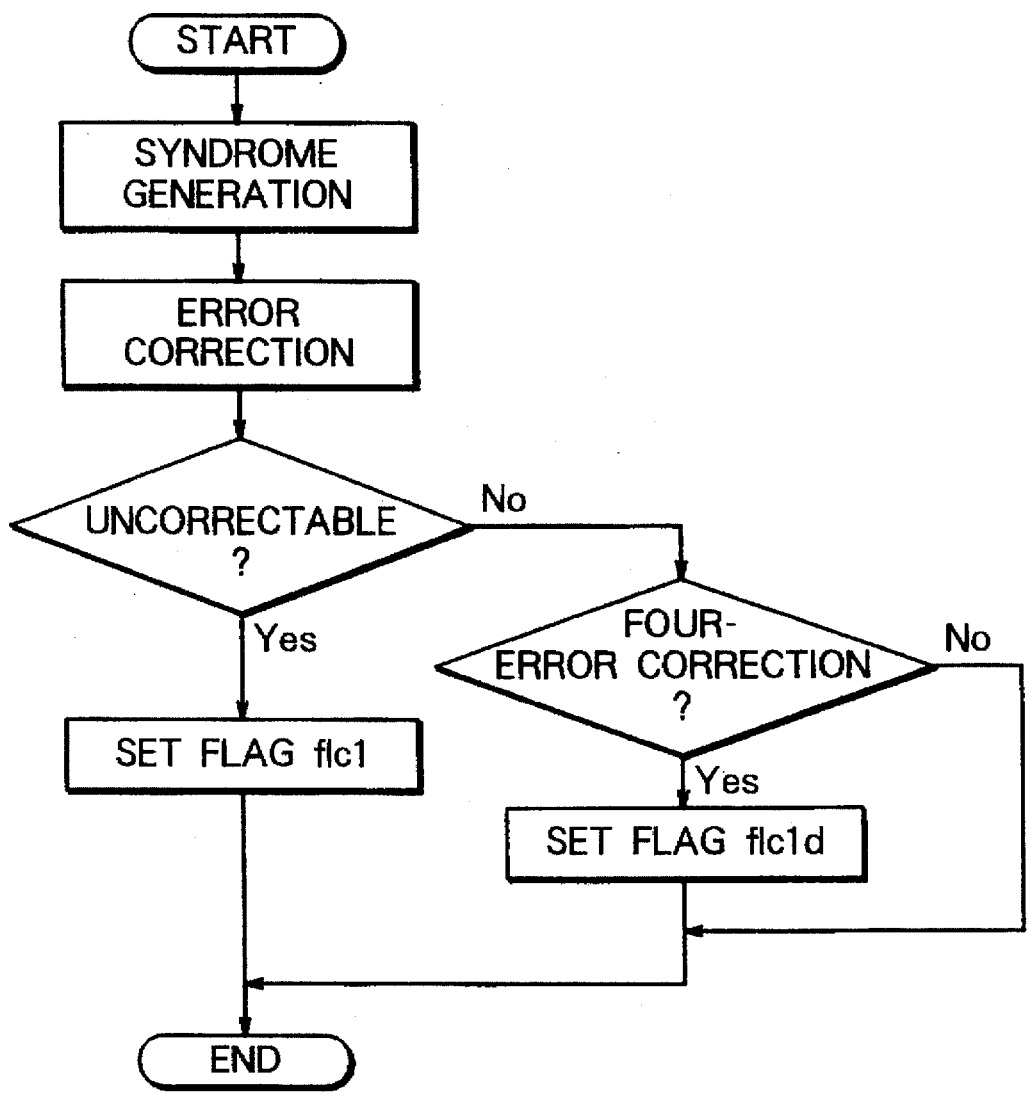
FIG. 33 shows an error-correction decoding algorithm using the C1 check code in Embodiment 2.
Figure 34:
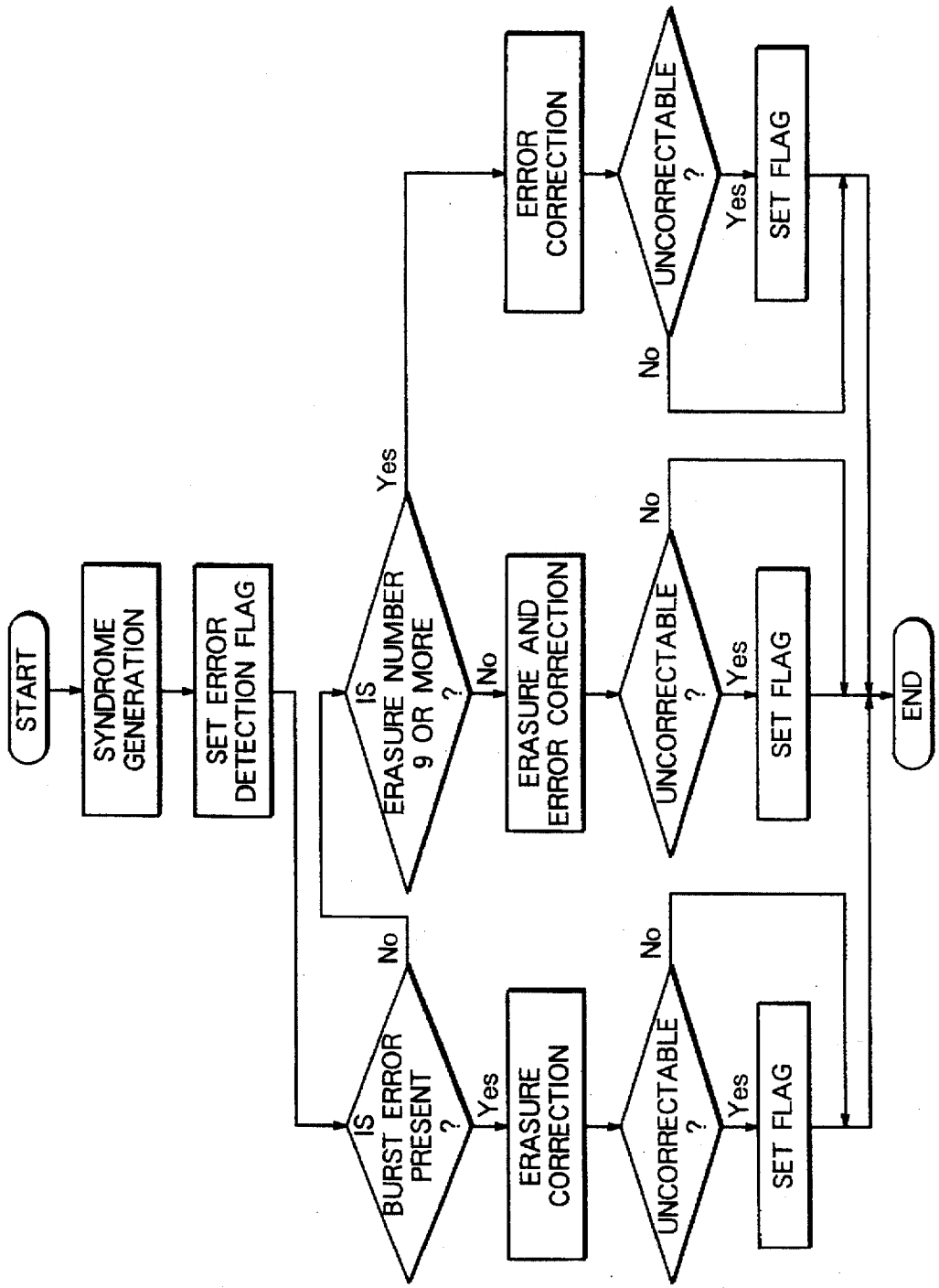
FIG. 34 shows an error-correction decoding algorithm using the C4 check code in Embodiment 2.

FIG. 32A to FIG. 32C diagrams for explaining the burst error detection performed by the burst error detector 91 in Embodiment 2. FIG. 33 shows an error-correction decoding algorithm using the C1 check code in Embodiment 2. FIG. 34 shows an error-correction decoding algorithm using the C4 check code in Embodiment 2.

The error-correction decoding algorithms based on the three-dimensional error correction code in accordance with Embodiment 2, which are shown in FIG. 3A and FIG. 23, will be described briefly. The burst error detection in accordance with Embodiment 2 will be described in detail. When data has been reproduced, first, as in Embodiment 1, errors occurring in the playback signal are corrected using the C1 check code to the limit of the error correction capability of the C1 check code. When the C1 decoding is started, the playback digital data (codewords) provided by the digital demodulator 71 generates the syndrome. When the generation of syndrome is completed, the syndrome is used to detect error positions and error values. If it is found, as a result of the detection of the error positions and error values, that the number of errors is not more than four, error correction is executed. If it is found that the number of errors exceeds four, a C1 error-detection flag (flc1) is set. In Embodiment 2, the flag (field) is also set with regard to to data on which four errors are corrected during the C1 decoding (the flag flc1d is set to "1" when four errors are corrected, and set to "0" in other situations).

Errors that have not been corrected by the C1 check code are subjected to error correction based on the C2 check code. During error correction based on the C2 check code in Embodiment 1, errors detected by the C1 check code are subjected to erasure correction, and while errors undetected by the C1 check code are subjected to error correction. The C2 decoding algorithm employed in this embodiment is similar to that in Embodiment 1. During error correction of the playback digital data in a data block shown in FIG. 23 by the C2 check code, a burst error may be detected within the data block. In this case, in the C2 decoding for the subsequent playback digital data, in addition to the error-detection flags set as a result of C1 decoding, the error-detection flags appended to data in sync blocks in which four errors have been corrected (sync block flags flc1d are set to one) are set to "1" to indicate that decoding should be executed, taking that errors have been detected. The reason for using the error-detection flags set as a result of the C1 decoding is to minimize the number of undetected errors during the C1 decoding. Using the newly set error-detection flags, the C2 decoding is performed on the subsequent playback digital data within the above-mentioned data block according to the decoding algorithm shown in FIG. 27.

In Embodiment 2, when a burst error is detected in a data block, as mentioned above, the subsequent C1 error detection flags are added to the C1 error detection flag, as mentioned above, such that the C2 decoding is applied to the sync blocks for which four errors have been corrected. Accordingly, it is possible to reduce undetected errors during C2 decoding, and the miscorrection during C4 decoding is reduced. With regard to tracks on which a burst error has been detected, C1 error-detection flags are set as mentioned above, so that, in burst error correction, the number of errors undetected by the C1 decoding can be minimized. Consequently, miscorrection during the C4 decoding can be reduced.

It may be so arranged that, when a burst error is detected in a data block during C2 decoding, the error correction capability of the C2 check code is degraded during the subsequent C2 decoding. This is also effective in minimizing the number of errors undetected by the C2 decoding, and reducing the miscorrection during C4 decoding. Specifically, the C2 decoding algorithm may be changed such that when C2 decoding is performed on the playback digital data of a data block in which a burst error has been detected, the maximum correctable number of erasures is decreased, for example, from eleven to nine, and the maximum correctable number of erasures for the case of the erasure number being 10 or more is decreased from five to four, and yet similar effects are obtained.

For errors that have not been corrected by the C2 check code. the error correction using the C4 check code is executed. In the error correction based on the C4 check code in Embodiment 2, erasure flags are set for executing the erasure correction for the errors detected by the C2 check code, with regard to the data in the error correction block for which no burst error is detected. As for data on a track on which a burst error has been detected, error-detection flags are set for executing erasure correction for errors detected by the C1 check code. (The C1 error-detection flags include the aforesaid flags flc1 as well as flags flc1d appended to data in sync blocks to which error correction has been applied.) The error-detection flag setting algorithm is the same as the one in Embodiment 1 (See FIG. 29), and the detailed description of the algorithm is therefore omitted. (The C1 error-detection flags are handled as explained previously.)

Next, a C4 decoding algorithm in accordance with this embodiment will be described in conjunction with FIG. 34. A data block is structured as shown in FIG. 23, in the same way as in Embodiment 1, and the detailed description will therefore be omitted. The C4 decoding is executed, in the same way as in Embodiment 1, on the basis of the C1 error-detection flags, C2 error-detection flags, and results of burst error detection. In Embodiment 2, as in Embodiment 1, when the C4 decoding is started, the results of burst error detection concerning the data block are checked. For decoding data on a track on which a burst error has been detected, the C1 error-detection flags are used as erasure flags. As for data on a track on which no burst error has been detected, the C2 error-detection flags are used as erasure flags.

In Embodiment 2, as in Embodiment 1, when no burst error has occurred, erasure correction is not effected to the limit of the error correction capability of the C4 check code. This makes it possible to minimize the number of miscorrections by the C4 check code because of errors undetected by the C2 decoding.

The C4 decoding algorithm in Embodiment 2 will be described in conjunction with FIG. 34. When the C4 decoding is started, the second error-correction decoder 76 uses the playback digital data (codewords) read from the seventh memory 75 to generate the syndrome. Concurrently with the generation of the syndrome, setting of the error-detection flags is carried out as described previously (See FIG. 29). At this time, it is checked if a burst error has occurred in a data block shown in FIG. 23. If a burst error is detected in the data block, only the erasure correction is executed, and errors undetected by the C1 or C2 decoding are not corrected. In this way, miscorrection by the C4 decoding at the time of occurrence of the burst error is reduced.

When no burst error is detected in the data block, the error-detection flags are checked to count the number of erasures, upon completion of the generation of syndrome. If the number of erasures is less than nine, the generated syndrome is used to work out a modified syndrome, and erasure correction is then executed for errors detected by the C1 and C2 check code. At this time, errors undetected by the C1 and C2 check codes are also corrected to the limit of the error correction capability.

If the number of erasures detected by the C1 and C2 check codes is nine or more. no modified syndrome is worked out, but error correction is executed to the limit of the error correction capability of the C4 check code (up to five errors are corrected). The error correction is possible because it is highly probable that errors detected by the C1 and C2 check codes are false erasures (values which are recognized as erroneous by the C1 and C2 check codes, but are actually correct). When errors are detected by applying the C4 check code, C4 error-detection flags are output.

Next, the normal playback operations of the playback system for a digital VTR in accordance with Embodiment 2 will be described in conjunction with FIG. 31 to FIG. 34. The data reproduced from the magnetic tape 27 by means of the rotary heads 26a and 26b on the drum 25 is amplified by the playback amplifier 70 and fed to the digital demodulator 71. The digital modulator 71 performs data detection on the input playback data, converts the data into playback digital data, and then performs digital demodulation. The ID signal appended to the start of each sync block is detected by the digital demodulator 71 and supplied to the ID detector 72. The track number and sync block number in the ID signal fed to the ID detector 72 are detected and the ID signal supplied to the playback system control circuit 80. On the basis of a mode signal received through the input terminal 81, the playback system control circuit 80 supplies an operation mode for the playback system to the first error-detection decoder 74, second error-detection decoder 76, and switch 79. The track number information and sync block number information sent from the ID detector 72 are supplied to the first error-detection decoder 74 and second error-detection decoder 76 via the playback system control circuit 80.

The output of the playback amplifier 70 is also fed to the envelope detector 90. The operations of the envelope detector 90 and burst error detector 91 will be described in conjunction with FIG. 32A to FIG. 32C. FIG. 32A shows the waveform of a playback signal sent from the playback amplifier 70. FIG. 32B shows the waveform of an output of the envelope detector 90 after the playback envelope. The envelope (See FIG. 32B) of the playback signal sent from the playback amplifier 70 (See FIG. 32A) is detected by the envelope detector 90. The output of the envelope detector 90 is fed to the burst error detector 91. The burst error detector 91 compares the envelope detected by the envelope detector 90 with a predetermined level (See FIG. 32B). If the period for which the playback output continues to be below the predetermined level exceeds a predetermined period, a burst error is recognized. The results of burst error detection thus performed (See FIG. 32C) are fed to the first error-detection decoder 74.

Figure 3B:
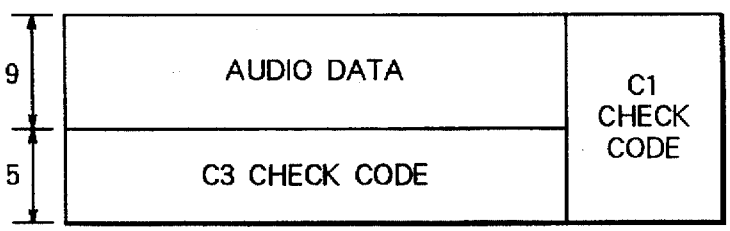

The playback digital data digitally demodulated by the digital demodulator 71 is fed to the sixth memory 73. In the sixth memory 73, the playback digital data supplied from the digital demodulator 71 for one track are collected and then an error correction code block shown in FIG. 3A and FIG. 3B is structured. When the structuring of an error correction code block shown in FIG. 3A and FIG. 3B is completed, the first error-correction decoder 74 corrects or detects errors, which have occurred during playback, using the C1 check code and C2 check code according to the algorithms shown in FIG. 33 and FIG. 27. (The C1 decoding and C2 decoding are identical to those in Embodiment 1, so that their description is omitted. The four-error correction flags are stored at predetermined addresses in the sixth memory 73. During the C2 decoding, the C1 error-detection flags and four-error correction flags are read simultaneously, and, depending on whether or not a burst error has occurred in a data block, the C1 error-detection flags are treated as described previously.) During the C2 decoding, whether or not a burst error has occurred is determined on the basis of the results of burst error detection provided by the burst error detector 91.

The playback digital data having been subjected to error correction by the first error-correction decoder 74 is sent track by track to the seventh memory 75. The seventh memory 75 stores the playback digital data that has been subjected to the C1 and C2 decodings, C1 and C2 error-detection flags, and four-error correction flags set as a result of the C1 decoding, at predetermined addresses. At this time, the result of burst error detection for each track is supplied from the first error-correction decoder 74 to the second error-correction decoder 76 and stored in a predetermined register in the second error-correction decoder 76.

Next, the operations of the second error-correction decoder 76 will be described briefly. The description of the operations that are the same as those in Embodiment 1 will be partially omitted. When the C1 and C2 decodings on data for one track are completed, the first error-correction decoder 74 sends the C2 decoding end signal to the second error-correction decoder 76. At this time, the burst error detection information is also output. When the C2 decoding end signal is received, the second error-correction decoder 76 checks the track number signal sent from the playback system control circuit 80. On the basis of the track number information, the writing addresses required for writing data read from the sixth memory 73 at predetermined addresses in the seventh memory 75, and control signals are supplied.

When data for ten tracks is structured in the seventh memory 75, the second error-correction decoder 76 starts error correction based on the C4 check code. First, interleaving is carried out In the seventh memory 75 in the same manner as the one (shown in FIG. 23) performed during recording. Thus, the playback digital data is read and fed to the second error-correction decoder 76. At this time, the data read addresses and control signals are supplied from the second error-correction decoder 76. When the playback digital data (codewords) is read from the seventh memory 75, the second error-correction decoder 76 generates a syndrome according to the algorithm shown in FIG. 34. The C1 error-detection flags, C2 error-detection flags, and four-error correction flags set as result of C1 decoding, which correspond to the playback digital data (codewords) are also read from the seventh memory 75. Erasure flags (error-detection flags) are then set as a result of the C4 decoding according to the algorithm shown in FIG. 29.

When the generation of the syndrome and setting of erasure flags are completed, the second error-correction decoder 76 checks if a burst error has occurred in a data block. If a burst error is found in the data block, only the erasure correction is executed on the basis of the error-detection flags set according to the algorithm shown in FIG. 29. At this time, error correction is not performed on the undetected errors at the time of the C1 and C2 decodings. (If there are errors undetected by the C1 and C2 decodings, the erroneous codewords (the playback digital data) are subjected to error detection.) If no burst error is found, the number of erasures is counted. If the number of erasures is less than nine, erasure flags are used to generate a modified syndrome, and erasure correction is then executed. At this time, the errors undetected by the C1 and C2 decodings are corrected. If the number of erasures is nine or more, the erasure flags are ignored and error correction is executed. Error-detection flags (C4 error-detection flags) set as a result of the C4 decoding are stored at predetermined addresses in the seventh memory 75.

When the second error-correction decoder 76 completes the C4 decoding of data for ten tracks, the playback digital data is read from the seventh memory 75 and sent to the eighth memory 77 and ninth memory 78. At this time, the special playback data (4× speed playback data and 18× speed playback data) reproduced from the special playback data recording areas is fed to the ninth memory 78, while the normal playback playback digital data is fed to the eighth memory 77. At this time, the C4 check codes are removed. When the playback data stored in the eighth memory 77 according to the sync block format shown in FIG. 17B is read out, the playback data for five sync blocks is collected according to the headers H1 and H2. The headers H1 and H2 are then removed, whereby the original, two transport packets are restored and supplied. The playback data transformed into transport packets is sent to the switch 79.

The switch 79 selects the output of the eighth memory 77 in the normal playback mode according to the select information sent from the playback system control circuit 80. The headers H1 and H2 are removed from the normal playback data, which has been stored according to the sync block format shown in FIG. 17B, during the data reading, whereby the original transport packets are restored (See FIG. 17A) and sent to the switch 79. The normal playback data read from the eighth memory 77 is sent through the output terminal 82 by way of the switch 79.

In Embodiment 1 or Embodiment 2, the C1, C2, and C4 decoding is executed as described above, so that even if a burst error occurs, the number of undetected errors can be restrained adequately and deterioration of picture quality in the normal playback mode can be reduced. Furthermore, a burst error can be detected by the aforesaid configuration, and error-correction decoding can be achieved successfully. This results in excellent picture quality in the normal playback mode. When the digital VTR is used as a storage media for a computer or the like, a burst error involving up to one hundred sync blocks can be corrected, and the digital VTR can be used to record programs or the like. Where the sixth and seventh memories 73 and 75 are used in common for error-correction decoding, when the C1, C2 and C4 decoding is performed after data is temporarily stored in the memory and a data block is structured, it may be so arranged that erasure correction is performed on the data to which four-error correction flag is appended when C2 and C4 decoding is performed after the detection of a burst error in the data block. This is effective in reducing the number of errors undetected by the C2 and C4 decoding. Excellent reproduced pictures can be obtained.

Embodiment 3

Since the digital VTR's in Embodiment 1 and Embodiment 2 have the aforesaid configurations, the playback data rate for special playback data for different fast playback speeds can be set to large values, and this results in the improved picture quality in the fast playback mode, and in the normal playback, miscorrection during the C4 decoding can be reduced adequately, and the normal playback can therefore be achieved successfully.

In Embodiment 1 and Embodiment 2, the format shown in FIG. 19 (or FIG. 20) is adopted as a recording format. The recording format is not limited to the illustrated one, but may be any other recording format by which the special playback data is separated from the input data, and recorded in predefined areas on a recording medium. In a digital signal recording apparatus, playback device, or recording/playback device (for example, a digital VTR or digital disk player) that adopts such a recording format, the number of repetitions of special playback data in the same recording format is switched depending on the recording mode, such that the special playback data can be recorded efficiently, and, in addition, the data rate of the special playback data in the fast playback mode can be improved and the picture quality in the fast playback mode can be upgraded. The decoding algorithms shown in FIG. 25 to FIG. 30, FIG. 33, and FIG. 34 may be used for decoding digital data having been three-dimensionally coded and transmitted.

In Embodiment 1 and Embodiment 2, a (85, 77, 9) Reed-Solomon code is applied as an error correction code in a recording direction, and a (149, 138, 12) Reed-Solomon code is applied in a perpendicular direction, and error-correcting code blocks on ten tracks are collected to structure a data block. A (138, 128, 11) Reed-Solomon code is applied as a C4 check code. Thus, a three-dimensional error correction code is configured. Alternatively, a (149, 139, 11) Reed-Solomon code or a (135, 125, 10) Reed-Solomon code (the code is structured using the video data except VAUX) may be used as the C4 check code. The error correction codes for error correction in the recording direction and perpendicular direction are not limited to the above examples. Furthermore, the error correction codes are not limited to Reed-Solomon codes but may be BCH codes or the like. Nevertheless, the aforesaid effects can be exerted.

For the error-correction decoding algorithms described in FIG. 25 to FIG. 30, FIG. 33, and FIG. 34, the shuffling pattern for the C4 check codes is not limited to the one shown in FIG. 23. For example, the shuffling pattern shown in FIG. 22 may also be used, and yet similar effects are obtained. The combination of the error-correction decoding algorithms shown in FIG. 25 to FIG. 30, FIG. 33, and FIG. 34 is not limited to the examples in Embodiment 1 and Embodiment 2. The procedure of detecting a burst error is not limited to the examples in Embodiment 1 and Embodiment 2. Burst error detection information obtained through another procedure may be used to control the C1, C2, and C4 decoding, and the aforesaid effects can still be exerted. The C1, C2, and C4 decoding algorithms are not limited to the ones in Embodiment 1 and Embodiment 2.

The C2 decoding algorithm shown in FIG. 27 need not be used in combination with the C4 decoding algorithm but can still enables successful decoding. The C2 decoding algorithm is not limited to the one shown in FIG. 27, but where the C4 decoding is used to correct all burst errors, but, according to a conceivable error correction algorithm, part of the error correction capability of the C2 check codes is allocated to the error detection during C2 decoding, and the probability of occurrence of errors undetected by the C2 decoding (miscorrection) can be reduced. (For example, when the maximum correctable number of erasures is nine, if the number of erasures is not less than ten, the number of errors to be corrected is determined to be four.)

The C4 decoding algorithm shown in FIG. 28 or FIG. 34 need not be combined with the C2 decoding algorithm, but still enables successful decoding. The C4 decoding algorithm is not limited to the one described in FIG. 28 or FIG. 34. Alternatively, when the C2 decoding algorithm is used to reduce the number of undetected errors, the error correction may be performed to the limit of the error correction capability of the C4 check code during the C4 decoding. With this alternative, similar advantages are attained. (For example, the maximum correctable number of erasures may be set to 10 without regard to the presence or absence of the burst error detection, or the maximum correctable number of erasures may be set to 9 when the burst error is not detected.) According to another C4 decoding algorithm, if a burst error is detected, only the erasure correction is executed but errors undetected by the C1 and C2 check codes are not corrected. This algorithm has the similar advantages.

The record data is not limited to an ATV signal or DVB signal. In Japan where a video signal is compressed in conformity with the MPEG2 system, the present invention can apply to recording of an ISDB signal or a signal compressed according to the MPEG1 system. The fast playback speeds are not limited to the 4× speed and 18× speed. Alternatively, the special playback data recording areas and fast playback speeds may be defined and determined according to the playback speeds required for a digital signal recording/playback apparatus. Even in this alternative, as long as identical track format is adopted for recording input data, the aforesaid effects are exerted.

For recording data, which has been transmitted in the form of transport packets typified by those conforming to the MPEG2 system, in a digital VTR typified by those conforming to the SD standard, according to Embodiment 1, two transport packets are converted into five sync blocks, and recorded. The present invention is not limited to this. When forming the sync block format, m transport formats may be used to generate data of n lines of sync blocks. (m and n denote positive integers.) By configuring the recording format on the recording media such that, when recording data of the sync block format obtained by the conversion, data of n sync blocks are arranged on the same track, the data of the transport packets can be efficiently converted into the sync block format. Since all the data of n sync blocks is recorded on the same track, when the sync block data is transformed into transport packets during playback, groups of n sync block formats can be separated easily using the track information and a sync block number, of a track identification signal, or the like. In particular, the circuitry of a playback system can be scaled down. It is unnecessary to record identification signals of n sync blocks, and the data recording areas can be used effectively. Moreover, the length of one sync block is not restricted to the one shown in FIG. 4.

The locations of the 4× speed playback data recording areas, 18× speed playback data recording areas, and error-correction code recording areas, or the numbers of the areas are not limited to those described. The track period need not be four tracks. In Embodiment 1, the fast playback speeds are set to 4× and 18× speeds as an example. The present invention is not limited to these speeds but may apply to other multiple speeds. As long as special playback data recording areas are defined along the scanning traces of the rotary heads 26a and 26b as described previously, the similar effects can be obtained.

Embodiment 4

Figure 35:
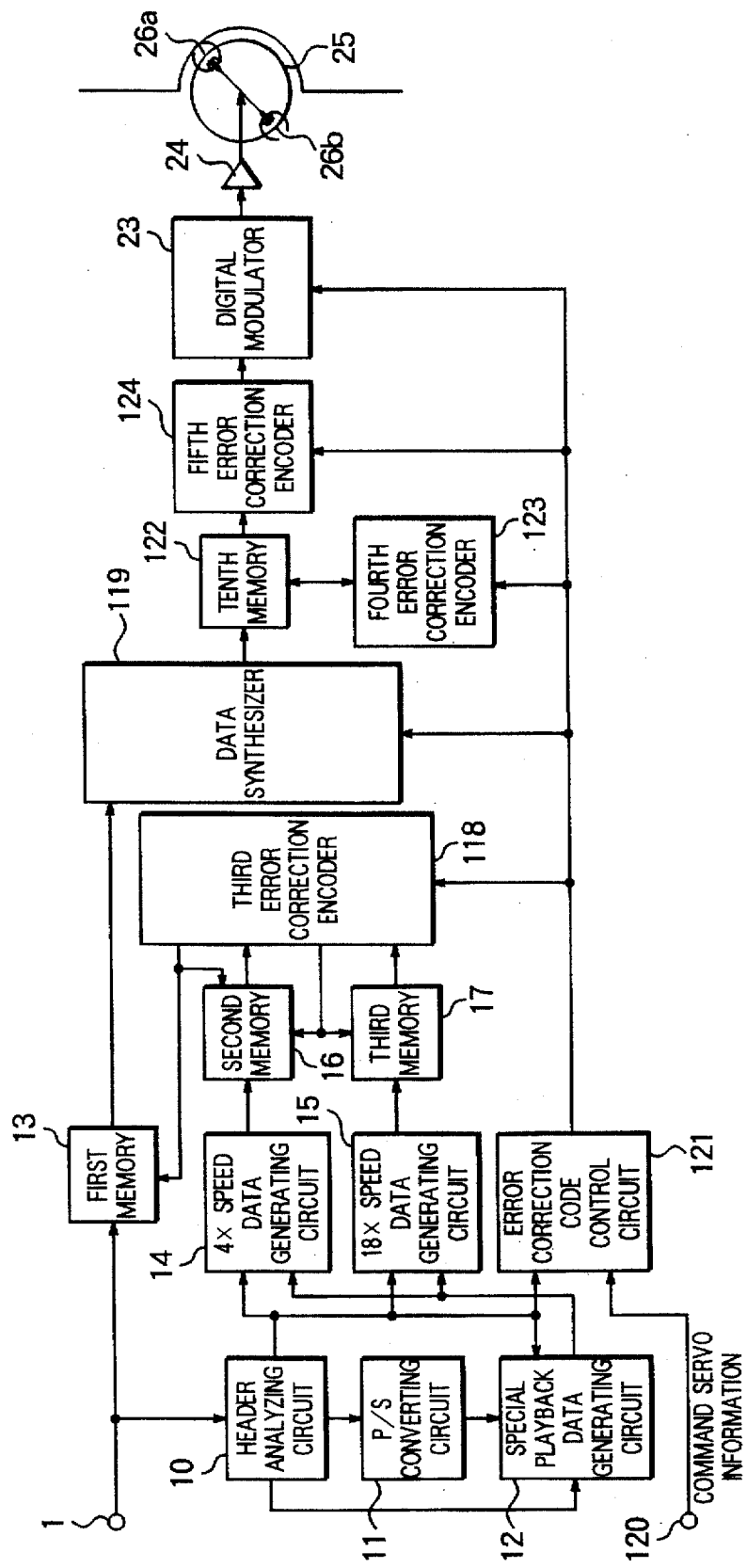
FIG. 35 is a block diagram of a recording system of a digital VTR in Embodiment 4.

FIG. 35 is a block diagram showing the configuration of a recording system in a digital VTR of another embodiment (Embodiment 4) of the invention. Reference numerals identical to those in FIG. 13 denote identical or corresponding members.

A third error correction encoder 118 is for appending special playback error correction code (hereinafter referred to as C5 check code) to respective special playback data output from the second memory 16 and third memory 17. A second data synthesizer 119 is for rearranging the input transport packets output from the first memory 13 and the data output from the third error correction encoder 118, into the predefined order of sync blocks. An input terminal 120 is for input of commands and servo information.

An error correction code control circuit 121 is for judging whether the recording mode of the error correction code during recording is a special playback error correction code recording mode or a normal playback error correction code recording mode, and outputting a control signal indicating which of the error correction codes (special playback error correction code and the normal playback error correction code) is to be recorded in an error correction code recording area, to be described later, to the third error correction encoder 118, the second data synthesizer 119, the second error correction code circuit 123, a fifth error correction encoder 124 and the digital modulating circuit 23.

Reference numeral 122 denotes a tenth memory, 123 denotes a fourth error correction encoder for appending error correction code (hereinafter referred to as C4 check code) to normal playback data, and 124 denotes a fifth error correction encoder for appending error correction codes in horizontal (recording) direction (C1 check code) and vertical (perpendicular) direction (C2 check code), defined by the SD standard, to the data output from the tenth memory 122. The digital modulator 23 applies digital modulation to the data output from the fifth error correction encoder 124. ID information and sync information are appended to the data of each sync block at the time of input to the digital modulator 23.

The configuration of the special playback data generating circuit 12 in Embodiment 4 is similar to that shown in FIG. 14.

The configurations of the 4× speed data generating circuit 14 and the 18× speed data generating circuit 15 in Embodiment 4 is similar to that shown in FIG. 15.

Figure 36A:
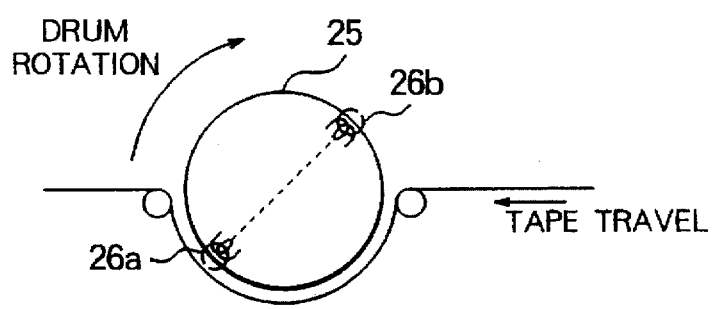
FIG. 36A to FIG. 36C are diagrams showing the arrangement of the rotary heads of the respective channels on a rotary drum typically used in a digital VTR of the SD standard.
Figure 36B:
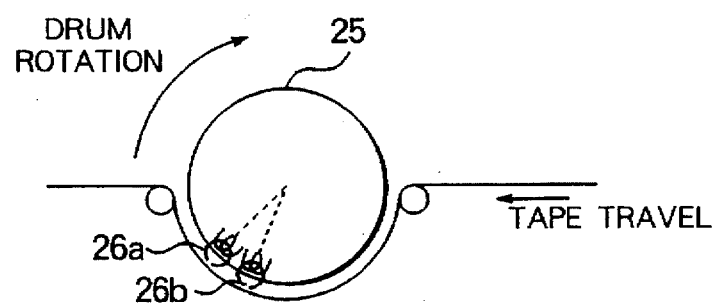
Figure 36C:
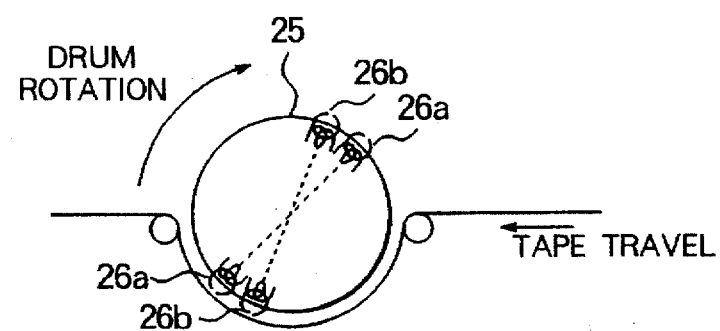

FIG. 36A to FIG. 36C are diagrams illustrating the arrangement of the rotary heads of the respective channels. FIG. 36A to FIG. 36C show the typical arrangements of the rotary heads 26a and 26b on the rotary drum 25 used with the SD standard. The system with the rotary head 26 having the arrangement of FIG. 36A or FIG. 36B will hereinafter called a 9000 rpm system. The rotary head arrangement shown in FIG. 36A is represented by "1 CH×2", the rotary head arrangement shown in FIG. 36B is represented by "2 CH×1", and rotary head arrangement shown in FIG. 36C is represented by "2 CH×2". The system with the rotary head 26 shown in FIG. 36C will hereinafter be called a 4500 rpm system. The following description relates to the system shown in FIG. 36A.

Figure 1:
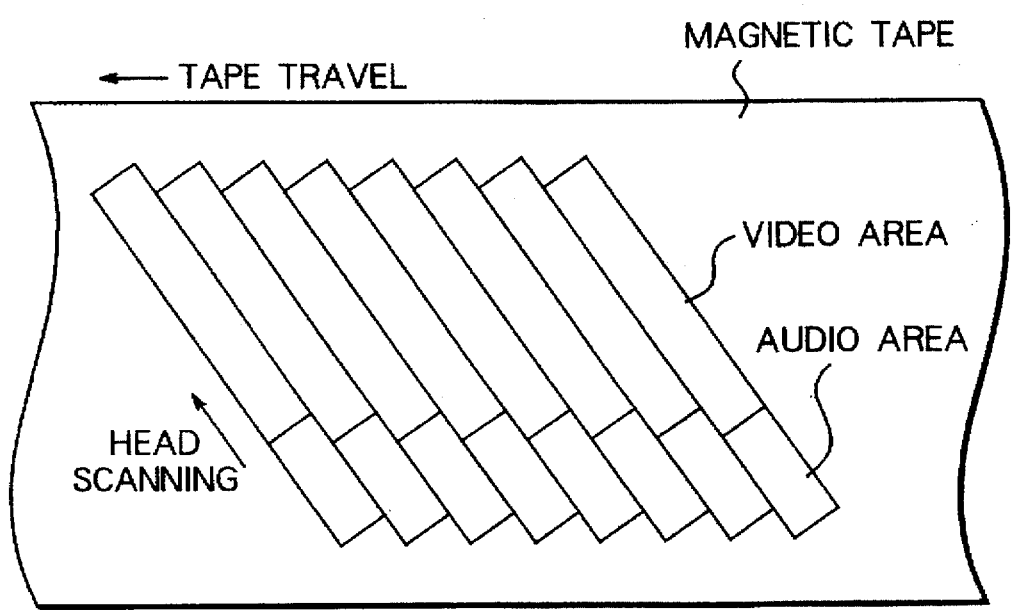
FIG. 1 shows a pattern of tracks in a conventional typical consumer digital VTR.
Figure 2:
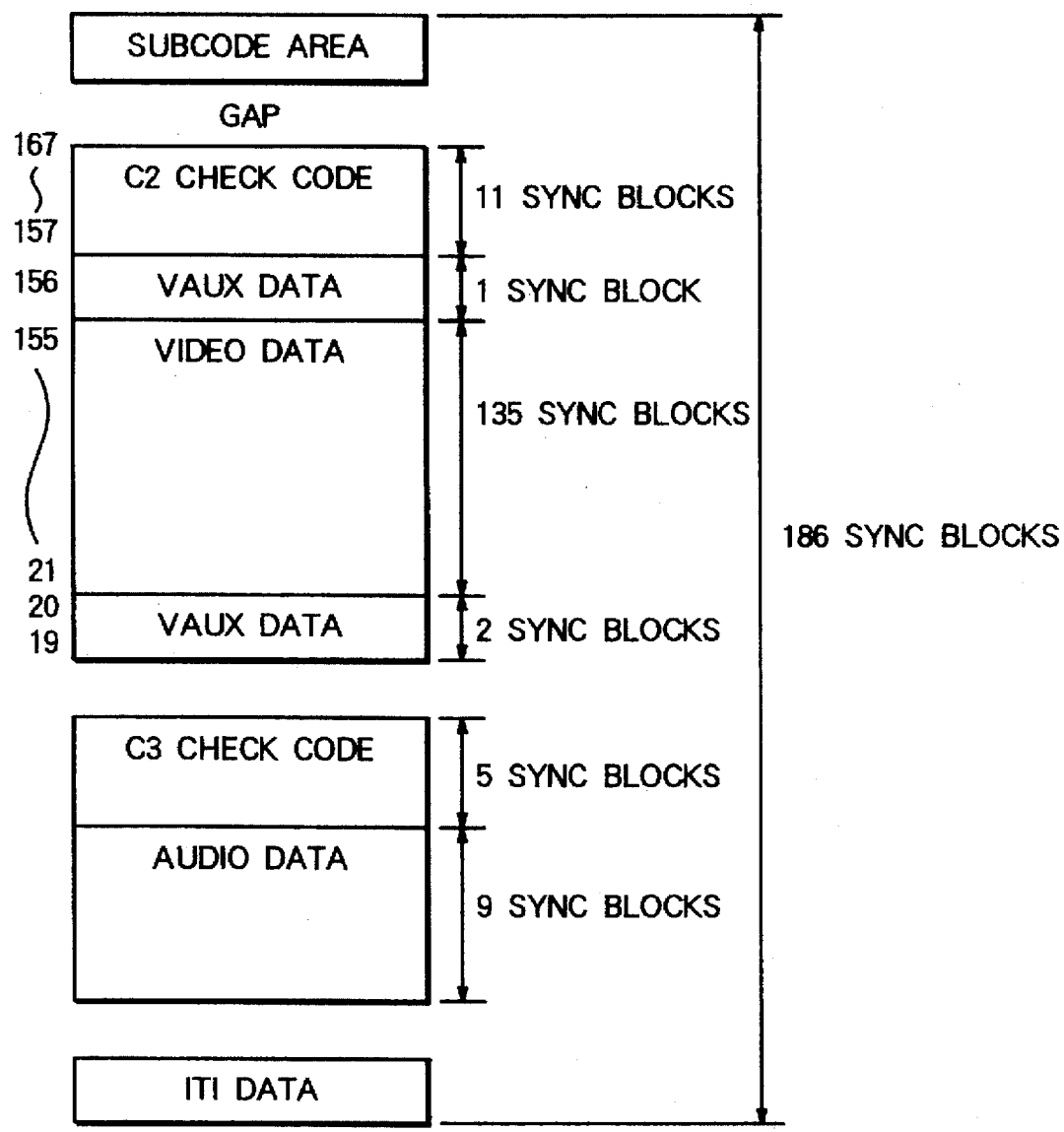
FIG. 2 shows a recording format for one track conforming to the SD standard.

The recording format within a track used in this embodiment is also as shown in FIG. 2. The data packet used in this embodiment is as shown in FIG. 17A and FIG. 17B.

In Embodiment 4, a bit stream is detected in transport packet units. Two detected transport packets are, as shown in FIG. 17B, transformed into a record data block (sync block format) composed of five sync blocks. In the drawing, reference numeral H1 denotes a first header. H2 denotes a second header. Recorded in the header H1 is identification data indicating a sync block number of the sync block of the five sync blocks (data areas within one sync block is composed of 77 bytes of data as shown in FIG. 4). Recorded in the header H2 is identification data indicating whether data concerned is video data or audio data, i.e., and the like. The sync byte appended to the head of each transport header need not be recorded. It is assumed in connection with Embodiment 4 that all the data within the transport packet is recorded.

The numbers of sync blocks that can be reproduced from one track at different fast playback speeds in fast playback mode are as shown in FIG. 18B.

FIG. 37 shows a track pattern of a period of four tracks, including disposition of the special playback data of Embodiment 4. As illustrated, special playback data recording areas and error correction code recording areas on the tracks are repeated at an interval of four tracks. The four tracks will hereinafter referred to as a track format. FIG. 38 shows disposition of the data at an an interval of four tracks (data of one track format), as shown in FIG. 37, on the magnetic tape.

Referring to FIG. 18B, FIG. 37 and FIG. 38, a recording format in Embodiment 4 will be described. Hereinafter, tracks on which data is recorded by the rotary head 26a will be referred to as A tracks, and tracks on which data is recorded by the rotary head 26b will be referred to as B tracks. In FIG. 37, reference numeral T1 denotes a first track on which data is recorded by the rotary head 26a of channel A. T2 denotes a second track on which data is recorded by the rotary head 26b of channel B. T3 denotes a third track on which data is recorded by the rotary head 26a of channel A. T4 denotes a fourth track on which data is recorded by the rotary head 26b of channel B. In Embodiment 4, data is recorded on magnetic tape according to the aforesaid pattern of four tracks of the first to fourth tracks; that is, a track format. In FIG. 37, f0, f1, and f2 written under the tracks indicate kinds of pilot signals recorded on the tracks as reference signals used for tracking control during playback. In Embodiment 4, the normal playback data, special playback data, and C4 check codes are recorded in a video area consisting of 135 sync blocks except a C2 check code recording area and VAUX data recording areas. In FIG. 37, the video area of 135 sync blocks other than the C2 check code recording area and VAUX data recording area in the video area is shown.

In FIG. 37, A0 to A4 denotes the disposition of the 18× speed playback data recording areas on the magnetic tape. The width of each of the 18× speed playback data areas (A0 to A4) is 5 sync blocks, and the 18× speed playback data areas are at five locations on each of the A tracks (T1 and T3), as illustrated. The areas with identical reference marks are used for recording identical data.

In the same way, B0 denotes the disposition of a 4× speed playback data recording area on the magnetic tape. The width of the 4× speed playback data recording area is 25 sync blocks. The 4× speed playback data recording area is provided at one location on T2 track, as illustrated.

In the same way, D0 to D5 denote the disposition of the error correction code recording areas on the magnetic tape. The width of each of the error correction code recording areas (D0 to D5) is 5 sync blocks. The recording area of D1 is provided adjacent the 4× speed data recording area. The area of D4 is provided at the same height (position in the longitudinal direction of the track) as the recording area of D1.

The number of sync blocks allocated to each data recording area is determined by the data shown in FIG. 18B. That is, it is seen from FIG. 18B that, with a 9000 rpm system, 62 sync blocks can be obtained from one track during 4× speed playback. During 18× speed playback, 10.9 sync blocks can be obtained from one track. On the basis of these, the data disposition on the magnetic tape for the respective special playback speeds is as shown in FIG. 37.

The input transport packets are recorded in the video area other than the special playback recording areas (A0 to A4, B0), error correction code recording areas (D0 to D5), C2 check code and VAUX recording areas. (The area will hereinafter referred to as a main area.)

The method of recording error correction codes featuring this embodiment will next be described. As was described in connection with the prior art example, data compression is applied to the ATV signal, using a method of compression based on motion compensated prediction. When, therefore, an error is detected in the playback data, the error may propagate a plurality of fields or frames, and the resultant picture is disagreeable. Where the digital VTR of the SD standard is used as storage media for storing data or programs for computers or the like, it has been desired to have a strong error correction capability to restore data which has not been reproduced, due to drop-out which occurs because of scratches on the tape or dust attached on the magnetic tape.

In the fast playback, the error correction using the C1 check code alone is applied to the playback data, as was described in connection with the prior art example, so that error occurrence frequency is high, and the playback picture during special playback is disagreeable.

The amount of appended data which can be recorded on the magnetic tape is limited, as was also described in connection with the prior art example. According to Embodiment 4, therefore, in order to effectively utilizes the limited data areas, the areas to which the error correction code is appended, are disposed on traces scanned by the rotary heads 26a and 26b, and where the user places importance on the picture quality during normal playback, the data is generated such that the error correction code is appended to the normal playback data, and where the user places importance on the picture quality during special playback, the data is generated such that the error correction code is appended to the special playback data.

In this way, the limited data recording areas can be effectively utilized, and the error correction code can be appended to the desired data. When the digital VTR is used as a storage media for computers or the like, identical recording format can be used to configure powerful error correction code. (The error correction code for normal playback is written in the error correction code recording areas.)

The data recorded in the error correction code recording area will next be described taking account of the above. As shown in FIG. 37, the recording areas for the error correction code are provided at six locations in one track format, and each consists of five sync blocks. In the mode for recording the error correction code (hereinafter referred to as C4 check code) for normal playback data, C4 check code is recorded at the six locations.

In the mode for recording error correction code (hereinafter referred to as C5 check code) for special playback data, C5 check code for 18× speed playback data is recorded in the D0 and D3 areas, and C5 check code for 4× speed playback data is recorded in the D1 area. Data of a predefined value, e.g., a predefined fixed value (for instance all "0"), is recorded in the D2, D4 and D5 areas. When the normal playback is made from the magnetic tape on which error correction code for special playback, since the data in the areas (D2, D4 and D5) are of a fixed value, it is possible to improve the error correction capability of the C2 code in error correction decoding during normal playback. (With regard to the above-mentioned symbols in the C2 decoding, the predefined fixed value is recorded, so that it is possible to recognize that there is no error, and the error correction capability can be improved).

The method of configuring the C4 check code and C5 check code will be described later. The switching of the error correction code recorded in the error correction code recording area is made based on the error correction code recording mode signal output from the error correction code control circuit 121.

The data in the 4× speed playback data recording area (B0) can be reproduced from one track during one scan of the rotary head 26b in 4× speed playback. The data in the 18× speed areas A0 to A4 and the error correction code recording area D0 (or D3), i.e., these six areas, can be reproduced from six tracks during one scan of the rotary head 26a in 18× speed playback.

When the error correction code recorded in the error correction code recording area is the C5 check code, the recording area is used to apply the error correction to the special playback data during special playback. When it is the C4 check code, it is disregarded during the special playback. During normal playback, when the error correction code recorded in the above-mentioned area is the C4 check code, the error correction code is used to apply error correction to the playback digital data. When it is the C5 check code, the data is disregarded during the normal playback. Details of the method of configuring the error correction code for the normal playback and the special playback will be described later.

Details of the playback system will also be described later. But, according to the data disposition of one track format (recording format) shown in FIG. 37, the rotary heads 26a and 26b scan the ITI areas and the sub-code areas on the magnetic tape during 4× speed playback and 18× speed playback. That is, the during special playback, tracking control is achieved using the pilot signals f0, f1 and f2 read from the ITI areas, and the additional information, such as time information and item-of-music number information recorded in the sub-code area, is reproduced.

By repeating the track format shown in FIG. 37, data is recorded on the magnetic tape. FIG. 38 shows the recording format on the magnetic tape. In the figure, the 4× speed playback data (recorded in the B0 area) is recorded twice (see FIG. 38), and the 18× speed playback data is recorded nine times. That is, identical 18× speed playback data is recorded on two tracks within one track format (four tracks), so that, in all, identical data is recorded 18 times. (The special playback data for 18× speed is switched at an interval of 36 tracks.) In FIG. 38, the areas with identical reference marks are used for recording identical data.

In FIG. 38, special playback data with an error correction code appended thereto is recorded in the error correction code recording area. With regard to the 18× speed playback data, a1, a2, a3, a4 and a5 (a6, a7, a8, a9 and a10) are used for generating the C5 check code. The generated C5 check code is recorded in d18,1 (d18,2) area. That is, data of a1, a2, a3, a4, a5, and d18,1 form one error correction block for 18× speed playback data. Similarly, the data of a6, a7, a8, a9, a10, and d18,2 form one error correction block for 18× speed playback.

With regard to the 4× speed playback data, the data in the 4× speed playback data recording area and the error correction code recording area provided adjacent the 4× speed playback data recording area is used to form one error correction block for 4× speed playback data. Specifically, b1 and d4,1, or b2 and d4,2, or b5 and d4,5 are used to form one error correction block for 4× speed playback data. A fixed value data is recorded in the area denoted by d0,0 in the mode for recording error correction code for special playback. In the mode for recording error correction code for normal playback, the C4 check code is recorded in the error correction code recording areas (D0 to D5).

Next, FIG. 39A to FIG. 39G, FIG. 40 and FIG. 41 are used for describing the code configuration of the error correction code used in normal playback and special playback. First, the code configuration of the error correction code (C4 check code) for normal playback will be described. In Embodiment 4, data of 10 tracks are collected, and the collected data is interleaved to generate C4 check code. (245, 230, 16) Reed-Solomon code is used as the C4 check code. An example of interleaving will next be described with reference to FIG. 39A to FIG. 39G and FIG. 40.

FIG. 39A to FIG. 39G are diagrams for explaining the method of configuring the two-track data blocks for configuring the error correction code appended to the normal playback data according to this embodiment. FIG. 39A and FIG. 39B show a specific example of disposition of the ATV data, special playback data and error correction code (C4 check code or C5 check code) on A and B tracks. In the drawing, "A" and "B" respectively denote data of A and B tracks. In Embodiment 4, to effect interleaving over 10 tracks, first adjacent two tracks (T1 and T2 tracks, or T3, T4 tracks are made to form a pair) are used to form a two-track data block of 245 sync blocks. (see FIG. 39G)

The method of configuring a two-track data block of 245 sync blocks will next be described. In configuring data of 245 sync blocks, the 18× speed playback data recorded on the A tracks are removed. The reason for this is as follows. The error correction code adopted in the SD standard is formed of elements of Galois field defined by $GF(2^8)$. Accordingly, the maximum code length of the Reed-Solomon code defined by the elements of the Galois field is 255. If all the data on two tracks were used, the code length would be 270 and the error correction code could not be configured. According to this embodiment, the 18× speed playback data is removed to configure the two-track data block for normal playback. With regard to the 4× speed playback data, data is recorded only on T2 track, as shown in FIG. 37, so that normal playback error correction code is appended. This is to avoid increase in the size of the circuit for the identification of T2 and T4, and for configuring the two-track data block. In Embodiment 4, the 4× speed playback data is treated in the same way as normal playback data so as to reduce the size of the circuit. When the 4× speed playback data is removed, it is necessary to configure two two-track data blocks using the data of 4 tracks when configuring the two-track data block which will be described later, so that the control will be complicated and the circuit size will be increased.

In the digital VTR of the SD standard, when the frame frequency is 60 Hz, one frame of digital video signal is recorded on 10 tracks. The track number is appended in the ID signal in sequence from the head of the 10 tracks for recording one frame of data. Specifically, an identical number is appended to a pair of A and B tracks, so that track numbers No. 0 to No. 4 are appended. In the U.S.A., the frame frequency is 30 Hz, so that, in the digital VTR of the SD standard, track numbers are appended in the above described manner. In Embodiment 4, interleaving is effected over 10 tracks, and C4 check code can be appended to the data without appending additional information. When Embodiment 4 is applied to the PAL/SECAM zone, such as Europe, the frame frequency is 25 Hz, one frame of data is recorded on 12 tracks, so that track numbers 0 to 5 are appended. The interleaving is therefore effected at an interval of 12 tracks.

If the elements of the Galois field for the error correction code is changed to $GF(2^9)$, the generator polynomial for generating the error correction code and the bit width of one symbol will vary, so that they cannot be used in common with the error correction code circuit (e.g., multipliers, dividers, on the Galois field) conforming to the SD standard, and the bit width of one symbol is increased, so that the size of the circuit is enlarged. Accordingly, in Embodiment 4, a (245, 230, 16) Reed-Solomon code is used as the C4 check code as was described above. During generation of the error correction code for normal playback, the 18× speed playback data is removed to form a two-track data block of 245 sync blocks. With regard to the 4× speed playback data, although not in use during normal playback, this area is present only on T2 track, and if this area were removed, it would be necessary to configure the two blocks from four tracks, and the track period for generating the C4 check code would be be 20 tracks, so that the size of the circuit would be enlarged. According to Embodiment 4, therefore, the 4× speed playback data is used for generating the error correction code for normal playback. In Embodiment 4, the depth of interleaving is 10 tracks.

The method of configuring the error correction code according to Embodiment 4 will next be made, taking account of the above. First, the method of configuring a two-track data block of 245 sync blocks will be described with reference to FIG. 39A to FIG. 39G. In FIG. 39A, the 18× speed playback data areas [13] to [17] are first removed, as described above. The error correction code recording area [10] is also removed from the data area at the time of generating the C4 check code. FIG. 39C shows the normal playback data on A track having been extracted. FIG. 39B shows the disposition of the ATV data, special playback data, and error correction code data on the B tracks. The area [8] is a recording area for 4× speed playback data on T2 track, but a recording area for normal playback data on T4 track.

In Embodiment 4, when a two-track data block of 245 sync blocks is generated, a group of data from the area [7] and area [9], other than the area [8], (see FIG. 39D) and a group of data from the area [8] (see FIG. 39E) are generated. The data from the error correction code recording areas [10], [11] and [12] on A and B tracks are collected to form a group of data shown in FIG. 39F.

The groups of data shown in FIG. 39C, FIG. 39D and FIG. 39E, configured in the above described manner, are respectively divided into 21, 20 and 5 blocks, each consisting of 5 sync blocks. The data consisting of five sync blocks are rearranged such that, the data of B'1 block shown in FIG. 39E is at the head, and the data shown in FIG. 39C and FIG. 39D are disposed alternately, such as in the order of A1, B1, A2, B2, ... in the region Gcd. After the A21 data, B'2, B'3, B'4 and B'5 data are disposed, and then error correction code recording areas [11], [10] and [12] are disposed in sequence, as shown in FIG. 39G, to form a two-track data block of 245 sync block. Areas with identical reference marks in the drawings denote identical areas. For instance, the area [1] in FIG. 39A and the area [1] in FIG. 39C are identical. The reference numerals "0" and "76" indicating the position in the horizontal direction in FIG. 39G denote positions (addresses) of the data within the sync block, and the reference numerals "0" and "244" indicating the position in the vertical direction in FIG. 39G denote sync block addresses within the two-track data block of 245 sync blocks.

Figure 40:
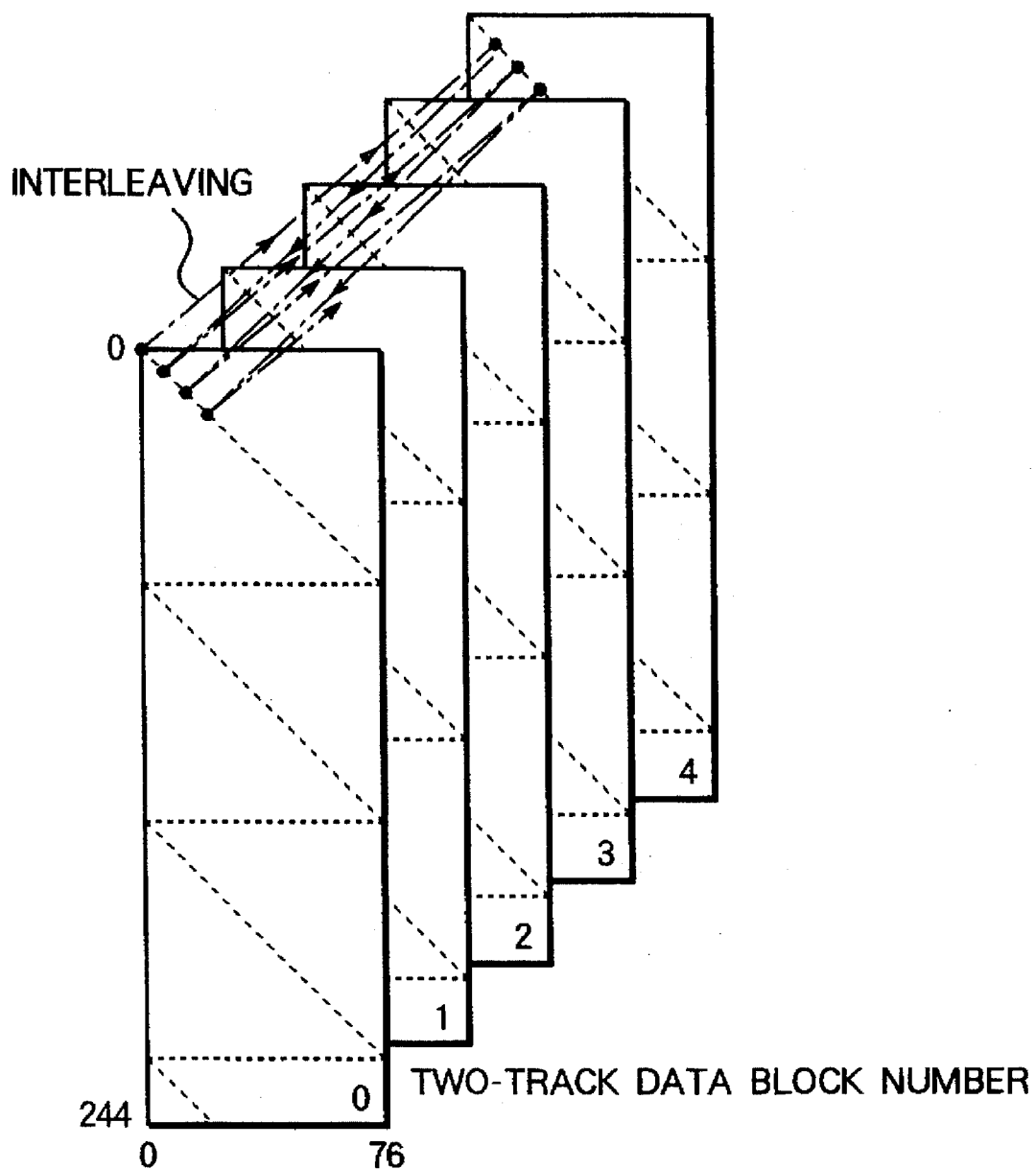
FIG. 40 shows the method of interleaving over five data blocks applied to the data when the error correction code is appended to the normal playback data in Embodiment 4.

Five two-track data blocks of data, each of the two-track data blocks consisting of 245 sync blocks and configured in the above described manner, are collected, and interleaving over 10 tracks is applied to the normal playback data to generate the C4 check code. FIG. 40 will next be used to describe the pattern of interleaving applied to generate the C4 check code.

FIG. 40 is a diagram for explaining the method of interleaving of five blocks applied to the data applied to the data when appending the error correction code to the normal playback data according this embodiment. If the data with the block number of the two-track data block shown in FIG. 39G represented by Bn ($0 \leq Bn \leq 4$), the sync block number of the sync block within the two-track data block represented by SBn ($0 \leq SBn \leq 244$), and the data number of the data within the sync block represented by Dn ($0 \leq Dn \leq 76$) is defined as D [Bn, SBn, Dn], then according to an embodiment of shuffling shown in FIG. 40, (D[0, 0, 0], D[1, 1, 1], D[2, 2, 2], ..., D[(i mod 5), i, (i mod 77)], ..., D[4, 229, 75], D[0, 230, 76], D[1, 231, 0], ..., D[4, 244, 13])

Here, the 230 bytes of D[0, 0, 0] to D[4, 229, 75] are information symbols, and 15 bytes of D[0, 230, 76] to D[4, 244, 13] are C4 check code. FIG. 40 schematically illustrates the shuffling. The interleaving is made in the direction of the chain lines, and interleaving of five two-track data blocks is effected. (In effect interleaving of 10 tracks is applied, since the two-track data blocks are configured as shown in FIG. 39G.) The dotted lines shown the direction of interleaving within the two-track data block. (One data is sampled every five two-track data blocks since interleaving is at an interval of five two-track data blocks.)

This operation is effected for all the data within the sync block at the head of each two-track data block. That is, when the C4 check code is generated, starting from the k-th data as counted from the sync block at the head of the j-th two-track data block, (D[j, 0, k], D[(j+1 mod 5), 1, (k+1 mod 77)], ..., D[(j+i mod 5), i (k+i mod 77)], ..., D[(j+229 mod 5), 229, (k+229 mod 77)], D[(j+230 mod 5), 230, (k+230 mod 77)], ..., D[(j+244 mod 5), 244, (k+244 mod 77)])

By varying k from 0 to 76 per two-track data block, and applying this to five two-track data blocks (varying j from 0 to 4), the interleaving is achieved to generate the C4 check code. In FIG. 40 and in the above expression, (X mod Y) represents the remainder obtained when an integer X is divided by an integer Y. The data for which the C4 check code has been generated through interleaving is recorded in the predefined areas shown in FIG. 39A and FIG. 39B. Where the mode for appending the error correction code is a mode for recording the special playback data error correction code, the C5 check code is recorded in the error correction code recording area, and the C4 check code is discarded.

The burst error correction capability of the C4 check code will next be described. For the two-track data block of 245 sync blocks shown in FIG. 39G, interleaving of 5 two-track data block deep as shown in FIG. 40 is applied. Since the minimum hamming distance of the C4 check code is 16, up to 15 erasures can be corrected. Since interleaving of five two-track data blocks deep as shown in FIG. 39G is applied, the maximum burst error correction capability is 15×5=75 sync blocks. Accordingly, since, in the case of A tracks, no C4 check code is appended to the 18× speed playback data area, a maximum burst error correction capability is 75+20 (=95) sync blocks. Similarly, for data on B tracks, a maximum burst error correction capability is 75 sync blocks. With regard to T2 tracks, 4× speed playback data is recorded twice, so that, in the event of burst error occurrence, with the data in the above area, substituting identical 4× speed data recorded on a different track (track other than the track on which a burst error has occurred), the maximum burst error correction capability is 75+25 (=100) sync blocks. It is therefore possible to restore data by means of the C4 check code, even when 75 sync blocks of data is not reproduced due to drop-out during normal playback.

Figure 41:
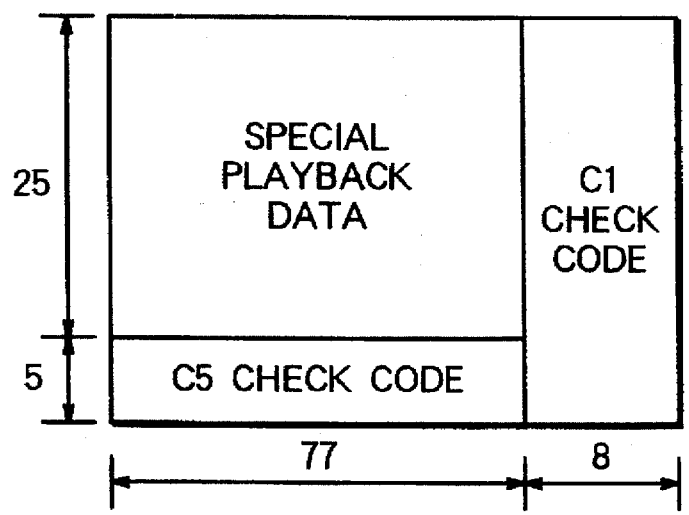
FIG. 41 shows the configuration of the error correction code (C5 check code) appended to the special playback data in Embodiment 4.

Description will next be made of the configuration of the error correction code appended to the special playback data with reference to FIG. 41. FIG. 41 shows the configuration of the error correction code (C5 check code) appended to the special playback data. (The data configuration shown in FIG. 41 will hereinafter referred to as error correction block.) A (30, 25, 6) Reed-Solomon code is used as the C5 check code. FIG. 39A shows the disposition of the 18× speed playback data and error correction code recorded on the A track. The data of the error correction block shown in FIG. 41 is partitioned into parts each consisting of five sync blocks, which are respectively recorded in the areas [13] to [17] shown in FIG. 39A. The C5 check code is recorded in the area [10].

The 4× speed playback data recorded on B tracks are recorded in the special playback area (area [8]), 25 sync blocks by 25 sync blocks.

In Embodiment 4, interleaving with the depth of data being 10 tracks is applied to generate the C4 check code, as described above. During such operation, the first memory 13, the second memory 16 and the third memory 17 convert the transport packets (FIG. 17A) input via the input terminal 1, into data in block units shown in FIG. 17B. Using the 4× speed playback data output from the third error correction encoder 118 and the ATV signal output from the first memory 13, and obtained by conversion into sync block units, a block data of 245 sync blocks shown in FIG. 39G is generated by means of the second data synthesizer 119. The 18× speed playback data output from the third error correction encoder 118 and the C5 check code appended to the special playback data for the respective playback speeds are stored in predefined addresses in a memory within the second data synthesizer 119.

The two-track data block of 245 sync blocks configured at the second data synthesizer 119 is stored in a predefined address in the tenth memory 122. The 18× speed playback data and the C5 check code appended to the special playback data for the respective playback speeds having been stored in the memory in the second data synthesizer 119 are also read from the second data synthesizer 119 at the same timing as the two-track data block, and stored in predefined addresses in the tenth memory 122.

The operation of the recording system will next be described with reference to FIG. 35 to FIG. 41. The transport packets input via the input terminal 1 are input to the first memory 13 and the header analyzing circuit 10. The header analyzing circuit 10 detects the transport header from the input transport packets and separates the transport packets transmitting video data. It then analyzes the data within the transport packets transmitting the video data that have been separated, and detects header information such as a sequence header, a picture header, and a slice header, and separates intra-pictures from the transport packets. The header information described above, and additional information appended to the header information are also separated.

The sequence header is header information provided in the bit stream of video signal, and includes identification of MPEG1 or MPEG2. The picture header is appended to the head of each frame or field, and indicates the start of the frame or field, and includes a mode signal indicative of the coding mode or the like. In MPEG2, when one frame (field) of data is transmitted, a picture of one frame (field) is divided into a plurality of slices. The slice header indicates the start of the slice. Details of the respective headers are described in the Draft of the MPEG2, which is hereby incorporated by reference.

The header information and the additional information (e.g., quantization table information) appended thereto, and intra-picture information detected by the header analyzing circuit 10 are supplied to the P/S converting circuit 11, the 4× speed data generating circuit 14 and the 18× speed data generating circuit 15.

The P/S converting circuit 11 applies P/S conversion to the data of the input transport packets, to obtain bit stream data of one bit. The transport packet data having been converted into one-bit serial data is input to the special playback data generating circuit 12. The operation of the special playback data generating circuit 12 is similar to that described with reference to FIG. 14 in connection with Embodiment 1.

The operation of the error correction code control circuit 121 will next be described. In accordance with the command information input via the input terminal 120, the error correction code control circuit 121 outputs a signal indicative of the error correction code recording mode (special playback error correction code recording mode or normal playback error correction code recording mode) to the third error correction encoder 118, the second data synthesizer 119, the fourth error correction encoder 123, the fifth error correction encoder 124 and the digital modulator 23. It also outputs a track identification signal of a four-track period and track identification signal of a ten-track period on the basis of the servo information output from the travel control and drum rotation control systems. In Embodiment 4, the switching of the error correction code is effected by the output of the tenth memory 122.

The special playback transport packet data output from the 4× speed data generating circuit 14 and the 18× speed data generating circuit 15 are stored in the second memory 16 and the third memory 17. The second memory 16 and the third memory 17 store the input data in the form of transport packets and form the special playback data of one frame (field). One frame of special playback data formed at the second memory 16 and third memory 17 are read from the respective memories, transport packet by transport packet, and converted into data of 5 sync blocks, as shown in FIG. 17B, and output to the third error correction encoder 118. The reading from the second and third memories 16 and 17 is effected on the basis of the control signal output from the third error correction encoder 118. The H1 and H2 header information is appended at the time of input to the third error correction encoder 118.

The third error correction encoder 118 collects 25 sync blocks of the special playback data corresponding to each playback speed, having been converted into sync blocks, as shown in FIG. 17B, and form error correction block. The C5 check is then generated for and appended to each of the 4× speed playback data and 18× speed playback data. The 4× speed playback data and 18× speed playback data to which the C5 check code has been appended are input to the second data synthesizer 119. The generation of the C5 check code is effected on the basis of the control signal (data request signal) output from the second data synthesizer 119.

The ATV signal transport packets input via the input terminal 1 are input to and stored in the first memory 13. The data stored in the first memory 13 is read on the basis of the control signal output from the second data synthesizer 119. Two transport packets of the data input in transport units are converted into five sync blocks of data as shown in FIG. 17B, and output.

On the basis of the track identification signals of 4 tracks and 10 tracks output from the error correction code control circuit 121, the second data synthesizer 119 forms the two-track data block of 245 sync blocks shown in FIG. 39G. The number of repetitions of the special playback data is counted by an internal counter, and a data request signal for the special playback data is supplied to the third error correction encoder 118. The second data synthesizer 119 first reads the normal playback data for two tracks, from the first memory 13. The data read from the first memory 13 is stored in a memory provided in the second data synthesizer 119. Similarly, the special playback data and the C5 check code output from the third error correction encoder 118 are also stored in a memory provided in the second data synthesizer 119. The data stored in the second data synthesizer 119 are rearranged, and two-track data block of 245 sync blocks shown in FIG. 39G is formed and output to the tenth memory 122. The switching between the 4× speed playback data and the normal playback data on the B track is effected within the second data synthesizer using the track information of 4 tracks. The 18× speed playback data and the C5 check code for the special playback data are output from the second data synthesizer 119, following the two-track data block of 245 sync blocks, to the tenth memory 122.

The data output from the second data synthesizer 119 is written in predefined addresses of the tenth memory 122. The writing address and the control signal for the tenth memory 122 are supplied from the fourth error correction encoder 123.

The operation for generating the C4 check code will next be described. When the configuration of the 5 two-track data blocks are completed in the tenth memory 122, the fourth error correction encoder 123 outputs the reading address for reading the data for generating the C4 check code and the control signal to the tenth memory 122. In accordance with the control signal, data is read from the tenth memory 122. (The data read is interleaved as shown in FIG. 40. That is, interleaving is applied to the reading addresses output from the fourth error correction encoder 123.) The fourth error correction encoder 123 generates the C4 check code on the basis of the data read from the tenth memory 122. The C4 check code generated by the fourth error correction encoder 123 is stored in the C4 check code storage area within the tenth memory 122. When the C4 check code for the five two-track data blocks is generated, the data stored in the tenth memory 122 is output to the fifth error correction encoder 124.

Reading of the data from the tenth memory 122 is effected on the basis of the read addresses and the control signal output from the fifth error correction encoder 124. The fifth error correction encoder 124 reads the data stored in the tenth memory 122, on the basis of the mode signal and the track identification signal output from the error correction code control circuit 121, with the sync blocks being rearranged in the order shown in FIG. 39A and FIG. 39B. The selection between the C4 check code and C5 check code is effected by switching between the read addresses (C4 check code read address and the C5 check code read address) output from the fifth error correction encoder 124 on the mode signal output from the error correction code control circuit 121. According to Embodiment 4, in the case of the special playback error correction code recording mode, when the C5 check code is read from the tenth memory 122, fixed value data is recorded in D2, D4 and D5 in FIG. 37. This is achieved by storing in advance the fixed value data in the predefined address in the tenth memory 122.

The data read from the tenth memory 122 is stored in a memory within the fifth error correction encoder 124, in track units. When one track of data is configured, the fifth error correction encoder 124 appends, to the above-mentioned data, the error correction code according to the SD standard shown in FIG. 3A and FIG. 3B. That is, for the above-mentioned data recorded in the video area, a C2 check code is first generated and appended in track units. For the data with the C2 check code having been appended, a C1 check code is next generated and appended. With regard to audio areas, C3 check code and C1 check code are similarly appended. In Embodiment 4, the audio data areas are not used, and filled with dummy data of a fixed value, to allow for modification or adaptation which may be required of the format in the future. The data with the error correction code having been appended according to the SD specification is read from the fifth error correction encoder 124, at predefined timings, in track units. At this time, a track format according to the SD standard is generated. Specifically, a gap of five bytes is provided for appending a sync signal, and an ID signal between adjacent sync blocks, and a gap and the like of a predefined amount are provided for ITI area, sub-code area and between data, and the above-mentioned data is then output. The output of the fifth error correction encoder 124 is input to the digital modulator 23.

The digital modulator 23 first appends the sync signal and the ID signal to each sync block. At this time, a flag information indicating the type of the error correction code is appended in the ID signal with regard to the sync blocks recorded in the error correction code recording areas. During playback, the flag in the ID signal is used to identify the type of the error correction code. The data with the ID signal having been appended is subjected to digital modulation, and amplified by the recording amplifier 24, and recorded on the magnetic tape, by means of the rotary heads 26a and 26b.

Figure 42:
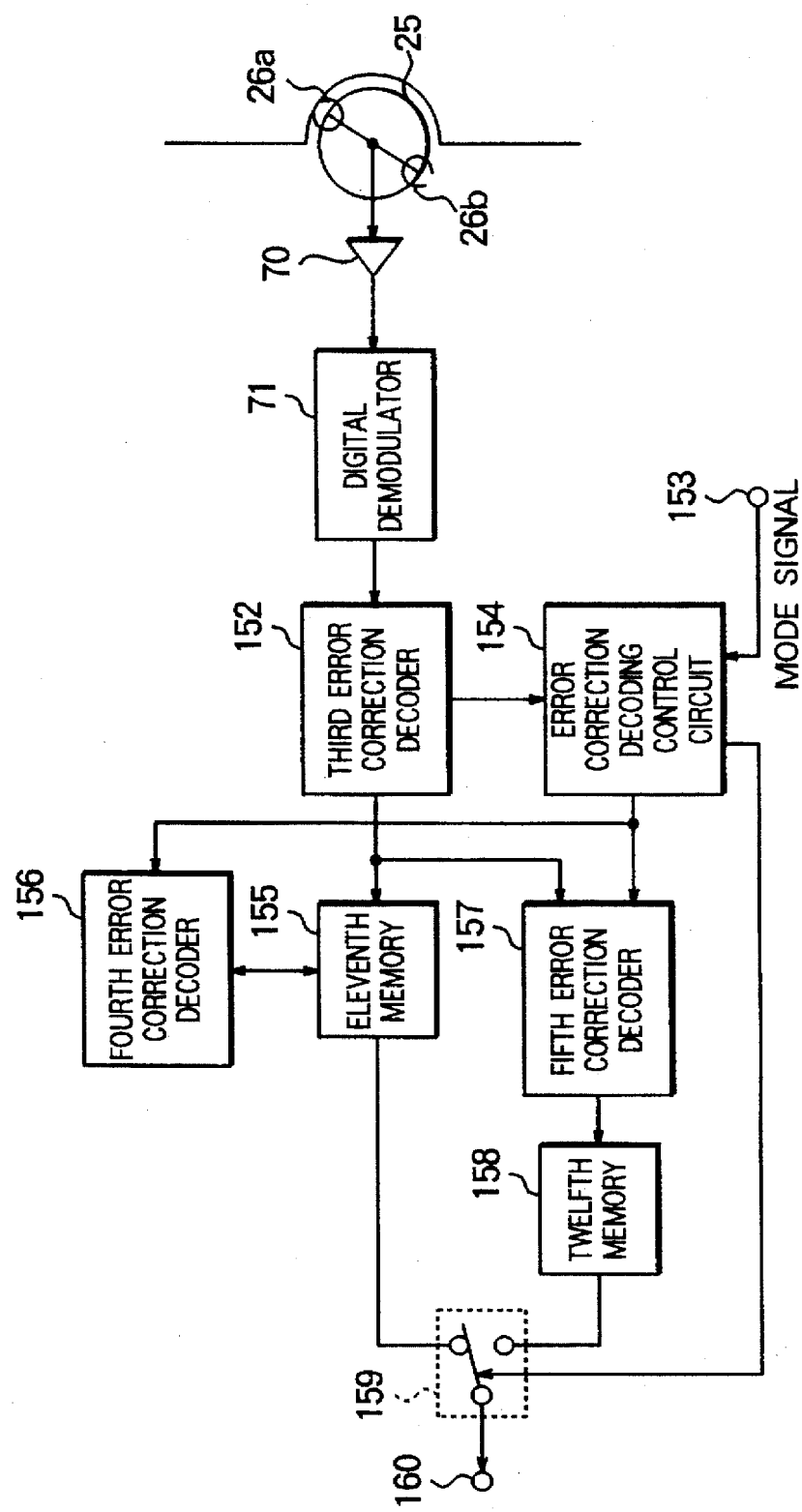
FIG. 42 is a block diagram showing the playback system of a digital VTR in Embodiment 4.

Description will next be made of the configuration of the playback system of the digital VTR for playing back the magnetic tape having the above-described recording format. FIG. 42 is a block diagram showing the playback system of the digital VTR according to this embodiment. The reference numerals identical to those in FIG. 31 and FIG. 35 denote member having identical configuration and operating in the same way, so that their description is omitted. In the figure, a third error correction decoder 152 is for performing correction and detection of errors in the playback signals using the C1 check code and C2 check code. The third error correction decoder 152 detects the ID signal in the playback signal and outputs it to an error correction decoding control circuit 154, to be described later.

An input terminal 153 is for input of the mode signal (normal playback or special playback) indicating the mode of playback being conducted. The error correction decoding control circuit 154 is responsive to the ID signal and the playback mode signal output from the third error correction decoder 152, for outputting a control signal for switching between the error correction decoding process for special playback and the error correction decoding process for normal playback, to a fourth error correction decoder 156 and a fifth error correction decoder 157, and also outputting a switching signal for a switch 159. The error correction decoding control circuit 154 also detects the track number information, sync block address information, information on the type of the error correction code recorded in the error correction code recording area. 155 denotes a eleventh memory for storing the normal playback data. The fourth error correction decoder 156 receives the control signal (the result of the ID information and the playback mode signal detected at the third error correction decoder 152) output from the error correction decoding control circuit 154, and if the C4 check code is recorded in the above-mentioned error correction code recording area, applies error correction decoding using the C4 check code to the data stored in the eleventh memory 155, and corrects or detects errors in the playback signal. The fifth error correction decoder 157 receives the control signal output from the error correction decoding control circuit 154, and if the C5 check code is recorded in the above-mentioned error correction code recording area, applies error correction decoding using the C5 check code to the special playback data. A twelfth memory 158 is for storing the special playback data output from the fifth error correction decoder 157. Reference numeral 160 notes an output terminal.

Figure 43:
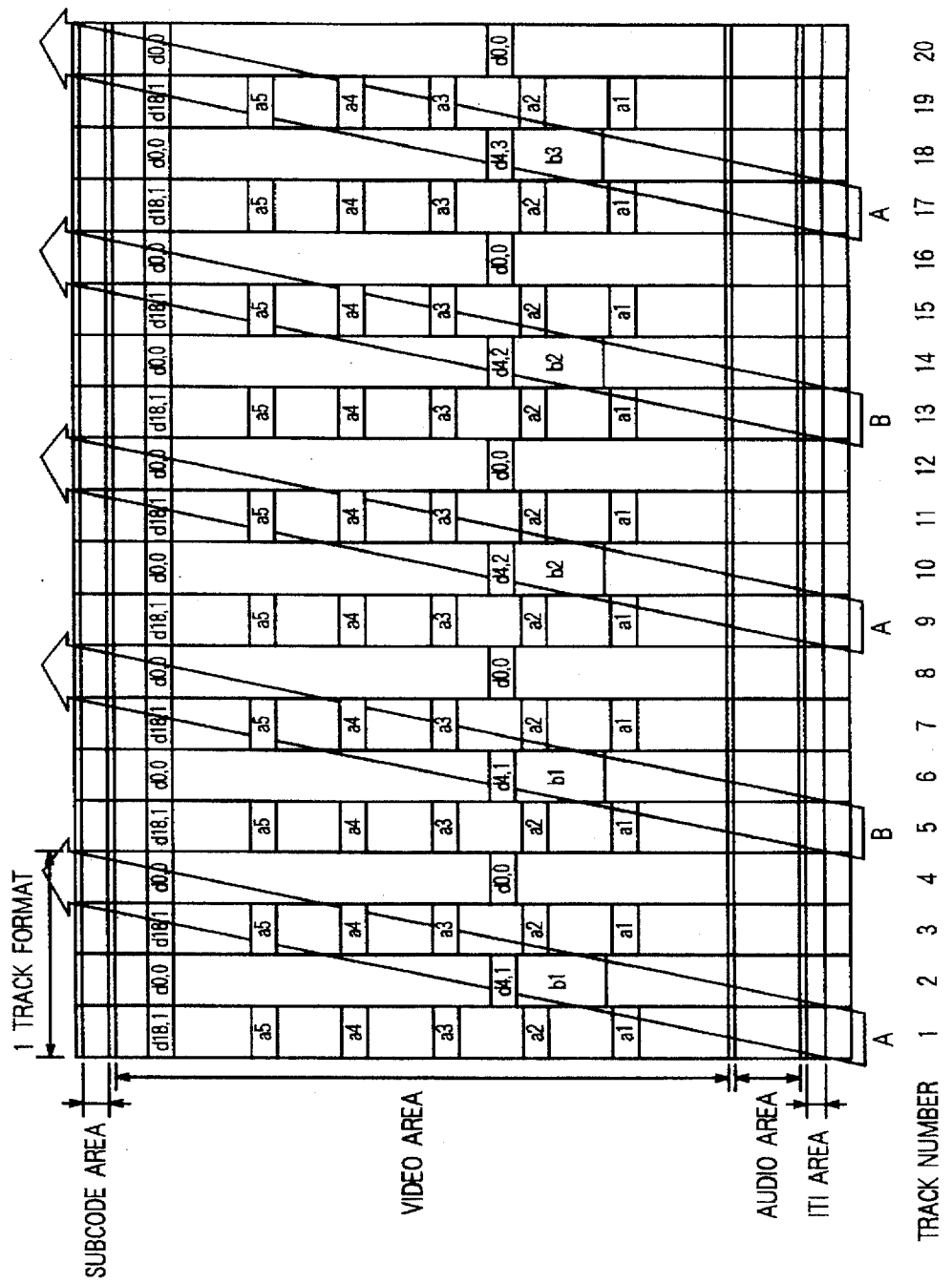
FIG. 43 shows the track pattern and the scanning traces of the rotary heads during 4× speed playback using the 1 ch×2 drum configuration from a magnetic tape having the recording format of FIG. 38.

Before describing the operation of the playback system, the operation of the 4× speed and 18× speed playback of the digital VTR according to Embodiment 4 is described with reference to FIG. 43 and FIG. 44. FIG. 43 shows the relationship between the track pattern and the scanning traces of the rotary heads which result when 4× speed playback is effected with a 1 ch×2 drum configuration from a magnetic tape having the recording format shown in FiG. 38. In the figure, the scanning traces denoted by A are traces by a rotary head 26a of an A channel. Similarly, the scanning traces denoted by B are traces by a rotary head 26b of a B channel. As was described above, the 4× speed playback data is recorded on B tracks, and identical data is recorded repeatedly for 2 track format periods (identical data is recorded at two recording areas). Accordingly, as shown in FIG. 43, each of the rotary heads 26a and 26b scans the scanning periods of the rotary heads 26a and 26b, so that the recorded 4× speed playback data recorded by the B-channel rotary head 26b can be reproduced. At the same time, the rotary heads 26a and 26b can reproduce data from the sub-code area, as shown in FIG. 43. The tracking is achieved at the ITI area. Details of the 4× speed playback using a digital VTR having a 2 ch×1 drum configuration is omitted, but in short the rotary head 26a scans the left side of the rotary head 26b in the 1 ch×2 drum configuration (in FIG. 43, the scanning traces of the rotary head 26a are on the left side of and adjoining to the scanning traces of the rotary head 26b), and it is therefore possible to reproduce the 4× speed special playback data recorded by the B-channel rotary head 26b.

Figure 44:
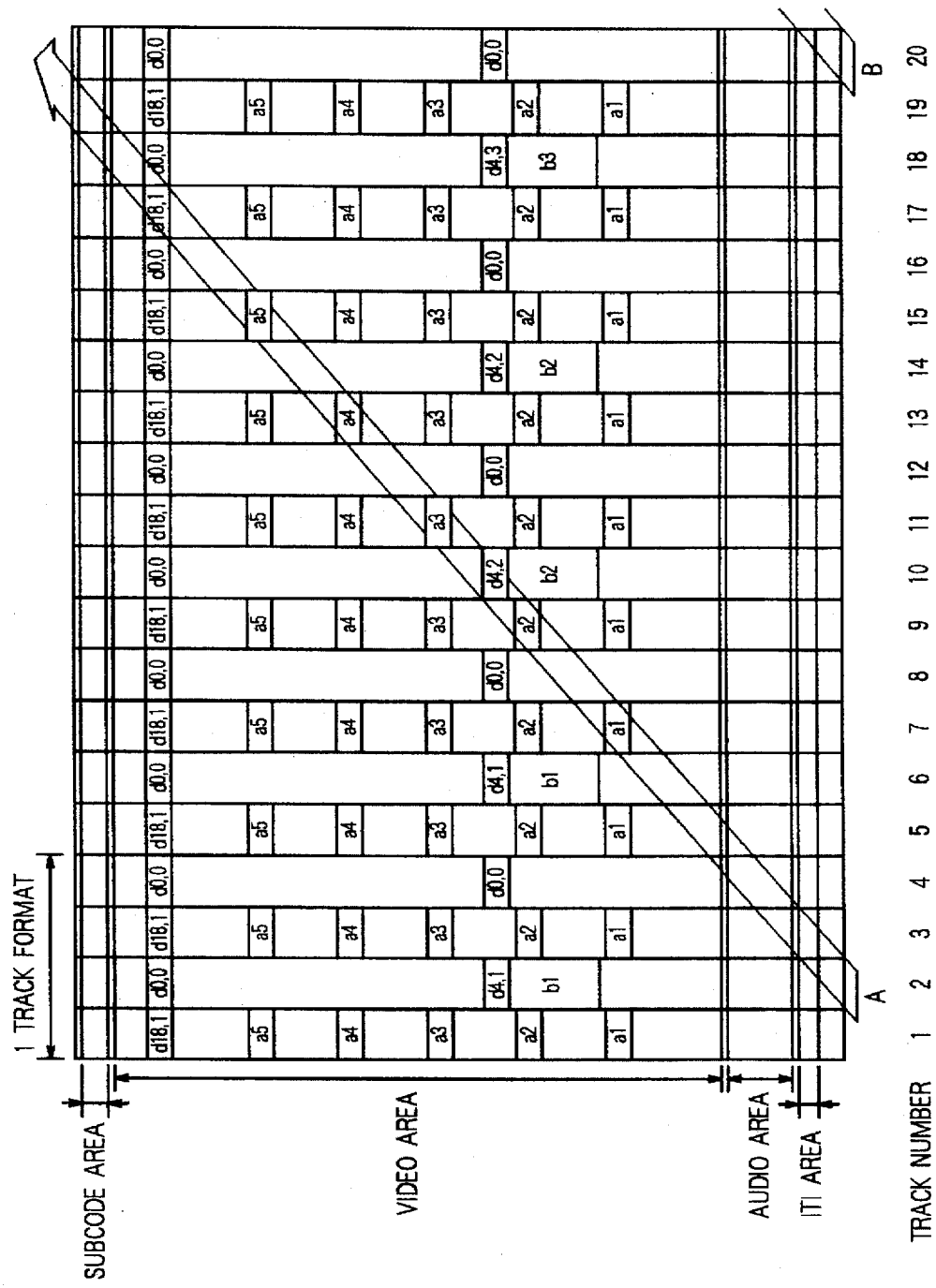
FIG. 44 shows the track pattern and the scanning traces of the rotary heads during 18× speed playback using the 1 ch×2 drum configuration from a magnetic tape having the recording format of FIG. 38.

FIG. 44 shows the relationship between the track pattern and the scanning traces of the rotary heads which result when 18× speed playback is effected with a 1 ch×2 drum configuration from a magnetic tape having the recording format shown in FIG. 38. In the figure, the scanning traces denoted by A are traces by a rotary head 26a of an A channel. Similarly, the scanning traces denoted by B are traces by a rotary head 26b of a B channel. As was described above, the 18× speed playback data is recorded on A tracks, and identical data is recorded repeatedly for 9 track formats (identical data is recorded at 18 locations). Accordingly, as was described in connection with the prior art example, the 18× speed playback data recorded by the A-channel rotary head 26a can be reproduced. (As shown in FIG. 44, the 18× speed playback data can be reproduced by the A-channel rotary head 26a.) At the same time, the rotary head 26a can reproduce the signal from the sub-code area. Moreover, since the ITI area is also scanned, it is possible to achieve the tracking at the ITI area. Details of the 18× speed playback using a digital VTR having a 2 ch×1 drum configuration is omitted, as was the 4× speed playback, but in short the rotary head 26b scans the right side of the rotary head 26a in the 1 ch×2 drum configuration (in FIG. 44, the scanning traces of the rotary head 26b are on the right side of and adjoining to the scanning traces of the rotary head 26a), and it is therefore possible to reproduce the 18× speed special playback data recorded by the A-channel rotary head 26b.

The amount of data which can be reproduced from one track during 4× speed playback and 18× speed playback is as shown in FIG. 18B. That is, with a 9000 rpm system, it is 62 SB at 4× speed and 10.9 SB at 18× speed. The positions on the tracks from which the data is reproduced at −2× speed and −16× speed are identical to those for the 4× speed and 18× speed, so that −2× playback and −16× speed playback can be realized with the recording format shown in FIG. 38. Details of the playback from a magnetic tape having the above-mentioned recording format, with a 4500 rpm system are omitted, but, in short, the fast playback can be realized by setting the speed at 2× (93 SB) and 8× (13 SB). During the fast playback, it is possible to reproduce, apart from the special playback data, the error correction code recording area (4× speed playback data) or the error correction code recording area (18× speed playback) provided separately on the track. During normal playback, the rotary heads 26a and 26b reproduce from all the tracks. The above-mentioned error correction code recording area can be reproduced during fast playback (4× speed, 18× speed, −2× speed and −16× speed), and during normal playback, and the same recording area can be shared. (That is, whichever of the error correction codes is appended, the error correction code recording area can be reproduced during fast playback and normal playback.)

In the above description, the tracking during fast playback is achieved at the ITI area. The invention is not limited to such an arrangement. For instance, at the 18× speed playback, the tracking phase may be detected at one of the special playback data recording areas, and used for control. The tracking phase may alternatively be detected at a plurality of the special playback data recording areas, and used for control. With regard to the 4× speed playback, the tracking phase may be detected at an adjacent A track by the rotary head 26a, and used for control. Furthermore, rough adjustment of the tracking phase may be effected at the ITI area, and fine adjustment may be be effected at the special playback area. The above-mentioned tracking control method is effective when there is a track non-linearity, in a playback on a compatible device.

The operation of the normal playback of the playback system will next be described. The data reproduced from the magnetic tape via the rotary heads 26a and 26b on the drum 25 is amplified by the playback amplifier 70, and input to the digital demodulator 71. The digital demodulator 71 detects data from the input playback data, performs conversion into the playback digital data, and performs digital demodulation. The playback digital data obtained by digital demodulation at the digital demodulator 71 is input to the third error correction decoder 152. When the playback digital data is input, the third error correction decoder 152 separates the ID signal appended to the head of each sync block. and outputs the result of the separation to the error correction decoding control circuit 154. The playback digital data from which the ID signal has been separated is supplied to the third error correction decoder 152 where correction and detection of errors occurring during playback are effected using the C1 check code and C2 check code. The playback digital data having been subjected to error correction at the third error correction decoder 152 is supplied to the eleventh memory 155 and the fifth error correction decoder 157. The special playback data (4× speed playback data and 18× speed playback data) reproduced from the special playback data recording area is input to the fifth error correction decoder 157. The playback digital data other than the 18× speed playback data is input to the eleventh memory 155. Incidentally, in Embodiment 4, during normal playback, the error correction decoding operation using the C5 check code is not performed. (That is, the special playback data is input to the fifth error correction decoder 157, but no error correction decoding operation is not applied.)

The ID signal detected at the third error correction decoder 152 is input to the error correction decoding control circuit 154. The error correction decoding control circuit 154 detects the ID signals separated from the sync blocks which are recorded in the error correction code recording areas, and identifies the type of the error correction code using the appended identification flag data, and also detects, during normal playback, the numbers of the track and sync block which are being reproduced. It also detects the current playback mode from the playback mode signal input via the input terminal 153. The result of the identification of the error correction code, the track number, the sync block number and the playback mode information are supplied to the fourth error correction decoder 156 and the fifth error correction decoder 157, and the playback mode signal is supplied to the switch 159.

The playback digital data input in track units to the eleventh memory 155 is subjected to identification between A track and B track using the playback head information of the rotary heads 26a and 26b. The signal reproduced from A tracks and shown in FIG. 39A, and the signal reproduced from B tracks and shown in FIG. 39B are used to form, in the memory, two-track data blocks of 245 sync blocks. When the error correction code recorded in the error correction code recording area is normal playback error correction code (C4 check code), the fourth error correction decoder 156 uses the track number information output from the error correction decoding control circuit 154 to determines whether the error correction block (five two-track data blocks) using the C4 check code have been configured in the eleventh memory 155.

When the error correction block (five two-track data blocks) using the C4 check code shown in FIG. 40 is formed in the eleventh memory 155, the data is read from the eleventh memory 155 in a manner shown in FIG. 40, and error correction (hereinafter referred to as C4 decoding) using the C4 check code is applied to the normal playback data and 4× speed playback data. The read addresses indicative the memory locations in the eleventh memory 155 from which data is to be read, and the read control signal are output from the fourth error correction decoder 156. The data interleaving over five two-track data blocks is effected at the time of reading from the eleventh memory 155. (The control over the interleaving is effected by data read addresses output from the fourth error correction decoder 156.) The 18× speed playback data is discarded at the input of the eleventh memory 155. The data having been subjected to the C4 decoding is supplied via the switch 159 to the output terminal 160.

When the error correction code recorded in the error correction code recording area is the special playback error correction code, nothing is done and the playback digital data is read from the eleventh memory 155 and output to the switch 159. When the playback digital data is read from the eleventh memory 155, the 4× speed playback data and the data recorded in the error correction code recording area are discarded, and transport packets are re-configured on the basis of the header information (H1 and H2 header information) appended within the data of the five sync blocks, and the data is then output. (see FIG. 17A and FIG. 17B) In accordance with the selection control signal (playback mode signal) from the error correction decoding control circuit 154, the switch 159 selects the output of the eleventh memory 155.

The operation during special playback will next be described. The data intermittently reproduced from the magnetic tape, via the rotary heads 26a and 26b on the drum 25 is amplified by the playback amplifier 70, and input to the digital demodulator 71. The digital demodulator 71 detects data from the input playback data, and performs conversion into playback digital data and digital demodulation. The playback digital data subjected to digital modulation at the digital demodulator 71 is input to the third error correction decoder 152. When the playback digital data is input, the third error correction decoder 152 separates the ID signal appended to the head of each sync block, and outputs the result of the separation to the error correction decoding control circuit 154. The playback digital data from which the ID signal has been separated is supplied to the third error correction decoder 152, where correction and detection of errors in the special playback data is performed using the C1 check code. During the special playback, the data is reproduced intermittently, as was described in connection with the prior art example, so that the error correction block shown in FIG. 2 or FIG. 3A and FIG. 3B cannot be configured, and the error correction using the C2 check code and the error correction using the C4 check code are therefore not performed.

The playback digital data to which the error correction has been applied at the third error correction decoder 152 is output to the eleventh memory 155 and fifth error correction decoder 157. The special playback data reproduced from the special playback data recording area is stored in a memory provided in the fifth error correction decoder 157. The playback digital data is not written in the eleventh memory for the reason set forth above.

In the same way as in normal playback, the ID signal detected at the third error correction decoder 152 is input to the error correction decoding control circuit 154. The error correction decoding control circuit 154 detects the ID signal separated from the playback digital data recorded in the error correction code recording area, and identifies the type of the error correction code in accordance with the flag information appended to the ID signal, and detects the track number and the sync block number of the part currently reproduced. Furthermore, in accordance with the playback mode signal input via the input terminal 153, it detects the playback mode. The result of the identification of the error correction code, the track number and the sync block number, and the playback mode information (normal playback or fast playback information (4× speed playback, 18× speed playback, −2× speed playback mode, or −16× speed playback)) are supplied to the fourth error correction decoder 156 and fifth error correction decoder 157, and the playback mode signal is supplied to the switch 159.

When the error correction code recorded in the error correction code recording area is the C4 check code, the fifth error correction decoder 157 does nothing, and the reproduced special playback data is output to the twelfth memory 158 as it is. If it is the C5 check code, the error correction block shown in FIG. 41 is configured in the fifth error correction decoder 157, and error correction using the C5 check code is applied to the special playback data (the error correction is hereinafter referred to as C5 decoding). The data having been subjected to the C5 decoding is supplied to the twelfth memory 158. The output of the twelfth memory 158 is supplied to the switch 159. The switch 159 is controlled to select the output of the memory 158 during the special playback. When the special playback digital data is read from the twelfth memory 158, the data reproduced from the error correction code recording area is discarded, and transport packets are re-configured on the basis of the header information (H1 and H2 header information) appended in the data of five sync blocks. (see FIG. 17A and FIG. 17B) The error correction decoding control circuit 154 provides a selection control signal (playback mode signal) to control the switch 159 so that it selects the output of the twelfth memory 158 during the special playback.

The digital VTR according to Embodiment 4 is configured as described above, so that the error correction code recording area provided in the recording track is at a position which is reproduced during normal playback as well as fast playback, and the recording area can therefore be used in common, and the error correction code can be switched depending on the particular application (intended used), and the limited area for recording additional information can be utilized effectively. Furthermore, when the digital VTR is used as an external device for a computer or the like, the powerful error correction code can be appended with identical recording format.

The error correction code is generated according to the intended use, and when the playback picture quality during special playback is given an importance, the C5 check code is recorded In the error correction code recording area to improve the error correction capability during the special playback, while when the playback picture quality during normal playback is given an importance, the C4 check code is recorded in the above-mentioned area to improve the error correction capability during the normal playback. At the same time, the limited area on the magnetic tape can be utilized efficiently. When the digital VTR is used as an external storage device for a computer or the like, as is envisaged, power error correction code can be appended to the recording data with identical recording format, and it is therefore possible to use identical recording format for recording. Furthermore, the digital VTR which area already in use may be used as an external storage device for computers or the like. (Since the recording format is compatible, diversion (use for different applications) is possible.) Moreover, since the recording area on the magnetic tape is used efficiently as described above, the amount of data which can be allotted to the special playback data is increased, and the playback picture quality during special playback can be improved.

In Embodiment 4, the recording format is as shown in FIG. 38, but the recording format is not limited to the illustrated format, and similar effects can be obtained in a digital signal recording device, playback device and recording/playback device (digital VTR, digital disk player and the like) having a recording format in which special playback data is separated from the input data and recorded on predefined areas on recording media, and having a system with a recording format in which data areas are disposed such that the special playback data recording area and the error correction code recording area can both be reproduced by a head of each device during special playback. Embodiment 4 relates, as an example, to the situations where the error correction recording area is disposed on a scanning trace of a rotary head 26a (18× speed playback data) and the error correction code recording area is disposed adjacent to the special playback data recording area (4× speed playback data).

The depth of interleaving during normal playback is not limited to 10 tracks (5 two-track data blocks), but in PAL zone (frame frequency is 25 Hz) centered on Europe, the depth may be changed to 12 tracks (6 two-track data blocks). Even in NTSC zone, the depth may be 12 tracks. The depth of the interleaving may be identical between NTSC zone and PAL zone. The method of interleaving need not be limited to that shown in FIG. 39A to FIG. 39G, and FIG. 40. For instance, the interleaving may be in the vertical direction. The method of configuring the two-track data block is not limited to that shown in FIG. 39A to FIG. 39G. For instance, it may be so arranged that the 18× speed data and the data from the error correction code recording area are removed, and the data is read in the ascending order (with regard to the 135 sync blocks in the video area) on the A track, and the data on the B track is similarly read in the ascending order of the sync block number, to form a two-track data block of 230 sync blocks, and the data of the error correction code recording area is appended in the order of the area [10], area [11] and area [12], to form a two-track data block of 245 sync blocks. It is also possible to use the interleaving shown in FIG. 22 or FIG. 23.

The recording data need not be ATV signal, but may be DVB signal in Europe, obtained by compressing the video signal according to the MPEG2, or a signal obtained by compression according to MPEG1, and yet similar effects are obtained. The playback speeds during fast playback are not limited to 4× speed and 18× speed, but similar effects are obtained with a system having a recording format in which special playback data recording areas are disposed to conform to the playback speed required of the digital signal recording device and the data areas are so disposed that the special playback data recording area and error correction code recording area can both be reproduced by a head during special playback.

Moreover, since the data is disposed as described above, each of the transport packets does not extend over two tracks, and data is disposed within each track, and the size of the circuit for executing interleaving can be reduced. Furthermore, even when the depth of interleaving is varied to 12 tracks for PAL or SECAM zone, since the data is completed within each track, the control is easy. In addition, since the two-track data block can be configured from two tracks, control is easy even when the interleaving extends over 12 tracks. For instance, in the case of the recording format shown in connection with the prior art example, the main area of each track is formed of 97 sync blocks, so that the data is disposed at a period of 5 tracks. That is, when the input transport packets are converted to sync clock format shown in FIG. 17B and then recorded, the data is disposed from the data at the head of the transport packet, from the sync block at the head of every five tracks, and it is necessary to append an identification signal for identifying the data at the head, and to identify the sync block appended to the transport packet at the head. Where the data is completed within a track, the head of the transport packet can be detected easily without appending the identification signal. The ID signal or the H1, H2 header areas shown in FIG. 17B can be effectively utilized, and the size of the circuit can be reduced.

When the data transmitted in the form of transport packet is recorded by a digital VTR represented by those conforming to the SD standard, two transport packets are converted into five sync block formats and recorded in Embodiment 4. This however is just an example. In general m transport packets may be used to form n lines of sync blocks (n and m being positive integers). Moreover, by configuring the recording format on a recording media, such that n sync blocks of data is disposed on the same track, when the data of the sync block formats obtained by the conversion is recorded on the recording media, the data of the transport packets can be converted efficiently into the sync block format. Furthermore, because the n sync blocks of data is completed within one track, when the data of the sync block format is converted into data of the transport packets during playback, a set of the n sync block formats can be separated easily using the track information such as track identification signal, and the sync block number. Accordingly, the size of the circuit, in particular in the playback system, can be reduced. In addition, it is not necessary to record the identification signal of the n sync blocks, and the recording areas for the data can be utilized effectively. The length of one sync block is not limited to that shown in FIG. 4.

Embodiment 5

The disposition of the 4× speed playback data recording areas, the 18× speed playback data recording areas, and the error correction code recording areas. and the numbers of the respective areas, are not limited to those of the example described above. The speeds of the fast playback are 4× speed and 18× speed according to Embodiment 4, but they may be of other values. and yet the error correction codes recorded in the areas special playback data recording areas, and error correction code recording areas provided on the scanning traces of the rotary heads 26a and 26b are switched between those appended to the normal playback data and those appended to the special playback data. Then, effects similar to those described above can be attained.

In Embodiment 4, the error correction code recorded in the error correction code recording area is switched according to the input command (set for example by the user). The invention is not limited to such an arrangement. For example, to reduce cost, where a digital VTR having only one of the error correction encoder and only one error correction decoder (a digital VTR having the configuration of recording and playing back the error correction code appended to the special playback data in the error correction code recording area and special playback data, or a digital VTR having the configuration of recording and playing back only the error correction codes appended to the normal playback data in the above mentioned areas) is used, the magnetic tape recorded each of the above digital VTRs are compatible, and can be played back by any of the types described above, and when the digital VTR is used as an external storage device for computers or the like in the future, powerful error correction code can be appended to the recorded data with identical recording format, and it is possible to use the digital VTR together with an external storage device. Furthermore. since the recording areas on the recording tracks can be used efficiently. the amount of data allotted to the special playback data is increased, and the picture quality during the special playback can be improved.

When low-price digital VTRs, such as digital VTRs having no encoder and decoder for the error correction codes appended to the error correction code recording areas are used, if a flag for identifying the signal is recorded for example in an ID signal, compatibility with the above-described digital VTRs can be attained, and it is not necessary to separately determine a recording format for low-price devices, and compatibility is maintained even when the digital VTR is used as an external recording device for computers or the like.

When compatible playback is performed using the above-mentioned three-types of digital VTRs, and if the error correction decoder for decoding the error correction code recorded in the error correction code recording areas is not provided, it may be so arranged that the playback digital data is output without the error correction decoding using the above-mentioned error correction codes. Then, the compatibility is maintained.

Embodiment 6

In Embodiment 4, the identification signal for the error correction code is appended to the ID signal. The invention is not limited to such an arrangement. In Embodiment 4, the subcode areas are reproduced during fast playback, so that an identification signals of the above-mentioned three signals (a signal indicating normal playback error correction code, a signal indicating fast playback error correction code, or a signal indicating a signal other than the the above-mentioned error correction codes (e.g., a signal of a predetermined, fixed pattern) may be recorded, and yet a similar effect can be attained. The attendant increase in the size of the circuit is very little. The identification signal may be appended to both of the ID signal and the subcode signal. In the case of a standard by which the error correction code must be appended, the identification flag may be one for switching between the two signals (error correction code for normal playback and error correction code for fast playback). The C4 check code may not be applied to the H1 header part shown in FIG. 17B, and the identification signal for the three signals may be recorded in the header part, and yet similar effects can be obtained. Furthermore, it may be stored in the H2 header part and transmitted. It is also possible to append it in the H1 or H2 header part of the normal playback or fast playback data, and transmit it. By appending it to the H1 or H2 header part and transmitting it, in a device commonly used with SD digital VTR, only the identification code for the recording signal is appended to the ID part and recorded, so that the limited ID region can be effectively utilized.

Embodiment 7

With regard to the error correction code recording area, where there is a track (T4 track in FIG. 37) in which no recording area for the special playback data is provided, the above-mentioned error correction code recording area is disposed at the same height as the error correction code recording area provided on a track (T2 track in FIG. 37) on which the special playback data is recorded and formed by a rotary head having the same azimuth. With such an arrangement, the burst error correction capability can be made uniform between tracks having identical azimuth, and control over the interleaving at the time of the C4 check code is simple, and the size of the circuit can be reduced. It is however also possible, with regard to the track (T4 track)

without having special playback area, to dispose the above-mentioned error correction code recording area in an area different (at a height different) from the error correction code recording area disposed on the track (T2 track) having the special playback data recording area and recorded with the identical azimuth angle, although the size of the circuit is then increased a little.

Embodiment 8

The C4 check code and the C5 check code are respectively (245, 230, 16) Reed-Solomon code and (30, 25, 6) Reed-Solomon code. The invention is not limited to such an arrangement, and other code configurations may be used to form the recording format in the above-mentioned manner, and then similar effects are attained. That is, the special playback data recording and error correction code recording area are provided on the scanning traces of the rotary heads 26a and 26b, and the error correction code recorded in this error correction code recording area may be selected between the error correction code appended to the normal playback data and the error correction code appended to the special playback data, and then similar effects are attained.

The depth of interleaving applied when the error correction code appended to normal playback data is generated is 10 tracks in the NTSC zone. and in PAL and SECAM zone, the error correction block for normal playback data is configured of a depth of 12 tracks, and the normal playback data is interleaved to generate the error correction code for the normal playback. With such an arrangement, in a digital VTR according the SD standard, digital data is recorded in correspondence with the frame frequency of 30 Hz in NTSC zone and 25 Hz in PAL and SECAM zone, the interleaving of the normal playback data can be achieved in conformity with the frame frequency of the digital VTR according to the SD standard. Accordingly, it is possible to configure a system which can be used as the digital VTR for recording normal signal. and a digital VTR recording ATV signals or the like. (It is not necessary to provide an area for additionally recording the numbers of the error correction blocks, as the interleaved data can be identified by the track number appended to the ID signal. It is not necessary to provide an additional circuit for separating the error correction block.) The part which can be used in common is increased when the digital VTR is configured, and the size of the circuit can be reduced.

What is claimed is:

1. A digital signal playback device for playback from a magnetic tape on which record data is recorded, after arranging in two dimensions, consisting of a recording direction and perpendicular direction, the record data to be recorded in predetermined areas on tracks formed helically on magnetic tape, collecting a plurality of record data each arranged in the two dimensions to structure a data block, appending a third error correction code in a third direction including a direction of depth of the data block, and appending first and second error correction codes in the recording direction and perpendicular direction to the record data containing the third error correction code, said digital signal playback device comprising:

first error-correction decoding means for performing error correction on the playback data using the first error correction code;

burst error detecting means for detecting a burst error that has occurred in a playback signal during playback;

second error-correction decoding means for performing error correction on the playback data using the second error correction code; and third error-correction decoding means for performing error correction on the playback data using the third error correction code;

wherein when a burst error is detected by the burst error detecting means, an error-correction decoding algorithm followed by at least one of the second and third error-correction decoding means is made different from the one followed thereby when no burst error is detected.

2. The digital signal playback device as set forth in claim 1, wherein the burst error detecting means recognizes occurrence of a burst error on the basis of the continuity of error-detection flags set as a result of application of the first error correction code.

3. The digital signal playback device as set forth in claim 1, wherein the burst error detecting means compares the output level of a playback signal sent from a head with a predetermined level in normal playback mode, and when the output level of a playback signal is not higher than the predetermined level continuously for a predetermined period of time or longer, the burst error detecting means recognizes occurrence of a burst error.

4. The digital signal playback device as set forth in claim 1, wherein, when a burst error is detected by the burst error detecting means, an error-correction decoding algorithm followed by the second error-correction decoding means is made different from the one followed thereby when no burst error is detected.

5. The digital signal playback device as set forth in claim 4, wherein when the burst error detecting means detect a burst error, error-correction decoding based on the second error correction code is not executed.

6. The digital signal playback device as set forth in claim 1, wherein, when a burst error is detected by the burst error detecting means, an error-correction decoding algorithm followed by the third error-correction decoding means is made different from the one followed thereby when no burst error is detected.

7. The digital signal playback device as set forth in claim 6, wherein when the burst error detecting means detects a burst error, the third error-correction decoding means uses error-detection flags set as a result of application of the first error correction code in performing error correction on data residing on a track with regard to which the burst error is detected.

8. The digital signal playback device as set forth in claim 6, wherein, a maximum correctable number of erasures in correcting errors by means of the third error-correction decoding means is different depending on whether or not the burst error detecting means detects a burst error.

9. An error-correction decoding device for performing error-correction using first to third error correction codes on received or reproduced digital data, having been transmitted or recorded, after arranging transmission or recording digital data in two dimensions, consisting of a transmitting or recording direction, and perpendicular direction, collecting a plurality of digital data each arranged in the two dimensions to structure a data block, applying the third error correction code in a third direction including a direction of depth of the data block, applying the first and second error correction codes in the transmitting or recording direction, and perpendicular direction to the digital data containing the third error correction code, and then transmitting or recording the digital data, said device comprising:

burst error detecting means for detecting a burst error that has occurred in the received or reproduced digital data;

first error-correcting means for performing error correction on the received or reproduced digital data using the first error correction code;

second error-correcting means for of performing error correction on the received or reproduced digital data using the second error correction code;

third error-correcting means for performing error correction on the received or reproduced digital data using the third error correction code; and control means for controlling such that, when a bust error is detected, at least one of the second and third error correction means uses an error correction decoding algorithm different from the one used when no burst error is detected.

10. The error correction decoding device as set forth in claim 9, wherein said burst error correction means recognizes occurrence of a burst error on the basis of the continuity of error-detection flags set as a result of the error correction by the first error-correcting means.

11. The device according to claim 9, wherein said control means controls such that, when a burst error is detected, said second error-correcting means uses an error correction decoding algorithm different from the one used when no burst error is detected.

12. The error correction decoding device as set forth in claim 11, wherein, when said burst error detecting means detects a burst error, the second error-correcting means does not execute the error correction.

13. The error correction decoding device according to claim 9, wherein said control means controls such that, when a burst error is detected said third error-correcting means uses an error correction decoding algorithm different from the one used when no burst error is detected.

14. The error correction decoding device as set forth in claim 13, wherein, when said burst error detecting means detects a burst error, error-detection flags set as a result of the error correction by the first error-correcting means are used to perform error correction on the digital data residing on a plane on which the burst error is detected.

15. The error correction decoding device as set forth in claim 13, wherein, said third error-correcting means uses different maximum correctable number of erasures depending on whether the burst error detecting means does or does not detect a burst error error.

16. A digital signal recording device in which intra-frame or -field coded or inter-frame or -field coded digital video and audio signals input in the form of transport packets are transparent-recorded, comprising:

data separating means for separating the intra-frame or -field coded digital video signal from the transport packets;

special playback data generating means for reconfiguring the intra-frame or -field coded digital video signal having been separated at the data separating means, to generate special playback data; and recording data generating means for re-configuring the data of the transport packets having been input, to generate sync block formats;

wherein the area for recording the special playback data and error correction code is provided on a scanning trace of a head scanning the recording media at a predefined fast playback speed, one of the error correction code appended to the special playback data or the error correction code appended at least the data output from the recording data generating means is recorded in the area for recording the error correction code, and an identification signal identifying the error correction code recorded in the error correction code recording area is appended to the recording signal, and recorded.

17. The digital signal recording device according to claim 16, wherein the special playback data generated by the special playback data generating means is generated in the form of the transport packets having been input, and, at the time of recording, converted into sync block format like the transport packets having been input, and then recorded.

18. The digital signal recording device according to claim 16, wherein the recording area for the error correction code is disposed adjacent to the special playback data recording area.

19. The digital signal recording device according to claim 16, wherein when the error correction code is appended to the output of the recording data generating means, the output of the recording generating means and the output of the part or entirety of the special playback data generating means, to configure the data block.

20. The digital signal recording device according to claim 16 wherein when the sync block formats are generated by the recording format generating means, m transport packets are used to generate n lines of sync blocks of data, and the recording data is so disposed that the above-mentioned n lines of sync blocks of data output from the recording format generating means do not extend beyond one recording track.

21. The digital signal recording device according to claim 20, wherein the identification signal for identifying the data recorded in the error correction code recording area is transmitted using a recording area provided at the data recording part which remain when the transport packets are converted into the sync block formats at the recording data generating means.

* * * * *